United States Patent
Nix

(10) Patent No.: US 11,153,080 B1
(45) Date of Patent: Oct. 19, 2021

(54) NETWORK SECURING DEVICE DATA USING TWO POST-QUANTUM CRYPTOGRAPHY KEY ENCAPSULATION MECHANISMS

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 0 days.

(21) Appl. No.: 17/166,157

(22) Filed: Feb. 3, 2021

Related U.S. Application Data

(60) Provisional application No. 63/058,212, filed on Jul. 29, 2020.

(51) Int. Cl.
*H04L 9/32* (2006.01)
*H04L 9/08* (2006.01)
*H04L 29/06* (2006.01)
*H04L 9/30* (2006.01)

(52) U.S. Cl.
CPC .......... *H04L 9/0852* (2013.01); *H04L 9/0825* (2013.01); *H04L 9/0861* (2013.01); *H04L 9/3093* (2013.01); *H04L 9/3263* (2013.01); *H04L 63/045* (2013.01)

(58) Field of Classification Search
CPC ... H04L 9/0852; H04L 9/0875; H04L 9/0861; H04L 9/3093; H04L 9/3263; H04L 63/045
See application file for complete search history.

(56) References Cited

U.S. PATENT DOCUMENTS

| 8,681,996 | B2 | 3/2014 | Sabev |
| 8,782,774 | B1* | 7/2014 | Pahl .................... H04L 63/0442 726/15 |
| 9,531,685 | B2 | 12/2016 | Gero et al. |
| 9,673,977 | B1* | 6/2017 | Kalach .................. H04L 9/0869 |
| 9,819,656 | B2 | 11/2017 | Carlson |
| 9,985,782 | B2 | 5/2018 | McCallum |
| 10,169,587 | B1* | 1/2019 | Nix ......................... G06F 21/57 |
| 10,218,504 | B1* | 2/2019 | Kalach .................. H04L 9/0819 |

(Continued)

OTHER PUBLICATIONS

Wikipedia, "Post-Quantum Cryptography Standardization", Aug. 30, 2020.

(Continued)

*Primary Examiner* — Darshan I Dhruv
(74) *Attorney, Agent, or Firm* — GrowIP Law Group LLC

(57) ABSTRACT

A network and a device can support secure sessions with both (i) a post-quantum cryptography (PQC) key encapsulation mechanism (KEM) and (ii) forward secrecy. The device can generate (i) an ephemeral public key (ePK.device) and private key (eSK.device) and (ii) send ePK.device with first KEM parameters to the network. The network can (i) conduct a first KEM with ePK.device to derive a first asymmetric ciphertext and first shared secret, and (ii) generate a first symmetric ciphertext for PK.server and second KEM parameters using the first shared secret. The network can send the first asymmetric ciphertext and the first symmetric ciphertext to the device. The network can receive (i) a second symmetric ciphertext comprising "double encrypted" second asymmetric ciphertext for a second KEM with SK.server, and (ii) a third symmetric ciphertext. The network can decrypt the third symmetric ciphertext using the second asymmetric ciphertext.

16 Claims, 11 Drawing Sheets

(56) References Cited

U.S. PATENT DOCUMENTS

| | | | | |
|---|---|---|---|---|
| 10,412,063 | B1* | 9/2019 | Mandich | H04L 9/0869 |
| 2002/0166048 | A1* | 11/2002 | Coulier | H04L 63/0435 |
| | | | | 713/169 |
| 2009/0049299 | A1 | 2/2009 | Jablon et al. | |
| 2013/0051551 | A1* | 2/2013 | El Aimani | H04L 9/3247 |
| | | | | 380/30 |
| 2013/0114810 | A1* | 5/2013 | Kobayashi | H04L 9/3073 |
| | | | | 380/47 |
| 2014/0089658 | A1* | 3/2014 | Raghuram | G06F 9/45533 |
| | | | | 713/155 |
| 2014/0195804 | A1* | 7/2014 | Hursti | H04L 9/14 |
| | | | | 713/168 |
| 2015/0067338 | A1* | 3/2015 | Gero | H04L 63/061 |
| | | | | 713/171 |
| 2015/0271146 | A1* | 9/2015 | Holyfield | G06F 21/606 |
| | | | | 713/171 |
| 2016/0065370 | A1* | 3/2016 | Le Saint | H04L 9/0891 |
| | | | | 713/155 |
| 2017/0012974 | A1* | 1/2017 | Sierra | H04L 63/0892 |
| 2019/0097794 | A1* | 3/2019 | Nix | H04L 9/0662 |
| 2019/0149527 | A1* | 5/2019 | John | H04L 9/3247 |
| | | | | 713/171 |
| 2019/0386825 | A1* | 12/2019 | Bhattacharya | H04L 9/0847 |
| 2020/0235929 | A1* | 7/2020 | Jacobs | H04L 9/3228 |
| 2020/0304305 | A1* | 9/2020 | Garcia Morchon | G06F 7/582 |
| 2020/0314115 | A1* | 10/2020 | Nabeesa | H04L 9/0825 |
| 2020/0374129 | A1* | 11/2020 | Dilles | G06F 21/45 |
| 2020/0403978 | A1* | 12/2020 | Allen | H04L 9/0838 |
| 2021/0058242 | A1* | 2/2021 | Donsomsakunkij | G06F 21/602 |
| 2021/0083862 | A1* | 3/2021 | Pointcheval | H04L 9/3073 |

OTHER PUBLICATIONS

GSM Association, "iUICC POC Group Primary Platform requirements", Release 1.0, May 17, 2017.

ETSI Technical Standard 103 465 v.15.0.0, "Smart Cards; Smart Secure Platform (SSP); Requirements Specification", May 2019.

Bos, et al, "CRYSTALS—Kyber: a CCA-secure module-lattice-based KEM", NIST PQC Round 1 Submission Package, Nov. 2017.

Jao, et al, "Supersingular Isogeny Key Encapsulation", NIST PQC Round 2 Submission Package, Apr. 17, 2019.

Krawczyk, et al, "HMAC-based Extract-and-Expand Key Derivation Function (HKDF)", Internet Engineering Task Force (IETF), RFC 5869, May 2010.

Aragon, et al, "BIKE—Bit-Flipping Key Encapsulation", NIST PQC Conference, Apr. 13, 2018.

Fischlin, et al, "Multi-Stage Key Exchange and the Case of Google's QUIC Protocol", Association for Computing Machinery Conference on Computer and Communications Security 2014, p. 1193-1204, 2014.

Krawczyk, et al, "The OPTLS Protocol and TLS 1.3", Proc. IEEE European Symposium on Security and Privacy, 2016.

\* cited by examiner

NETWORK SECURING DEVICE DATA USING TWO POST-QUANTUM CRYPTOGRAPHY KEY ENCAPSULATION MECHANISMS

CROSS REFERENCE TO RELATED APPLICATIONS

The present application claims priority to U.S. Provisional Application No. 63/058,212 filed Jul. 29, 2020 which is herewith incorporated by reference into the present application.

BACKGROUND

Technical Field

The present systems and methods relate to devices and a network establishing secure communication using post-quantum cryptography (PQC) key exchange mechanisms (KEM), and more particularly to using two separate PQC KEM with at least two separate public/private key pairs, in order to efficiently encrypt application data.

Description of Related Art

Many protocols for secure communications through the public Internet depend on classical public key infrastructure (PM) algorithms of Rivest-Shamir-Adleman (RSA), Diffi-Hellman (DH), or elliptic curve cryptography (ECC). ECC algorithms include elliptic curve Diffie-Hellman (ECDH) key exchanges. Example protocols as of February 2021 include current, published versions of Transport Layer Security (TLS), Secure Shell (SSH), Datagram Transport Layer Security (DTLS), the embedded SIM from the GSMA, WireGuard for virtual private networking, the Device Provisioning Protocol (DPP) from the WiFi Alliance™, the Open Firmware Loader from GlobalPlatform™, and IP Security (IPSec). Many other examples exist as well. The security of the majority of communications on the public Internet today depend on at least one of RSA, DH, or ECC based algorithms.

Although the use of RSA, DH, and ECC algorithms are included in many different protocols and standards, quantum computers are expected to be able to solve both (i) the discrete logarithm and elliptic curve discrete logarithm problems (for DH and ECC algorithms) and (ii) the integer factorization problem (for RSA algorithms) in polynomial time, while classical computers solve the problem in exponential time. As of early 2021, estimates for the number of reasonable quality qubits required to feasibly break a 256 bit ECC public key to determine the private key with a reasonable computation time are approximately 2000-4000 qubits. Estimates for the number of equivalent qubits required to break a 3072 bit RSA based PM public key to determine the private key are approximately 4000-8000 qubits. The number of qubits can be notably lower for qubits with longer stability and higher quality than available as of early 2021.

Current industry projections of the number of qubits for operating quantum computers project the above number of qubits for breaking RSA, DH, and ECC PM cryptography could be available for a computing device in approximately 5 to 10 years and likely within 15 years. As one example, in September of 2020, IBM publicly announced plans to operate quantum computers with 127 qubits in 2021, 433 qubits in 2022, and 1121 qubits in 2023. Continued projections for those announced plans show quantum computers with 4000 qubits should be available around 2024 or 2025. Consequently, a need exists in the art for secure sessions to support cryptographic algorithms based on hard problems for quantum computers that are not based on either the elliptic curve discrete logarithm problem or the integer factorization problem. A need exists in the art for secure sessions to continue using PM keys, such that a public key can be publicly shared and corresponding private keys securely stored.

The National Institute of Standards and Technology (MST) in early 2021 continues to conduct a project for Post-Quantum Cryptography (PQC) Standardization. The field of post-quantum cryptography continues to develop with proposed algorithms currently undergoing detailed evaluation for standardization as of February 2021. In general, the leading candidates for post-quantum cryptography key exchange or "key encapsulation mechanisms" (KEM) propose using lattice-based algorithms, code-based algorithms, or Supersingular Isogeny Key Encapsulation (SIKE). These proposed algorithms are described by the Wikipedia article for "Post-Quantum Cryptography Standardization" dated Aug. 31, 2020, which is hereby incorporated by reference and referred to as the Wikipedia PQC article. The above KEM algorithms propose, in summary, a first party deriving a PM key pair, sending a public key to a second party, receiving a ciphertext processed with the public key from the second party, and processing the ciphertext with a private key in order determine a shared secret key for both the first party and the second party.

The exemplary algorithms for PQC KEM standardization generally have less long-term, detailed study and confirmation of security of the associated underlying "hard" problems, compared to integer factoring and calculating discrete logarithms. Consequently, the emergence of practical quantum computers over the coming decade (which can feasibly solve current hard problems for PM cryptography commonly used) requires the industry to shift to cryptographic algorithms that have potential uncertainty for long-term security. In other words, it is currently not proven that lattice-based cryptography, code-based cryptography, or SIKE problems cannot be solved in polynomial time by either classical computers or quantum computers. A need exists in the art for secure sessions using PQC algorithms to provide security greater than the security provided by any single PQC algorithm (e.g. lattice-based, code-based, or SIKE), in order to reduce concerns and uncertainty about migrating from RSA, ECC, DH algorithms to PQC algorithms.

The most widely deployed standard for secure sessions on the public Internet today is TLS version 1.2 as specified in the Internet Engineering Task Force (IETF) 5246. As one example, the Payment Card Industry Security Standards Council recommends at least TLS v1.2 as of mid-2020. TLS version 1.2 normally requires that four handshake messages are exchanged before a device or client can send a server encrypted application data. The four handshake messages result in a single initial shared secret key and symmetric encryption derived from a single PM algorithm (e.g. RSA, DH, or ECDH). TLS version 1.3 supports a device or client sending the server encrypted device application data after two handshake messages (e.g. "Client Hello" and "Server Hello"), but again only supports a single initial shared secret key derived from a single PM algorithm. The security for both TLS 1.2 and TLS 1.3 depends on single PM key pairs, such that if one PM key pair is compromised (such as the secret key is no longer secret), then the security of the session such as confidentiality is compromised. A need exists in the art for a secure session to depend on more than one PM key pair and algorithm, such that if a single PM key pair or algorithm is compromised, then a data session can remain secure based on at least a second, different PM key pair and associated algorithm used to secure the session.

Secure sessions between a device and a server should also preferably support forward secrecy. In general forward secrecy is supported through the use of at least one ephemeral PM key pair from either the device or the server. In this manner, shared secret keys and resulting symmetric ciphering keys are generally not compromised from the release or compromise of a static private key used to establish the secure session. As one example, TLS v 1.3 provides forward secrecy through the use of two ephemeral ECDH PM key pairs (one for the client and one for the server). However, the two ephemeral ECDH PM key pairs are used for a single ECDH key exchange which results in both (i) a single initial shared secret key and (ii) security that depends on a single algorithm (e.g. ECC). A need exists in the art for a client/device and a server/host to obtain forward secrecy and security using PQC KEM algorithms.

Likewise, conventional technology for secure sessions in TLS v1.2, TLS v.1.3, Secure Shell (SSH), IPSec, etc. (when using PM algorithms) conduct a key exchange that results in a single initial shared secret key, such as a single "handshake secret" or "pre-master secret", where all subsequent shared secret keys are derived from the single "handshake secret" or "pre-master secret". As one example with ephemeral ECDH with TLS v1.3, a single ECDH is conducted using the client/device ephemeral PM key pair and the server/host ephemeral PM key pair in order to derive a handshake secret. The security of the handshake secret depends on the security of the single ECDH algorithm, which is likely compromised by practical quantum computers with sufficient qubits within less than a decade. A need exists in the art for secure sessions to (i) derive at least two independent shared secrets equivalent to a conventional "handshake secret" from two different PQC KEM algorithms, and (ii) securely use the two independent shared secrets to derive a symmetric ciphering key for use by both a device and a network.

With conventional technology such as with TLS 1.2 and TLS 1.3, digital signatures are used for authentication of a server. With PQC digital signature algorithms proposed in the NIST PQC round 3 algorithms, both the public key sized and the digital signatures are significantly larger than digital signatures used with RSA, ECC, and DH algorithms (e.g. "classical" algorithms and PM keys). Consequently, a simple substitution of existing "classical" PM keys and algorithms and digital signatures for PQC algorithms will result in significantly larger handshake traffic, such as on the order of 10 times the size of handshake traffic from classical algorithms. A need exists in the art for clients using PQC secure sessions such as TLS to authenticate a server or network without requiring a separate server digital signature over handshake traffic between a device and a network.

Conventional technology for the use of a server such as a web server supporting transport layer security includes the use of server certificates and digital signatures in the handshake messages in order for a device or a client communicating with the server to authenticate the server. The conventional technology, such as with hosted web servers in a cloud computing environment, can also include the web server storing a server static private key for the server certificate, in order to conduct key exchanges using the server static private key. Some solutions, such as CloudFlare Keyless SSL use a key server separate from the web server to store the server static private key and generate the digital signatures, in order to increase security and separate the storage and operations with the server static private key from the web server that may be commonly exposed to the Public Internet. A need exists in the art for a key server, or secure separate server from the web server, to store a server private key for the server public key in a server certificate, and (ii) conduct PQC KEM operations such as KEM decapsulation functions in order to keep the server private key securely stored separately from the web server.

Many other examples exist as well for needs in the art for devices and servers or networks to securely support PQC KEM algorithms resistant to quantum computers. The above examples are just a few and intended to be illustrative instead of limiting.

SUMMARY

Methods and systems are provided for a device and a network to establish secure communications based on post-quantum cryptography (PQC) key exchange mechanisms (KEM). The methods and systems provided herein can address exemplary needs in the art described above and other benefits are available as well, including increasing the security from using both a first KEM and a second KEM during the initial handshake messages for establishing a secure session or secured communications. In exemplary embodiments, a device or client can support a first set of PQC KEM algorithms and a network can support a second set of PQC KEM algorithms. The first and second sets of PQC KEM algorithms can support at least a first mutually shared PQC KEM algorithm and a second mutually shared PQC KEM algorithm. The device can derive a device ephemeral public key and device ephemeral private key for the first mutually shared PQC KEM algorithm.

The device can send to a first server in the network a first message, which could comprise a "Client Hello" message. The first message can include (i) the device ephemeral public key, (ii) an identifier or code specifying the first mutually shared PQC KEM algorithm for the device ephemeral public key, (iii) a list for the first set of PQC KEM algorithms supported by the device, and (iv) device extensions or parameters for authentication of digital signatures from the network. The network can receive the first message and select the second mutually shared PQC KEM algorithm from overlap between (i) the first set of PQC KEM algorithms supported by the device and (ii) the second set of PQC KEM algorithms supported by the network. In exemplary embodiments the first mutually shared PQC KEM algorithm selected by the device can support a type comprising one of lattice-based cryptography, code-based cryptography, and SIKE. In exemplary embodiments the second mutually shared PQC KEM algorithm selected by the network can support a type both (i) comprising one of lattice-based cryptography, code-based cryptography, and SIKE, and (ii) different than the type selected by the device and specified by the identifier or code for the device ephemeral public key. In this manner, two different types of PQC KEM algorithms can be mutually supported and subsequently used by both the device and the network.

An exemplary system can include a computing device and a network comprising a first server and a second server. The first server and the second server can be operated and controlled by the network. The servers can include server computing hardware, where computer hardware can comprise electrical components for processing, storing, sending or transmitting, and receiving data, including communication with other nodes via data networks. For some exemplary embodiments, the servers can comprise a virtual machine operating on a host server, where the host server includes server computing hardware. For some exemplary embodiments, the servers can comprise containers such as Docker or Kubernetes operating on a host server, where the host server includes server computing hardware. Server computing hardware can include at least one processor in order to store and record data as well as communicate with other nodes over an IP network, such as with a computing device operating at a remote location from the server.

The computing device could comprise a smartphone, a laptop computer, a second server, a smart camera, an intelligent sensor for the "internet of things", a tracking device, health monitoring equipment in a hospital, a desktop computer, and other possibilities exist as well. The computing device operates a client program or executable instructions by a processor in the device for communicating with the first server. Both the device and the network can store cryptographic algorithms for processing both (i) the first mutually shared PQC KEM algorithm selected by the device and (ii) the second mutually shared PQC KEM algorithm selected by the network. Both the device and the first server can store (i) a first set of parameters associated with the first mutually shared PQC KEM algorithm selected by the device and (ii) a second set of parameters associated with the second mutually shared PQC KEM algorithm selected by the network.

The network can generate and store a server private key and a corresponding server public key for all of the second set of PQC KEM algorithms supported by the network. The network can store a plurality of server certificates and corresponding server static public keys, where the different certificates can support (i) different certificate issuer chains through a certificate issuer root certificate and (ii) different digital signature algorithms. A second server for the network can operate a certificate database that includes a server static private key associated with each of the server certificates in the certificate database.

The first server can conduct a first KEM using a KEM encapsulation function (KEM ENCAPS) with (i) the received device ephemeral public key from the first message and (ii) the first mutually shared PQC KEM algorithm selected by the device. The output of the KEM ENCAPS can be both (i) a first asymmetric ciphertext C1 and (ii) a first shared secret key K1.

The first server and the second server for the network can establish a secure session between the two nodes within the network. The network can process the device extensions or parameters for verification of a server certificate for the network received in the first message from the device. The device extensions can include both (i) a list of supported digital signature algorithms, and (ii) a list of supported certificate issuers, where the device includes a root certificate for each of the supported certificate issuers and supported digital signature algorithms. The second server can select a server certificate and server extensions that support the device extensions, including a server public key and the second set of parameters for the server public key.

The first server can use a first "HMAC-based Extract-and-Expand Key Derivation Function" (HKDF) equivalent to IETF RFC 5869 with at least the first shared secret key K1 to derive at least a first symmetric ciphering key. The first server can use a symmetric ciphering algorithm and the first symmetric ciphering key to encrypt into a first symmetric ciphertext symm-C1 at least (i) the server public key, and (ii) the second set of parameters for the server public key (which could be an identity or code for the second mutually shared PQC KEM algorithm selected by the network based on the first message from the device). For embodiments that include the server public key and the second set of parameters within a server certificate, then the first symmetric ciphertext symm-C1 can include the server certificate.

The first server can generate a response second message for the device that includes at least (i) metadata for the symmetric ciphering algorithm (e.g. at least an identity or parameters for the symmetric ciphering algorithm), (ii) the first asymmetric ciphertext C1, and (iii) the first symmetric ciphertext symm-C1. The first server can send the response second message to the device, and the response second message can comprise a "Server Hello" message.

The device can receive the response second message and conduct a series of steps in order to process the message. The device can conduct the first KEM using a KEM decapsulation function (KEM DECAPS) with the received first asymmetric ciphertext C1 in order to mutually derive or generate the first shared secret key K1. The device can use the first HKDF with at least the first shared secret key K1 to mutually derive at least the first symmetric ciphering key. The device can use (i) the metadata, (ii) the symmetric ciphering algorithm, and (iii) the mutually derived first symmetric ciphering key to decrypt the first symmetric ciphertext symm-C1 into a plaintext. The device can use the data from the plaintext to read the server public key and the second set of parameters. For embodiments where the first symmetric ciphertext includes the server certificate for the server public key, the device can verify the server certificate through a chain of stored certificate issuer certificates.

The device can conduct a second KEM using a KEM encapsulation function (KEM ENCAPS) with (i) the received server public key from the plaintext (e.g. transmitted within the first symmetric ciphertext symm-C1) and (ii) the second mutually shared PQC KEM algorithm based on the second set of parameters also from the plaintext. The output of the KEM ENCAPS can be both (i) a second ciphertext C2 and (ii) a second shared secret key K2.

In some exemplary embodiments, the second ciphertext C2 can be "double encrypted" into an encrypted second symmetric ciphertext symm-C2 by the device using the first symmetric ciphering key and the symmetric ciphering algorithm. The encrypted second symmetric ciphertext symm-C2 can comprise data that is both (i) asymmetrically encrypted using the KEM and then also (ii) symmetrically encrypted using the first symmetric ciphering key. As contemplated herein, a symmetric ciphering algorithm can use both a symmetric ciphering key and a corresponding message authentication code (MAC) key. In other exemplary embodiments, the second ciphertext C2 can be "MACed" with a MAC key generated by the first HKDF, and a symmetric encryption of the second ciphertext C2 could be omitted. Device can specify second metadata for a third message below that indicates if the device sends the server the second ciphertext C2 as a "double encrypted" second symmetric ciphertext symm-C2, and other possibilities exist as well for a device and a server to specify the use and communication of a "double encrypted" second symmetric ciphertext symm-C2.

The device can use a second HKDF with at least the second shared secret key K2 to derive at least a second symmetric ciphering key. For preferred exemplary embodiments, the device can use at least both (i) the first shared secret key K1 output from the device KEM DECAPS function and also (ii) the second shared secret key K2 output from the device KEM ENCAPS function in order to derive at least the second symmetric ciphering key. In this manner, the second symmetric ciphering key can provide a security level of at least the stronger of the first KEM (e.g. used the KEM DECAPS) and the second KEM (e.g. used with the KEM ENCAPS). Note that the first KEM can use a first PQC KEM algorithm type (e.g. lattice-based, code-based, or SIKE), and the second KEM can use a second PQC KEM algorithm type different than the first PQC algorithm type. For example, if the first PQC KEM algorithm type is based on lattices, then the second PQC KEM algorithm type could be based on codes or SIKE. Or, if the first PQC KEM algorithm type is code-based, then the second PQC KEM algorithm type could be based on lattices or SIKE. Other combination for using different algorithm types for the first PQC KEM and the second PQC KEM are possible as well without departing from the scope of the present disclosure.

Consequently, if one KEM is later found compromised or broken in the future, the second symmetric ciphering key can remain secured by the other KEM. This feature provides benefits over conventional technology and addresses needs in the art identified above, where a current PQC algorithm proposed for standardization could have currently unidentified weaknesses identified in the future. In other words, the input of both the first shared secret key K1 and the second shared secret key K2 into the second HKDF to derive the second symmetric ciphering key can provide an overall higher level of security than the use of one algorithm type (e.g. lattices) to derive both the first shared secret key K1 and the second shared secret key K2, and other benefits can be achieved as well.

The device can select a second plaintext for encryption to include in a third message, which could comprise data for a "Client Finished" message. The second plaintext could include (i) final handshake data and also potentially (ii) application data from the device to the server. The application data could be sensor data, device configuration data, a registration message, and other possibilities exist as well. The second plaintext could also include a device certificate as well as a digital signature from the device. The device can use (i) the metadata from the response second message, (ii) the symmetric ciphering algorithm, and (iii) the derived second symmetric ciphering key to encrypt the second plaintext into a third symmetric ciphertext symm-C3. The device can send to the first server the third message, where the third message can include at least the second ciphertext C2 (possibly as a "double encrypted" second asymmetric ciphertext C2) and the third symmetric ciphertext symm-C3.

The first server can receive the third message and conduct a series of steps to process the third message. In preferred exemplary embodiments where the third message includes the "double encrypted" second symmetric ciphertext symm-C2, the first server can use the symmetric ciphering algorithm and the first symmetric ciphering key to decrypt the "double encrypted" second symmetric ciphertext symm-C2 into a second asymmetric ciphertext C2. In other words, the second symmetric ciphertext symm-C2 could comprise data that is both (i) initially asymmetrically encrypted using the second KEM and the server public key and (ii) then symmetrically encrypted using the first mutually derived symmetric ciphering key. If present, the symmetric encryption for a second symmetric ciphertext symm-C2 could be removed or "unwrapped" using the first mutually derive symmetric ciphering key. After removal of the symmetric encryption, the first server can read the second asymmetric ciphertext C2 which comprises data that has been asymmetrically encrypted using the server public key.

The network can conduct a second KEM using a KEM decapsulation function (KEM DECAPS) with (i) the second ciphertext C2, and (ii) the second mutually shared PQC KEM algorithm selected by the network and specified in the second set of parameters included in the response second message. The output of the KEM DECAPS can be the second shared secret key K2. The network can use the second HKDF with at least the second shared secret key K2 to mutually derive at least the second symmetric ciphering key. For preferred exemplary embodiments, the network can use at least both (i) the first shared secret key K1 output from the server KEM ENCAPS function and also (ii) the second shared secret key K2 output from the server KEM DECAPS function in order to mutually derive at least the second symmetric ciphering key. The security benefits for including both the first and second shared secret keys K1 and K2 in the generation of the second symmetric ciphering key are described above for the device generation of the second symmetric ciphering key.

The first server can use (i) the symmetric ciphering algorithm, and (ii) the mutually derived second symmetric ciphering key to decrypt the third symmetric ciphertext symm-C3 into the second plaintext. The first server can confirm the final device handshake message from the second plaintext and send a "Server Finished" message. The network can subsequently process server application data and derive additional symmetric ciphering keys using at least the first and second shared secret keys K1 and K2.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS OF THE INVENTION

FIG. 1

Figure 1:
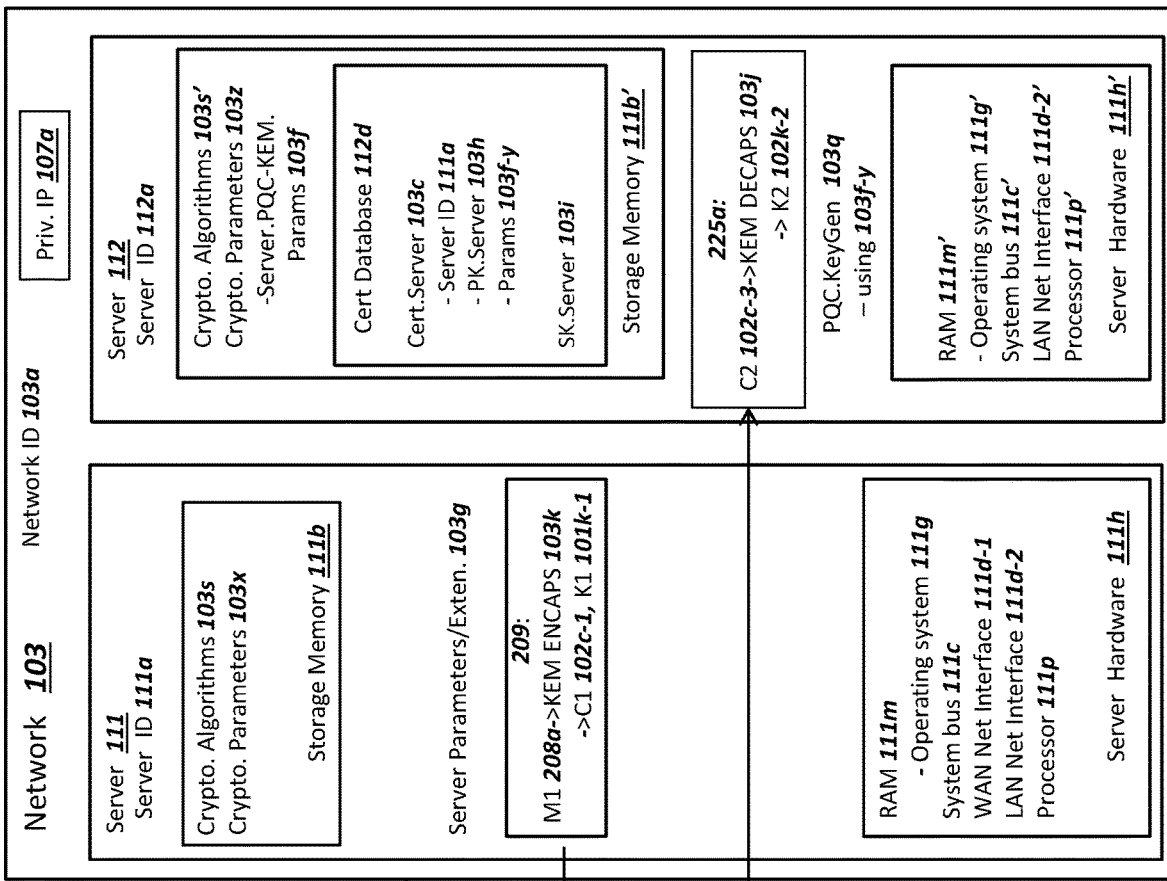
FIG. 1 is a graphical illustration of an exemplary system, where a device and a network process and communicate data in order to establish secure communications, in accordance with exemplary embodiments.
Figure 1:
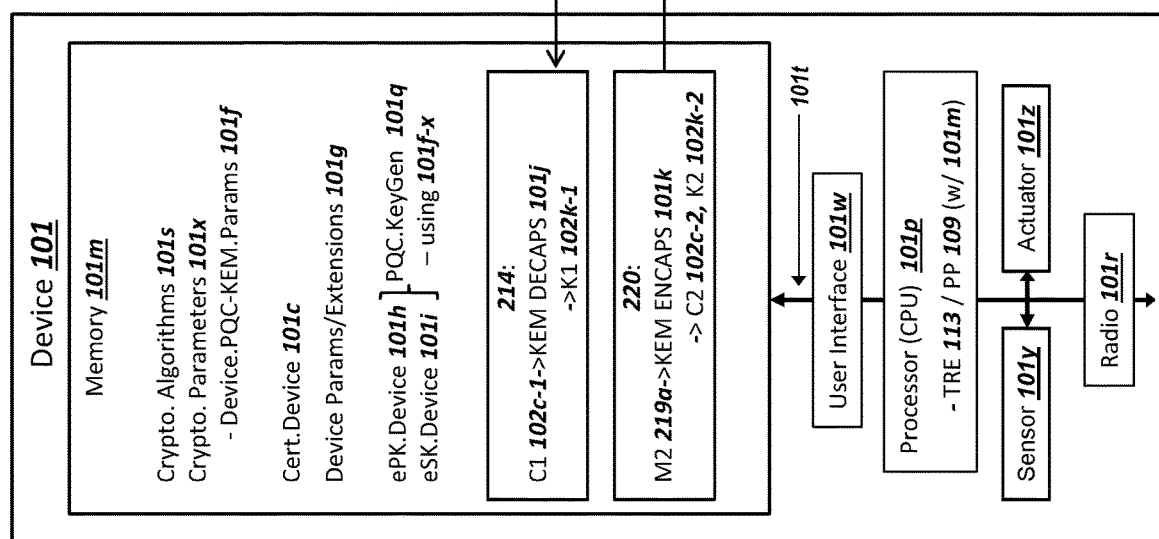

FIG. 1 is a graphical illustration of an exemplary system, where a device and a network process and communicate data in order to establish secure communications, in accordance with exemplary embodiments. The system 100 can include a device 101, an Internet Protocol (IP) network 107, and a network 103. The depicted nodes or entities can communicate data 106 over the IP network 107. Although a single device 101 and a single network 103 are depicted in FIG. 1, a system 100 can comprise a plurality of each of the depicted nodes or entities. A system 100 as depicted in FIG. 1 can support secure sessions between the device 101 and the network 103 such as, but not limited to, using a protocol for Transport Layer Security (TLS), Datagram Transport Layer Security (DLTS), a virtual private network (VPN) such as WireGuard, IP Security (IPSec), Secure Shell (SSH). Other possibilities exist as well for secure protocols supported between device 101 and network 103, without departing from the scope of the present disclosure.

Device 101 and network 103 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, and 5G or subsequent wireless technologies. In addition, the wireless technology used by device 101 and network 103 could support or implement wireless LAN technologies such as WiFi and the related series of standards from IEEE 802.11 standards, such as 802.11ac, 802.11 ax, etc. Other examples exist as well for wireless WAN technology and/or wireless LAN technology used by device 101 and network 103 without departing from the scope of the present disclosure.

Network 103 can also connect to the IP network 107 and send/receive data 106 other via a wired connection such as, but not limited to, an Ethernet connection, or a fiber optic connection. In other words, for some exemplary embodiments, network 103 can connect to IP network 107 using a wired connection, and device 101 can connect to IP network 107 using a wireless connection. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for device 101 and network 103 to communicate data through an IP network 107 exist as well without departing from the scope of the disclosure.

Device 101 can be a computing device for sending and receiving data using a radio 101r. Device 101 can take several different embodiments, such as a general purpose personal computer, a laptop computer, a mobile phone or mobile handset based on the Android® or Fuchsia from Google e or the IOS operating system from Apple®, a tablet, a device with a sensor or actuator for the "Internet of Things", a module for "machine to machine" communications, a device that connects to a wireless Wide Area Network (WAN) operated by a mobile network operator, a router, and/or a server, and other possibilities exist as well for the embodiments of a device 101 without departing from the scope of the present disclosure.

The electrical components within device 101 can include a memory 101m, a processor 101p, a radio 101r, a sensory 101y, an actuator 101z, and a user interface 101w. As depicted in FIG. 1, a data bus 101t or a system bus 101t could internally electrically connect the depicted components within a device 101. Additional components to support the operation of device 101 can include a battery to store electrical power, and an antenna to transmit and receive RF signals. The sensor 101y can collect data external or internal to the device 101, such as temperature, motion, position, pressure, etc. A device 101 could also include the actuator 101z to convert electrical signals into physical actions, such as a motor for moving components, a relay for opening or closing a circuit, a speaker for outputting sound, etc. Memory 101m can comprise combinations of (i) volatile random access memory and (ii) nonvolatile memory. The volatile memory can include random access memory (RAM) for relatively fast read and write operations, such as SRAM or DRAM compared, to nonvolatile memory. RAM for memory 101m could also include persistent RAM or nonvolatile RAM (NVRAM), such that data in a persistent RAM memory or nonvolatile RANI is stored when power is removed. Nonvolatile memory can include storage memory such as a flash memory and record or store data when power is removed from device 101. In general, different forms and electrical components for memory 101m can be used without departing from the scope of the present disclosure. Processor 101p can comprise a central processing unit (CPU) or a "system on a chip" and be similar to a processor 111p for a first server 111 described below, but with reduced capabilities for a device 101 compared to a processor 111p for a first server 111.

Tamper resistant element (TRE) 113 can comprise a tamper resistant element as described in the GSMA PP Requirements document, titled "iUICC POC Group Primary Platform requirements", Release 1.0 dated May 17, 2017, which is hereby incorporated by reference in its entirety ("GSMA PP Requirements"). TRE 113 can also comprise the secure element as described in the ETSI SSP Requirements document ETSI TS 103 465 V15.0.0 (2019-05) titled "Smart Cards; Smart Secure Platform (SSP); Requirements Specification" ("ETSI SSP Requirements"), which is hereby incorporated by reference in its entirety. Tamper resistant element 113 can comprise a silicon enclave within a tamper resistant chip such as a "system on chip" operating within processor 101p. In addition, processor 103p for network 103 can include a TRE and a primary platform 109.

TRE 113 can include a primary platform (PP) 109, where a primary platform is also described in both the GSMA PP Requirements document and the SSP Requirements document. TRE 113 could also comprise a "Smart Secure Platform" (SSP) as described in the SSP Requirements document, such as the SSP depicted in FIG. 2 of the "Architecture" section 9.2.1. Primary platform 109 can comprise a secure operating environment, a secure enclave, a secure element, and include a dedicated processing core within a processor for device 101. Primary platform 109 can also operate in a Trusted Execution Environment (TEE) within a processor for device 101. Primary platform 109 can also comprise a SSP as contemplated by ETSI documents and draft specifications for 5G networks.

TRE 113 and PP 109 can support a variety of applications. TRE 113 can comprise the physical device such as a dedicated processing core or silicon area within a processor 101p in FIG. 1, and a primary platform 109 can comprise a secure processing environment operating within the TRE 113. With appropriate configured secondary platform bundle, TRE 113 and PP 101 could operate as an "integrated universal integrated circuit card" (UICC), an "embedded universal integrated circuit card" (eUICC), a secure element for banking applications or payments from mobile phones, an radio-frequency identity (RFID) card, a secure bootstrap environment for device 101, a virtual key for cars or door locks, an secure environment for recording an identity and secret or private keys for drivers licenses, passports, online or web-site access, etc.

For some exemplary embodiments, the steps and data processing conducted by device 101 to establish a secure session such as the steps and data processing depicted and described for a device 101 in FIG. 2 below can be conducted by a secondary platform bundle operating within a primary platform 109 within a processor 101p. In other exemplary embodiments, the use of a TRE 113 and PP 109 could be (i) omitted or substituted with similar secure enclave or secure processing environment technology. For these embodiments, the processor 101p within device 101 could perform the steps and data processing depicted and described for a device 101 in FIG. 2 below without the use of a TRE 113 and PP 109. Note that the use of a TRE 113 and PP 109 could be omitted for some embodiments of a device 101, and the steps and data processing for a device 101 depicted in FIG. 2 below (as well as subsequent Figures herein) could be conducted using the processor 101p and other depicted electrical components for a device 101.

Device 101 may include radio 101r support radio-frequency (RF) communications with networks including a MNO 102 via standards such as GSM, UMTS, mobile WiMax, CDMA, LTE, LTE Advanced, 5G, and/or other mobile-network technologies. In a wireless configuration, the radio 101r may also provide connectivity to local networks such as 802.11 WLAN, Bluetooth, Zigbee, or an IEEE 802.15.4 network, among other possibilities. In exemplary embodiments, a radio 101r is connected to an antenna, which could be either internal to device 101 or external to device 101.

Note that device 101 may also optionally include user interface 101w which may include one or more devices for receiving inputs and/or one or more devices for conveying outputs. User interfaces are known in the art and thus user interfaces are not described in detail here. User interface 101w could comprise a touch screen if device 101 operates as a smartphone or mobile phone. Device 101 can optionally omit a user interface 101w, since no user input may be required for many M2M applications such as networked sensors, although a user interface 101w could be included with device 101. LED lights or a display of LEDs could also comprise a user interface 101w.

Memory 101m within device 101 can store cryptographic algorithms 101s, cryptographic parameters 101x, a device ephemeral public key infrastructure (PM) key pair comprising an device ephemeral private key 101i and a corresponding device ephemeral public key 101h, an optional device certificate 101c, a set of supported device PQC KEM parameters device.PQC-KEM.parameters 101f, device parameters or device extensions 101g, a key exchange mechanism (KEM) decapsulation function 101j, and a KEM encapsulation function 101k. In general, the depicted data within memory 101m can be stored within a nonvolatile memory 101m such as flash memory or a solid state drive or hard drive when power from device 101 is removed or the device is powered off. When power is supplied to device 101 or device 101 operates, for some embodiments, the device ephemeral private key 101i and the corresponding device ephemeral public key 101h may optionally only be stored in volatile memory such as RAM. When power is supplied to device 101 or device 101, the depicted data for memory 101m can be copied by processor 101p using a bus 101t from a nonvolatile memory 101m for device 101 into a volatile memory 101m.

Cryptographic algorithms 101s can include the steps and logic for processor 101p in device 101 to conduct in order for device 101 to securely communicate with network 103 and a first server 111. Cryptographic algorithms 101s can include at least symmetric ciphering algorithms, a random number generator, a key pair generation algorithm, digital signature algorithms, asymmetric ciphering algorithms, secure hash algorithms, and key exchange mechanisms (KEM). Cryptographic algorithms 101s can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Cryptographic algorithms 101s can use inputs of keys such as public keys, private keys, and/or symmetric keys along with cryptographic parameters 101x in order to for device 101 to process cryptographic data including ciphertext, key exchanges, and digital signatures.

Cryptographic parameters 101x can specify values or settings for (i) processing a KEM that supports post-quantum cryptographic algorithms such as KEM DECAPS 101j and KEM ENCAPS 101k, (ii) mutually deriving a shared secret, (iii) mutually deriving a symmetric ciphering key from the shared secret using a HMAC-based Extract-and-Expand Key Derivation Function (HKDF), (iv) using a symmetric ciphering algorithm with the symmetric ciphering key, and (v) using a digital signature algorithm. As contemplated herein, cryptographic parameters 101x may also be referred to as parameters 101x. Each of device 101 and network 103 can record at least compatible subset of parameters within a set of cryptographic parameters 101x. Parameters 101x can specify values for key length, key formatting (e.g. compressed or uncompressed), encoding rules, constants, numbers or variables for a post-quantum cryptography algorithm of a key exchange mechanism, etc.

Parameters 101x can specify values for a post-quantum cryptography algorithm of a digital signature algorithm.

In exemplary embodiments, cryptographic parameters 101x and cryptographic algorithms 101s (as well as cryptographic parameters 103x and cryptographic algorithms 103x for a network 103) can support post-quantum cryptography key exchanges or "key encapsulation mechanisms" (KEM) using lattice-based, code-based, or Supersingular Elliptic Curve Isogeny algorithms also referred to herein as "SIKE". These proposed algorithms are described by the Wikipedia PQC article. In other words, cryptographic parameters 103x and cryptographic algorithms 103s can support (i) classical cryptographic functions such as secure hash algorithms (e.g. SHA256 or SHA3-256, etc.) and symmetric ciphering (e.g. AES, Blowfish, ChaCha20, etc.), while also including (ii) support for PQC algorithms identified in Round 3 of the National Institute of Standards and Technology (MST) project for Post-Quantum Cryptography (PQC) Standardization, which is summarized in the Wikipedia PQC article.

In general, as contemplated herein, keys, cryptographic algorithms 101s or 103s, and parameters 101x or 103x supporting post-quantum cryptography (PQC) key exchange mechanisms (KEM) can be based on any of (i) lattice based algorithms, such as learning with errors, (ii) code based algorithms such as classic McEliece or BIKE or HQC, and (iii) ECC algorithms that based on Supersingular Elliptic Curve Isogeny, and other possibilities exist as well without departing from the scope of the present disclosure. In exemplary embodiments, keys, cryptographic algorithms 101s or 103s, and parameters 101x or 103x supporting post-quantum cryptography (PQC) key exchange mechanisms (KEM) are not based on (i) the integer factorization problem, (ii) the discrete logarithm problem, or (iii) the elliptic curve discrete logarithm problem.

In exemplary embodiments, the depicted KEM parameters of Device.PQC-KEM.Parameters 101f can comprise a set of parameters that comprise a subset of the cryptographic parameters 101x, where the depicted KEM parameters of Device.PQC-KEM.Parameters 101f pertain to parameters for different PQC key exchange mechanisms. Exemplary values of the depicted KEM parameters of Device.PQC-KEM.Parameters 101f are also depicted and described in connection with FIG. 8 below. Device 101 can select a subset of 101f-x of the set of KEM parameters 101f in order to generate a PM key pair and conduct a first KEM with a network. As contemplated herein, the subset 101f-x of the set of KEM parameters 101f can also be referred to as KEM parameters 101f-x Device 101 can select a subset 101f-x of the set of KEM parameters 101f in order to generate a PM key pair and conduct a first KEM with a network 103 using a first server 111. In an exemplary embodiment, subset 101f-x of the KEM parameters of Device.PQC-KEM.Parameters 101f or could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Device.PQC-KEM.Parameters 101f could specify families or groups of parameters for multiple different PQC KEM such as, but not limited to, Kyber, SIKE, BIKE, HQC, etc., and the subset 101f-x could comprise the parameters for using a specific KEM for the family or group (such as subset 101f-x specifying values for one of the equivalent levels of 128, 192, or 256 bits of security for a symmetric ciphering algorithms). Other post-quantum cryptographic algorithms and parameters could be supported as well for both the KEM parameters of Device.PQC-KEM.Parameters 101f and a subset 101f-x.

Note that in some exemplary embodiments, as described herein, the "first subset" 101f-x of KEM parameters 101f can be referred to as a "second subset" 101f-x of KEM parameters 101f for embodiments where network 103 selects a subset of KEM parameters 101f, such as KEM parameters 103f-y, before the device 101 selects the subset 101f-x. For the embodiments described in the previous sentence, then the network 103 (possibly using a second server 112 as depicted and described in connection with FIG. 2 below) could select the "first subset" 103f-y of KEM parameters 101f before the device selects the "second subset" 101f-x of KEM parameters 101f.

A device 101 could store one or a plurality of different device certificates cert.device 101c. Each of the different device certificates 101c could use different values for (i) a device identity such as a user name, (ii) a device static public key for verifying digital signatures generated by device 101, (iii) a different certificate issuer for generating a digital signature for the device certificate 101c, and/or (iv) a subset of cryptographic parameters 101s and cryptographic algorithms 101x for use with the device certificate 101c. In exemplary embodiments, the device certificate 101c can be formatted according to X.509v3 standards. The device identity in a device certificate 101c can be an international mobile subscriber identity (IMSI), a subscription permanent identifier (SUFI) according to 5G standards, or a network access identifier (NAI) as specified in IETF RFC 7542, and other possibilities exist as well without departing from the scope of the present disclosure.

Although not depicted in FIG. 1, device 101 can also store a private key corresponding to the public key in each device certificate cert.device 101c. In exemplary embodiments, the subset of cryptographic parameters 101s and cryptographic algorithms 101x for a device certificate cert.device 101c can support any of the digital signature algorithms as specified in Round 3 of the NIST PQC project, which are also identified in the Wikipedia PQC article. The device certificate cert.device 101c can be stored in nonvolatile memory such as a storage memory for memory 101m when device 101 is powered off or inactive, and then moved into volatile memory such as a RANI memory for memory 101m when device 101 operates.

Device 101 can include a set of device parameters or device extensions 101g for conducting a secure session with a network 103 and a first server 111. The device parameters 101g can include supported cipher suites supported by device 101 in establishing secure communications with network 103 and first server 111. The device parameters 101g can also be used for the "Extensions" fields within a "Client Hello" message such as a first message 202 as depicted and described in connection with FIG. 2 below. The device parameters 101g can include supported symmetric ciphering algorithms and modes, such as the Advanced Encryption Standard (AES) with a ciphertext chaining mode such as Electronic Code Book mode (ECB), Cipher Block Chaining mode (CBC), Galois/Counter Mode (GCM), etc.

Device parameters 101g can include supported secure hash algorithms, key lengths, and supported digital signature algorithms from cryptographic algorithms 101s. Device extensions 101g can also include supported cryptographic parameters 101x for use with the cryptographic algorithms 101s, and may also specify values for verifying digital signatures received from a network 103, such as, but not limited to, (i) supported certificate issuers including root certificates stored in the device 101 for the certificate issuers, and (ii) supported PQC digital signature algorithms, such as a digital signature cryptographic algorithm 103s' which can also be supported by a network 103 and second server 112.

Device 101 can include a PQC key pair generation algorithm PQC.KeyGen 101q from cryptographic algorithms 101s and the selected first subset 101f-x of KEM parameters 101f. Network 103 can include a compatible PQC key pair generation algorithm 103q from cryptographic algorithms 103s' described below. A PQC key pair generation algorithm 101q can use the selected first subset 101f-x of KEM parameters 101f in order to generate (i) a random number from a random number generator in order to derive a device ephemeral PM private key eSK.device 101h and (ii) a corresponding device ephemeral PM public key ePK.device 101i.

The device ephemeral private key eSK.device 101i can comprise a first private key for an exemplary lattice-based algorithm of Kyber768. In other words, the selected subset 101f-x could specify use of Kyber768. The KEM parameters 101f-x could specify values of the device ephemeral private key eSK.device 101i of n=256 and q=7681. The KEM parameters 101f-x that define keys and ciphertext could be set to du=11, dv=3 and dt=11. For Kyber768, the values of k could be 3 and n could be 4. Other values for KEM parameters 101f-x are possible as well without departing from the scope of the present disclosure, such as an exemplary lattice-based algorithm of Kyber1024. With Kyber 1024, the values associated KEM parameters 101f-y could be the same as above, except for the use of k=4 and n=5.

In an exemplary embodiments that use Kyber algorithms, PQC.KeyGen 101q can comprise "Algorithm 1 Kyber:CPA: KeyGen( ): key generation" from the paper "CRYSTALS—Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 101q can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 2 of the MST PQC project could be used for a PQC.KeyGen 101q function as well, without departing from the scope of the present disclosure.

Device 101 can store or record in memory 101m a KEM DECAPS function 101j in both (i) nonvolatile memory or storage memory when device 101 is powered off and (ii) volatile memory such as RAM when device 101 is operating. In summary, the selected first subset of parameters 101f-x and the generated or derived device ephemeral private key eSK.Device 101i can be used with the KEM DECAPS function 101j in order to convert a first received ciphertext C1 102c-1 into a first shared secret key K1 102k-1. The parameters and values used with the KEM DECAPS function 101j are depicted and described for a step 214 in FIG. 2 below and also in FIG. 4 below and also FIG. 8 below. The KEM DECAPS function 101j can be included in cryptographic algorithms 101s and support a plurality of different PQC key exchange mechanisms (KEM), such as any of the PQC KEM in Round 2 of the NIST PQC project.

Device 101 can store or record in memory 101m a KEM ENCAPS function 101k in both (i) nonvolatile memory or storage memory when device 101 is powered off and (ii) volatile memory such as RAM when device 101 is operating. A received subset of parameters Device.PQC-KEM.Parameters 101f, such as the second subset 103f-y (discussed in FIG. 2 below) could be used with KEM ENCAPS function 101k. The selected subset of parameters Device. PQC-KEM.Parameters 101f and a received server public key PK.server 103h can be used with the KEM ENCAPS function 101k in order to convert number such as, but not limited to, a random number for M2 219a into both (i) a ciphertext C3 102c-3 and a second shared secret key K2 102k-2. Note the ciphertext C3 102c-3 may be referred to herein as a third ciphertext, and device 101 may receive and process a second ciphertext C2 102c-3 (as depicted in a message 213 below in FIG. 2) before conducting the KEM ENCAPS function 101k. The parameters and values used with the KEM ENCAPS function 101k are depicted and described for a step 220 in FIG. 2 below and also in FIG. 5 below and also FIG. 8 below. The KEM ENCAPS function 101k can be included in cryptographic algorithms 101s and support a plurality of different PQC key exchange mechanisms (KEM), such as any of the PQC KEM in Round 2 of the MST PQC project.

Network 103 can comprise a collection of servers and also operate as a cloud service. As depicted for system 100 in FIG. 1, network 103 can communicate with device 101 through IP network 107. Network 103 can include a network identity of network ID 103a, which could comprise a domain name, a name, or a string or a series of numbers to uniquely identify network 103 in a system 100 and also within the Public Internet. In exemplary embodiments, at least a portion of network ID 103a can comprise a network access identifier for network 103. Network 103 can include at least a first server 111 and a second server 112 as depicted in FIG. 1. Although a single first server 111 an a single second server 112 is depicted for a network 103 in FIG. 1, a network 103 could include a plurality of servers 111 and servers 112, where each first server 111 can be identified using a different server identity of server ID 111a and each second server 112 can be identified using a different server identity for server ID 112a.

First server 111 can include hardware components similar to those of a device 101 depicted in FIG. 1, except generally with larger capacities appropriate for a first server 111. Exemplary hardware, software, and firmware components for a first server 111 are also depicted and described in connection with FIG. 10 below. First server 111 can also operate as a host computing environment with physical hardware for a virtual machine to operate as a guest computing environment. First server 111 can include a server identity of server ID 111a, which could comprise a domain name, a name, or a string to uniquely identify first server 111 in a system 100. In exemplary embodiments, at least a portion of server ID 111a can comprise a network access identifier for first server 111. For some embodiments, first server 111 and second server 112 can comprise a container such as, but not limited to, a container within the Docker or Kubernetes operating environments. For these embodiments, then the first server 111 can also be referred to as a "first container" and the second server 112 can also be referred to as a "second container".

A first server 111 can include server hardware 111h comprising random access memory (RAM) 111m, storage memory 111b, at least one system bus 111c, at least one WAN network interface 111d-1, at least one LAN network interface 111d-2, and at least one processor 111p. For a first server 111 operating in a network 103, first server 111 can include at least one processor 111p in order to store and record data as well as communicate with other nodes over an IP network 107, such as device 101 through an IP network 107. Processor 111p can also be referred to as a central processing unit (CPU) 111p or a "system on a chip" (SOC). Processor 111p can comprise a general purpose processor appropriate for the computational requirements for a first server 111, and may operate with multiple different processor cores, including field programmable gate arrays (FPGA).

A processor 111p can comprise exemplary ARM® based processors or an Intel® based processor such as belonging to the XEON® family of processors, and other possibilities exist as well. For some embodiments, the processor 111p could comprise a collection of transistors and related electrical components, including data channels supporting the RISC-V architectures. In exemplary embodiments, at least one processor 111p within first server 111 can be used to conduct the steps and message flows depicted in FIG. 2 below, as well as the steps for a first server 111 in FIG. 9 below. Additional details regarding processor 111p for first server 111 are depicted and described in connection with FIG. 1b below.

RAM 111a may comprise a random access memory for First server 111. RAM 111a can be a volatile memory providing rapid read/write memory access to processor 111p. RANI 111a could be located on a separate integrated circuit in first server 111. As depicted in FIG. 1, RAM 111a can include an operating system 111g such as based on Linux or Windows, and other possibilities exist as well. The operating system 111g (or some components or libraries for an operating system 111g) could also be stored within storage memory 111b and moved to RAM memory 111a during operation or power up or start of the first server 111. The system bus 111c may be any of several types of bus structures including a memory bus or memory controller, a peripheral bus, a network bus, and a local bus using any of a variety of bus architectures including a data bus. Additional details regarding RAM 111a and system bus 111c are depicted and described in connection with FIG. 10 below for a first server 111.

First server 111 may also operate a WAN network interface 111d-1, where WAN network interface 111d-1 can be used to connect and communicate with other nodes such as depicted in FIG. 1 and also FIG. 2 below. WAN network interface 111d-1 can comprise a physical interface connected to system bus 111c for first server 111. In exemplary embodiments, WAN network interface 111d-1 can comprise an Ethernet or fiber optic wired connection. WAN network interface 111d-1 can connect first server 111 to plurality of computing devices and other servers through networks such as the globally routable public Internet. In exemplary embodiments, WAN network interface 111d-1 supports an Ethernet data link layer protocol for connectivity to local area network (LAN) with a gateway, where the configuration of the WAN network interface 111d-1 specifies the use of the gateway on the LAN in order to send and receive data from Internet 107.

First server 111 may also operate a LAN network interface 111d-2, where LAN network interface 111d-2 supports communications within network 103, such as data transmitted and received with a second server 112 that stores a server static private key for authenticated KEM. For some embodiments, the depicted WAN network interface 111d-1 and the LAN network interface 111d-2 could be combined into a single network interface 111d which supports both (i) sending and received data through Internet 107 and (ii) sending and receiving data within network 103 such as with the second server 112.

Nonvolatile memory 111b or "storage" 111b (which can also be referred to herein as "storage memory 111b") within first server 111 can comprise a non-volatile memory for long-term storage of data, including times when first server 111 may be powered off. Storage memory 111b may be a NAND flash memory or a NOR flash memory and record firmware for first server 111, such as a bootloader program and an operating system. Storage memory 111b could also use spinning hard disk drives or solid state drives (SSD). Storage memory 111b could reside within a storage area network or shared set of storage devices, where the portion of nonvolatile or storage memory allocated to the first server 111 could comprise storage memory 111b. Additional details regarding storage memory 111b are depicted and described in connection with FIG. 1b below for a first server 111.

Cryptographic algorithms 103s can include the steps and logic for processor 111p in first server 111 to conduct in order for first server 111 and network 103 to securely communicate with device 101. Cryptographic algorithms 101s can include at least symmetric ciphering algorithms, a random number generator, a key pair generation algorithm, digital signature algorithms, asymmetric ciphering algorithms, secure hash algorithms, and key exchange mechanisms. Cryptographic algorithms 103s can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Cryptographic algorithms 103s can use inputs of keys such as public keys, private keys, and/or symmetric keys along with cryptographic parameters 103x in order to for first server 111 and network 103 to process cryptographic data including ciphertext, key exchanges, and digital signatures.

Cryptographic parameters 103x can specify values or settings for (i) processing a KEM that supports post-quantum cryptographic algorithms such as KEM ENCAPS 103k, (ii) mutually deriving a shared secret, (iii) mutually deriving a symmetric ciphering key from the shared secret using a HKDF or another key derivation function that uses secure hash algorithms, (iv) using a symmetric ciphering algorithm with the symmetric ciphering key, and (v) using a digital signature algorithm. As contemplated herein, cryptographic parameters 103x may also be referred to as parameters 103x. Each of device 101 and network 103 can record at least compatible subset of parameters within a set of cryptographic parameters 103x. Parameters 103x can specify values for key length, key formatting (e.g. compressed or uncompressed), encoding rules, constants, numbers or variables for a post-quantum cryptography algorithm of a key exchange mechanism, etc. Parameters 103x can specify values for a post-quantum cryptography algorithm of a digital signature algorithm.

In exemplary embodiments, (i) cryptographic parameters 103x and cryptographic algorithms 103s for a first server 111, and (ii) cryptographic parameters 103z and cryptographic algorithms 103s' for a second server 112, and (iii) cryptographic parameters 101x and cryptographic algorithms 101x for a device 101 can support post-quantum cryptography key exchanges or "key encapsulation mechanisms" (KEM) using lattice-based, code-based, or Supersingular Elliptic Curve Isogeny algorithms. These proposed algorithms are described by the Wikipedia article for "Post-Quantum Cryptography" dated Aug. 31, 2020, which is hereby incorporated by reference. In other words, cryptographic parameters 103x and cryptographic algorithms 103s can support (i) classical cryptographic functions such as secure hash algorithms (e.g. SHA256 or SHA3-256, etc.) and symmetric ciphering (e.g. AES, Blowfish, ChaCha20, etc.), while also including (ii) support for PQC algorithms identified in Round 3 of the National Institute of Standards and Technology (MST) project for Post-Quantum Cryptography (PQC) Standardization.

First server 111 can store or record in nonvolatile memory or storage memory 111b when first server 111 is powered off and (ii) volatile memory such as RAM 111m when operating a KEM ENCAPS function 103k. A received subset of parameters Server.PQC-KEM.Parameters 103f, such as subset 101f-x could be used with KEM ENCAPS function 103k. The received subset of parameters Server.PQC-KEM.Parameters 103f and a received device ephemeral public key ePK.device 101h can be used with the KEM ENCAPS function 103k in order to convert number such as, but not limited to, a random number for M1 208a into both (i) a first ciphertext C1 102c-1 and (ii) a first shared secret key K1 102k-1. The parameters and values used with the KEM ENCAPS function 103k are depicted and described for a step 209 in FIG. 2 below and also in FIG. 3 below and also FIG. 8 below. The KEM ENCAPS function 103k can be included in cryptographic algorithms 103s and support a plurality of different PQC key exchange mechanisms (KEM), such as any of the PQC KEM in Round 2 of the NIST PQC project.

First server 111 can include a set of server parameters or server extensions 103g for conducting a secure session with a device 101. The server parameters 103g can include supported cipher suites supported by first server 111 in establishing a secure session with device 101. The server parameters 103g can also be used for the "Extensions" fields within a "Server Hello" message such as a second message 213 as depicted and described in connection with FIG. 2 below. The server parameters 103g can include supported symmetric ciphering algorithms and modes, such as the Advanced Encryption Standard (AES) with a ciphertext chaining mode such as Electronic Code Book mode (ECB), Cipher Block Chaining mode (CBC), etc. Server parameters 103g can include supported secure hash algorithms, key lengths, and supported digital signature algorithms from cryptographic algorithms 103s. Server parameters 103g can also include supported cryptographic parameters 103x for use with the cryptographic algorithms 103s.

A network 103 could also include and operate a private IP network 107a. The private IP network 107a could comprise an intranet or packet switched network such that both (i) nodes connected to the private IP network 107a could communicate with each other, and (ii) the private IP network 107a could include IP addresses that are not routable on a public Internet 107. The first server 111 and the second server 112 could communicate with each other via private IP network 107a and the LAN interfaces 111d-2 and 111d-2'. First server 111 and second server 112 could be (i) located in geographically separate locations or datacenters and (ii) operated and controlled by a network 103 and (iii) connected to each other and additional servers within network 103 using a private IP network 107a.

A network 103 can also include and operate a second server 112. The second server 112 can comprise a physical form factor similar to a first server 111 as described above, with additional differences for a second server 112 described below. In exemplary embodiments, the second server 112 is connected to the private IP network 107a using a LAN interface 111d-2' and the second server 112 is not connected to a globally routable IP network 107. In other words, a device 101 connected to the IP network 107 would not be able to communicate directly with the second server 112 (such as sending a packet with an IP address of the second server 112 through the IP network 107), and device 101 or other devices on the IP network 107 would only be able to indirectly communicate with the second server 112 (e.g. send or receive data from second server 112) via a server such as the first server 111.

Second server 112 can also operate as a host computing environment with physical hardware for a virtual machine to operate as a guest computing environment. Second server 112 can include a server identity of server ID 112a, which could comprise a domain name, a name, or a string to uniquely identify second server 112 within a network 103. In exemplary embodiments, at least a portion of server ID 112a can comprise a network access identifier for second server 112. For some embodiments, second server 112 can comprise a container such as, but not limited to, a container within the Docker or Kubernetes operating environments.

A second server 112 can include server hardware 111h' comprising random access memory (RAM) 111m', storage memory 111b', at least one system bus 111c', at least one LAN network interface 111d-2', and at least one processor 111p'. The designations of a prime marker " ' " for the hardware components of a second server 112 and also associated with a first server 111 (e.g. server hardware 111h for a first server 111 and server hardware 111h' for a second server 112) indicates that the hardware can be similar for both a first server 111 and a second server 112. For a second server 112 operating in a network 103, second server 112 can include at least one processor 111p' in order to store and record data as well as communicate with other nodes over the private IP network 107a, such as the first server 111 through the private IP network 107a. Processor 111p' can also be referred to as a central processing unit (CPU) 111p' or a "system on a chip" (SOC). Processor 111p' can comprise a general purpose processor appropriate for the computational requirements for a second server 112, and may be equivalent to the CPU 111p for a first server 111.

Cryptographic algorithms 103s' within a second server 112 can include the steps and logic for processor 111p' in second server 112 to conduct for a KEM DECAPS 103j function as depicted and described below in connection with FIG. 2 and FIG. 3. Cryptographic algorithms 103s' can include at least a random number generator, KEM DECAPS functions, and secure hash algorithms.

Cryptographic algorithms 103s' can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Cryptographic algorithms 103s' can use inputs of keys such as a server static private keys, along with cryptographic parameters 103z in order to for second server 112 and network 103 to process asymmetric ciphertext C2 102c-2 received for a server private key SK.server 103i. The asymmetric ciphertext C2 102c-2 (generated using server public key PK.server 103h) can be used by the second server 112 to generate a shared secret value to be transmitted to a first server 111 and then the first server 111 can use the shared secret value to generate symmetric ciphering keys for communications with the device 101.

In exemplary embodiments, the depicted KEM parameters of Server.PQC-KEM.Parameters 103f can comprise a set of parameters that comprise a subset of the cryptographic parameters 103z, where the depicted KEM parameters of Server.PQC-KEM.Parameters 103f pertain to parameters for different PQC key exchange mechanisms (KEM). Exemplary values of the depicted KEM parameters of Server.PQC-KEM.Parameters 103f are also depicted and described in connection with FIG. 8 below. Note that Server.PQC-KEM.Parameters 103*f* can be different than Device.PQC-KEM.Parameters 101*f*, but in exemplary embodiments, at least one subset of parameters is commonly shared between a second server 112 and a device 101, such as the exemplary subset 103*f-y* as depicted and described in connection with FIG. 2 and FIG. 8 below.

Second server 112 can select a subset 103*f-y* of the set of KEM parameters 103*f* in order to select a server certificate 103*c* with a server static public key 103*h* and conduct a second KEM 101*k*/103*j* with a device 101. In an exemplary embodiment, subset 103*f-y* of the KEM parameters of Server.PQC-KEM.Parameters 103*f* could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Server.PQC-KEM.Parameters 103*f* could specify a family or group of parameters for a PQC KEM such as, but not limited to, Kyber, SIKE, BIKE, etc., and the subset 103*f-y* could comprise the parameters for using a specific KEM for the family or group (such as subset 103*f-y* specifying values for one of the equivalent levels of 128, 192, or 256 bits of security for a symmetric ciphering algorithms). Other post-quantum cryptographic algorithms and parameters could be supported as well for both the KEM parameters of Server.PQC-KEM.Parameters 103*f* and a subset 103*f-y*.

Figure 8:
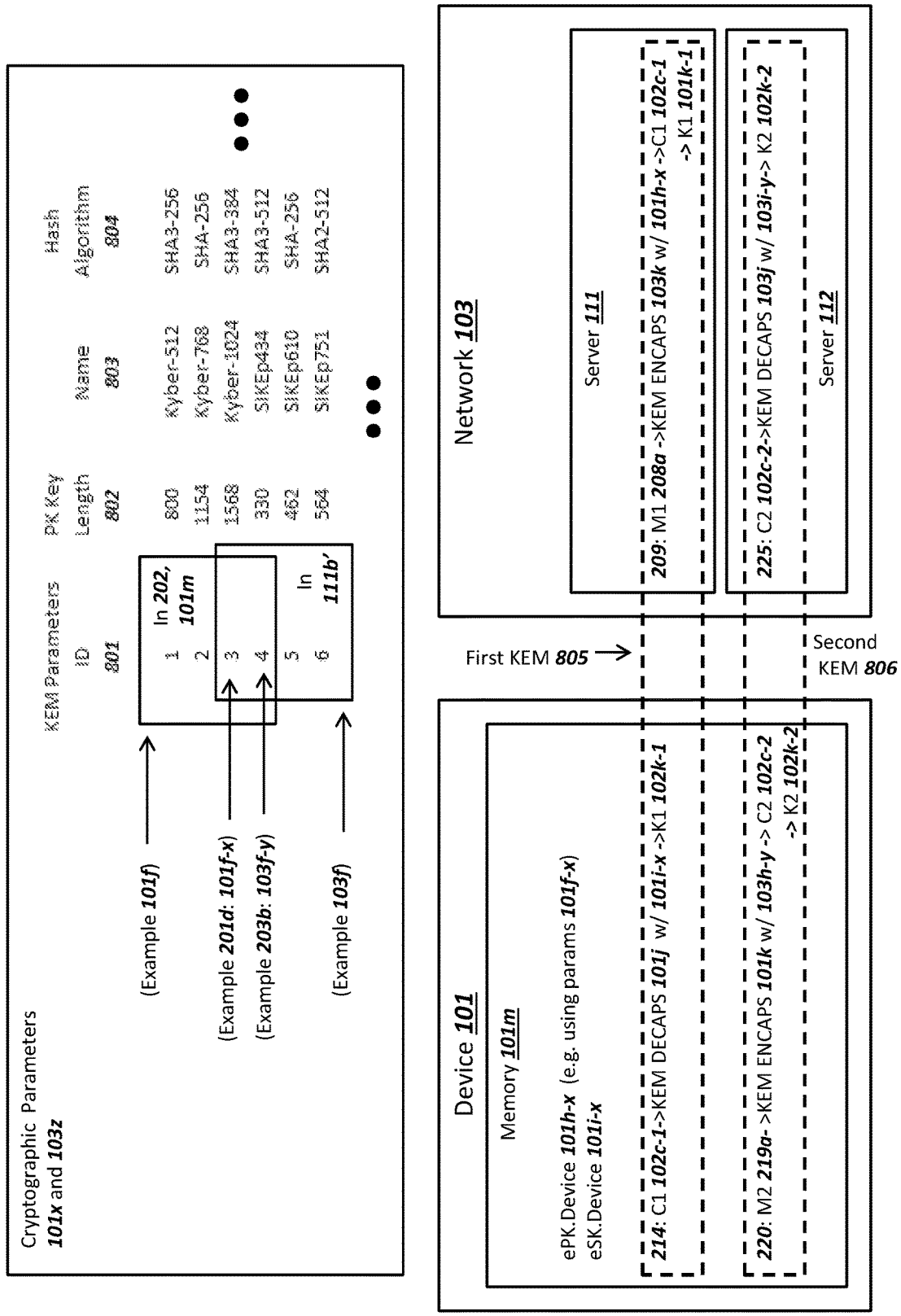
FIG. 8 is an illustration of (i) an exemplary set of cryptographic parameters for a key exchange mechanism stored and used by a device and a network, and (ii) conducting two KEM for each set of cryptographic parameters in accordance with exemplary embodiments.

For some preferred exemplary embodiments and as depicted in FIG. 8 below, the subset 103*f-y* of parameters selected by second server 112 can be different than the subset 101*f-x* selected by device 101, such as supporting a different KEM algorithm, including a different type or family. For other existing embodiments, the subset 103*f-y* can be the same as the subset 101-*x*, such as both second server 112 and device 101 using the same KEM algorithm and parameters for both the first KEM and second KEM.

Second server 112 can include a PQC key pair generation algorithm PQC.KeyGen 103*q* from cryptographic algorithms 103*s'* and the supported KEM parameters 103*f*. A PQC key pair generation algorithm 103*q* can use each of the KEM parameters 103*f* in order to generate (i) a random number from a random number generator in order to derive or generate a server static PM private key SK.server 103*i* and (ii) a corresponding server static PM public key PK.server 103*h*. The server static public key PK.server 103*h* for each of the supported KEM parameters 103*f* could be signed by a certificate authority and stored in a plurality of server certificates cert.server 103*c*. The plurality of server certificate cert.server 103*c* could be stored in a certificate database 112*d*. Although the use of a certificate database 112*d* is depicted as within a second server 112, for some embodiments the plurality of server certificates cert.server 103*c* could be stored in a first server 112. In preferred embodiments, the plurality of server static private keys SK.server 103*i* are stored within the second server 112 in order to increase security of a system 100, and for the embodiments described in the previous sentence then a certificate database 112*d* stored within a first server 111 could omit server static private key SK.server 103*i*.

In an exemplary embodiments that use Kyber algorithms, PQC.KeyGen 103*q* can comprise "Algorithm 1 Kyber:CPA:KeyGen( ): key generation" from the paper "CRYSTALS—Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 103*q* can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 2 of the MST PQC project could be used for a PQC.KeyGen 103*q* function as well, without departing from the scope of the present disclosure.

A second server 112 could use a certificate database 112*d* to store one or a plurality of different server certificates cert.server 103*c*. Each of the different server certificates 103*c* could use different values for (i) a network identity such as network identity network ID 103*a*, (i) a server identity such as a server name or server ID 111*a*, (ii) a static server static public key PK.server 103*h* for conducting authenticated KEM with a KEM DECAPS function 103*j* by second server 112, (iii) a different certificate issuer for generating a digital signature for the server certificate 103*c*, and/or (iv) a subset of KEM parameters 103*f-y* for use with the server certificate 103*c*. Server certificates 103*c* can also specify a PQC digital signature algorithm for a digital signature over at least the server static public key PK.server 103*h*, such that the server certificate 103*c* could be selected by network 103 in a form that could be supported by device 101. In other words, a single server static public key PK.server 103*h* could have multiple different server certificates 103*c*, each supporting a different digital signature algorithm, as well as different certificate authorities. In exemplary embodiments, the server certificates 103*c* can be formatted according to X.509v3 standards that can also support PQC cryptography. The server identity in a server certificate 101*c* can be a server ID 111*a* or network ID 103*a*, or a network access identifier (NAI) as specified in IETF RFC 7542, and other possibilities exist as well without departing from the scope of the present disclosure.

As depicted in FIG. 1, second server 112 and network 103 can use the certificate database 112*d* to store a static private key SK.server 103*i* corresponding to the public key PK.server 103*h* in each of the server certificates cert.server 103*c*. In exemplary embodiments, digital signatures for a server certificate cert.server 103*c* can support any of the digital signature algorithms as specified in Round 3 of the NIST PQC project, which are also identified in the Wikipedia PQC article. A server certificate cert.server 103*c* and certificate database 112*d* can be stored in nonvolatile memory such as a storage memory 111*b'* when second server 112 is powered off or inactive, and then moved into volatile memory such as a RAM memory 111*m'* for second server 112 when second server 112 operates or is connected to private IP network 107*a*. Additional details regarding the steps for a first server 111 and a second server 112 to select a specific server certificate cert.server 103*c* for communication with a device 101 are depicted and described in connection with FIG. 2 below.

Second server 112 can store or record a KEM DECAPS function 103*j* (i) in nonvolatile memory or storage memory 111*b'* when second server 112 is powered off and (ii) volatile memory such as 111*m'* when the second server 112 is operating. In summary, the selected second subset of KEM parameters 103*f-y* and the generated or derived server private key SK.server 103*i* can be used with the KEM DECAPS function 103*j* in order to convert a received second asymmetric ciphertext C2 102*c*-2 into a second shared secret key K2 102*k*-2. The parameters and values used with the KEM DECAPS function 103*j* are depicted and described for a step 225*a* in FIG. 2 below and also in FIG. 5 below and also FIG. 8 below. The KEM DECAPS function 103j can be included in cryptographic algorithms 103s' and support a plurality of different PQC key exchange mechanisms (KEM), such as any of the PQC KEM in Round 3 of the NIST PQC project.

FIG. 2

Figure 2:
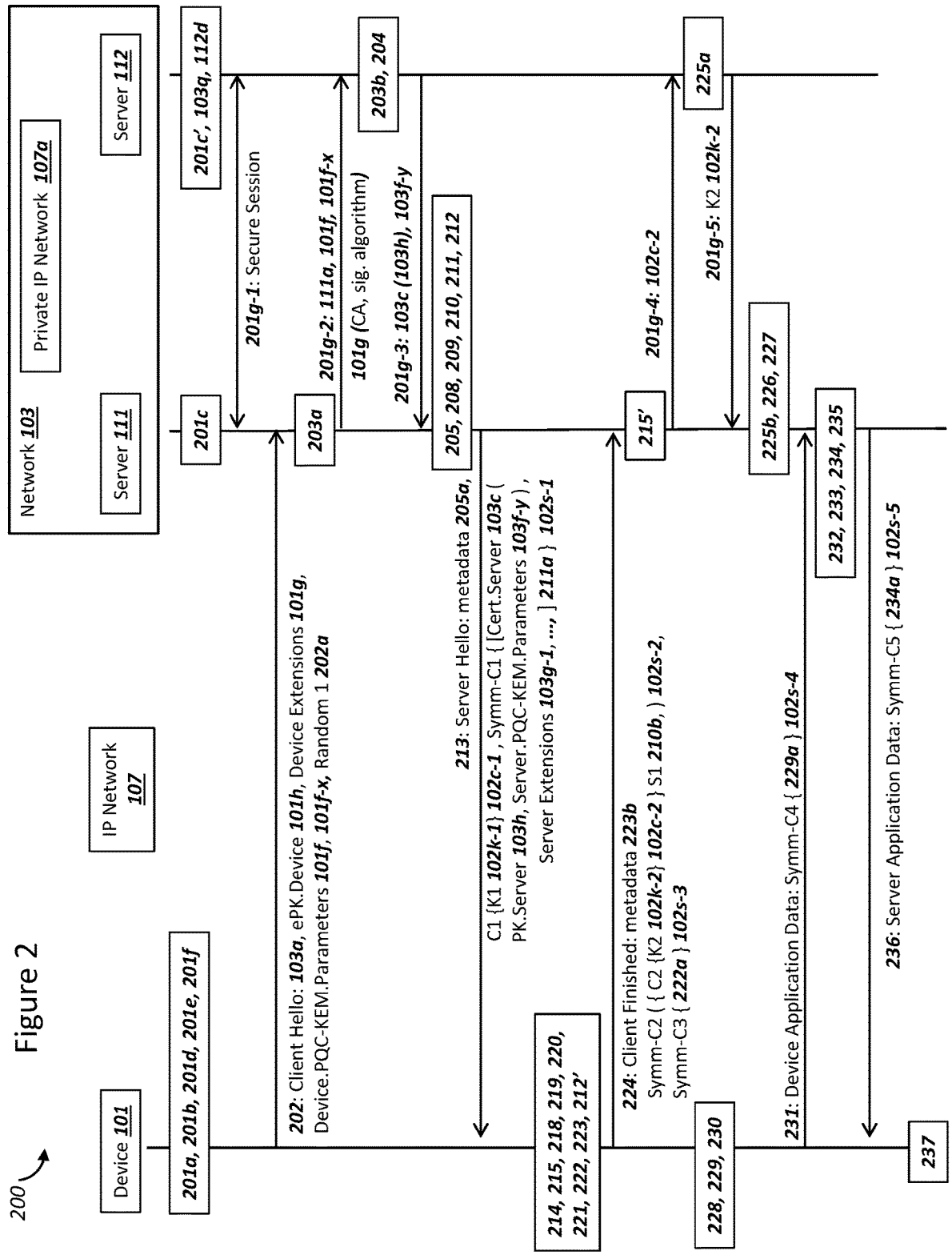
FIG. 2 is a simplified message flow diagram illustrating an exemplary system with exemplary data sent and received by a device and a network, in accordance with exemplary embodiments.

FIG. 2 is a simplified message flow diagram illustrating an exemplary system with exemplary data sent and received by a device and a network, in accordance with exemplary embodiments. System 200 can include a device 101, IP network 107, and a network 103. Network 103 can include and a first server 111 and a second server 112 operating within network 103, as well as a private IP network 107a. The nodes or entities within system 200 were also depicted and described in connection with FIG. 1 above, where FIG. 2 depicts exemplary steps for the nodes and exemplary message flows between the nodes. Although a single device 101, IP network 107, and network 103 are depicted in a system 200, a system 200 could include a plurality of each of the depicted nodes connected via different IP networks 107. In addition, data recorded for device 101 and network 103 depicted and described above in FIG. 1 can be received and stored in the device 101 and network 103 depicted in FIG. 2 during the steps and message flows depicted in FIG. 2.

At step 201a, device 101 could be manufactured. The electrical components depicted for device 101 in FIG. 2 could be assembled and connected, such as (i) mounting both RANI memory for device 101 memory 101m onto a circuit board and then also (ii) mounting flash memory or storage memory for device 101 memory 101m onto a circuit board for device 101. Sensors 101y and actuators 101z could be connected to a device 101 in a step 201a as well. Some firmware could be loaded into device 101 at a step 201a, such as storing a boot loader firmware within memory 101m in order for device 101 to being operating after power up. Some drivers could be loaded or stored within device 101 at a step 201a as well.

At step 201b, firmware and software can be stored or recorded in device 101 during manufacturing or a device distribution step. The firmware and software can be stored within nonvolatile memory or storage memory for memory 101m within device 101. The firmware and software can include device drivers used by processor 101p within device 101. Memory 101m may include a flash memory and record firmware and/or an operating system for device 101. Memory 101m can record or store long-term and non-volatile storage of data or files for device 101. Device 101 could also be distributed to end users during a step 201b after the loading of firmware and configuration data for device 101.

In an exemplary embodiment, an operating system with configuration settings is recorded in memory 101m in a step 201b. The operating system can include cryptographic algorithms 101s and cryptographic parameters 101x, where cryptographic algorithms 101s and cryptographic parameters 101x were depicted and described in connection with FIG. 1 above. Note that the set of parameters Device.PQC-KEM.Parameters 101f as first subset of cryptographic parameters 101x can be stored in device 101 at a step 201b. The firmware, operating system, and application software loaded in device 101 in a step 201b can include machine executable instructions for processor 101p in order for processor 101p to conduct the subsequent series of steps and message flows depicted for device 101 in FIG. 2 and also subsequent figures below.

A step 201b can include device 101 selecting a protocol for establishing a secure session with a network 103. As contemplated herein, a secure session can comprise communications between device 101 and network 103 where the data is both encrypted and at least authenticated using a certificate and digital signature for the server. In preferred exemplary embodiments, the encryption of data between device 101 and network 103 supports forward secrecy through the use of ephemeral PM key pairs. The secure session could support any of TLS, DTLS, SSH, a VPN such as WireGuard, IPSec, and other protocols are possible as well without departing from the scope of the present disclosure.

A step 201b can include device 101 selecting a protocol for establishing a secure session and then using subsequent steps and message flows as depicted herein in order to conduct the protocol for the secure session. The message flows depicted in FIG. 2 support TLS, but other protocols could be supported in a system 200 as well. The software or firmware loaded in a step 201b can include client software or firmware for device 101 to conduct the subsequent steps depicted herein, such as generating a Transport Layer Security (TLS) "client hello" message for message 202, receiving and processing a TLS "server hello" message for message 213, etc.

At a step 201c, first server 111 within network 103 can conduct a step equivalent to a step 201b by device above, where first server 111 is loaded is an operating system and configuration settings or parameters. The data could be stored within storage memory 111b. Prior to a step 201c, the electrical components for a first server 111 depicted as server hardware 111h in FIG. 1 above and FIG. 10 below could be assembled. A network 103 could perform the step 201c for a first server 111, such as a network administrator connecting to first server 111 and performing the steps. The operating system and associated application software for first server 111 can include cryptographic algorithms 103s and cryptographic parameters 103x. A step 201c could include first server 111 loading and operating a server package for processing secure sessions and messages such as OpenSSL, BouncyCastle, Secure Shell (SSH), an IP Security (IPSec) server, a VPN, and other possibilities exist as well for the server packages and application software loaded in a step 201c. In exemplary embodiments, first server 111 conducting the steps in FIG. 2 can comprise a virtual server operating on a host server, where the host server includes computing hardware 111h.

The firmware, operating system, and application software loaded in first server 111 in a step 201c can include machine executable instructions for processor 111p in order for processor 111p to conduct the subsequent series of steps and message flows depicted for first server 111 in FIG. 2 and also subsequent figures below. The software or firmware loaded in a step 201c can include host software or firmware for first server 111 to conduct the subsequent steps depicted herein, such as received and processing a Transport Layer Security (TLS) "client hello" message for message 202, processing and sending a TLS "server hello" message for message 213, etc.

At step 201c, first server 111 can also load the cryptographic algorithms 103s with a server process for conducting transport layer security such as TLS, where the server process could comprise software such as OpenSSL, Microsoft Server, etc. In addition, although TLS is described as a technology or protocol for a secure session in FIG. 2, other and related protocols could be used as well for processing digital signatures in the current disclosure, including IP Security (IPSec), Datagram Transport Layer Security (DTLS) with UDP messages, Secure Shell (SSH), WireGuard, and other possibilities exist as well.

At step 201c, server application software for conducting a secure session with device 101 such as a TLS server could be configured to support the use of a KEM ENCAPS function 103k, which is depicted and described in connection with FIG. 1 above. Note that the configuration step 201c could also specify a preference for the use of different cryptographic algorithms 103s for the KEM ENCAPS function 103k.

At a step 201c', second server 112 within network 103 can conduct a step equivalent to a step 201c by first server 111 above, where second server 112 is loaded is an operating system and configuration settings or parameters. The data could be stored within storage memory 111b' for a second server 112. Prior to a step 201c', the electrical components for a second server 112 depicted as server hardware 111h' in FIG. 1 above and FIG. 10 below and also above could be assembled and installed within a data center or a rack of servers. A network 103 could perform the step 201c' for a second server 112, such as a network administrator connecting to second server 112 and performing the steps. The operating system 111g' and associated application software for second server 112 can include cryptographic algorithms 103s' and cryptographic parameters 103z. At step 201c' the set of KEM parameters 103f, cryptographic algorithms 103s', and cryptographic parameters 103z could be stored within a nonvolatile memory or storage memory 111b' for the second server 112.

A step 201c' could include second server 112 loading and operating a server package for processing secure sessions and messages such as OpenSSL, BouncyCastle, Secure Shell (SSH), an IP Security (IPSec) server, a VPN such as WireGuard, and other possibilities exist as well for the server packages and application software loaded in a step 201c', including a plurality of software libraries for conducting both secure communications and cryptographic operations. In exemplary embodiments, second server 112 conducting the steps in FIG. 2 can comprise a virtual server operating on a host server, where the host server includes computing hardware 111h'.

The firmware, operating system, and application software loaded in second server 112 in a step 201c' can include machine executable instructions for processor 111p' in order for processor 111p' to conduct the subsequent series of steps and message flows depicted for second server 112 in FIG. 2 and also subsequent figures below. The software or firmware loaded in a step 201c' can include host software or firmware for second server 112 to conduct the subsequent steps depicted herein, such as establishing a secure sessions 201g-1 with the first server 111, receiving a message 201g-2, sending a message 201g-3, etc. At step 201c', second server 112 can also load the cryptographic algorithms 103s' with a server process for conducting a KEM DECAPS function 103j with a server private key SK.server 103i, where the server process could comprise software such as OpenSSL, Microsoft Server, etc. After a step 201c' to store an operating system 103g', KEM parameters 103f, and additional data described in the two paragraphs above, network 103 and second server 112 could conduct a key pair generation step 103q for (i) at least one, or (ii) each of the supported KEM parameters 103f. The use and operation of a key pair generation step 103q was also depicted and described in connection with FIG. 1 above. For the key pair generation step 103q, second server 112 could first select (i) at least one, or (ii) each of the supported subsets of KEM parameters 103f-y within KEM parameters 103f and generate a random number using a hardware random number generator 128' depicted and described in connection with FIG. 10 below. Second server 112 could then use the random number generated to input into the key pair generation step 103q in order to derive or generate both a server static private key 103i and a server static public key 103h for (i) at least one, or (ii) each of the supported subsets of KEM parameters 103f-y within KEM parameters 103f. The server static private key 103i and the server static public key 103h for the KEM parameters 103f-y could be stored in storage memory 111b' and/or RAM memory 111m' for use in subsequent steps by second server 112 and network 103. In other words, for the exemplary KEM parameters 103f depicted in FIG. 8 below, a network 103 and/or second server 112 could conduct a key pair generation step 103q for each of the different KEM parameters 103f depicted, and store a server PM key pair for each subset of KEM parameters 103f-y.

In exemplary embodiments, second server 112 could use a plurality of server private keys 103i and server public keys 103h for each of the KEM parameters 103f-y in order to generate or create a certificate database 112d, where the certificate database 112d is depicted in FIG. 2 and also depicted and described in connection with FIG. 1 above. Although not depicted in FIG. 2, for some exemplary embodiments, second server 112 could send each of the server static public keys 103h with the corresponding KEM parameters 103f-y for the server static public key 103h to a certificate authority using a "Certificate Signing Request" (CSR) and receive a server certificate cert.server 103c for the server static public key 103h. Consequently, the certificate database 112d depicted in FIG. 2 above could be loaded into RAM 111a' after a step 201c' with a server process started for querying the certificate database 112d.

At steps 201d through 201f, device 101 can begin operating and process data in order to generate a first message 202 for first server 111, where the first message 202 could comprise a "Client Hello" message. Steps 201d and subsequent steps in FIG. 2 can use the computing hardware in device 101 as depicted in FIG. 1 above, as well as the operating system and stored parameters within device 101 stored in a step 201b above. At step 201d, device 101 can power on or wake from a sleep state and then select either a network ID 103a or a server ID 111a for sending a first message 202. The IDs 103a or 111a could comprise domain names or IP addresses for connecting to the network 103.

Step 201d can include device 101 selecting device parameters 101g for use with a secure session between device 101 and first server 111. In some protocols such as TLS, the device parameters 101g can be referred to as extensions, such the device or client data for the section "4.2—Extensions" within IETF RFC 8446. Device parameters 101g were also described above in connection with FIG. 1, and can include identifiers or values for supported cryptographic algorithms 101s and cryptographic parameters 101x. Device parameters 101g can include supported cipher suites such as names for symmetric ciphering algorithms, secure hash algorithms, digital signature algorithms, etc.

Device parameters 101g selected in a step 201d can include an identity for a certificate issuer or certificate authority of supported by device 101. The identity for the certificate issuer can comprise a name or string recorded in a certificate issuer certificate root certificate or possibly an intermediate certificate issuer certificates stored within device 101. A value or field for device parameters 101g processed by device 101 in a step 201d can include a certificate request, such that a "Client Hello" message 202 can request certificates and at least one digital signature from network 103 that supports other fields or values in device parameters 101g such as specified supported digital signature algorithms in cryptographic algorithms 101s (e.g. Dilithium II, Falcon 512, Dilithium IV, Falcon 1024, etc.) in addition to the an identity of a supported certificate issuer by device 101.

At step 201d, device 101 can select a subset of the cryptographic parameters 101x for conducting a first KEM 103k/101j, where the selected subset can comprise Device.PQC-KEM.Parameters 101f. An exemplary selected subset of parameters Device.PQC-KEM.Parameters 101f are also depicted and described in connection with FIG. 8 below. During a step 201d, device 101 could also select KEM parameters 101f-x from the subset of parameters Device.PQC-KEM.Parameters 101f. In other words, at a step 201d, the parameters Device.PQC-KEM.Parameters 101f can include different supported families of PQC KEM, such as Kyber, BIKE, HQC, SIKE, etc, where the KEM parameters 101f-x can comprise a specific, identified KEM such as one of (i) Kyber-768 or (ii) SIKEp434 or (iii) BIKE security level 3, etc.

At step 201e, device 101 can use a PQC.KeyGen function 101q in FIG. 1 to generate a device ephemeral PM key pair comprising a device ephemeral public key ePK.device 101h and a device ephemeral private key eSK.device 101i. The algorithm used to generate the ephemeral PM key pair can be specified in KEM parameters 101f-x selected by device 101 in a step 201d above. In a step 201e, the device ephemeral PM key pair can comprise a key pair supporting key exchange mechanisms specified in Round 2 of the NIST "Post Quantum Cryptography" (PQC) project. Each KEM provides details for a KeyGen function, which could be used for a PQC.KeyGen function 101q in a step 201e. The device ephemeral public key ePK.device 101h generated in a step 201e can comprise the value of "Key Share" within a "Client Hello" message for a first message 202 below. Device 101 can also generate a random number for inclusion in the "Client Hello" message 202 below in a step 201e.

After the conclusion of a step 201e by device 101, device 101 can then conduct a step 201f to process a first message 202 as depicted in FIG. 2. A step 201f can use firmware or application software within device 101 in order to perform steps as specified in a protocol for a secure session between device 101 and network 103. The first message 202 can comprise a "Client Hello" message according to the protocol for the secure session selected by device in a step 201d. Device 101 can send a first message 202 comprising a "Client Hello" message (or equivalent for a different protocol than TLS) to the first server 111 operating in network 103 in a step 201f. A domain name for first server 111 or an IP address for first server 111, such as a server ID 111a, could be stored in device 101 at a step 201e. A step 201f can comprise processor 101p writing the data for the first message 202 to a radio 101r (or equivalently a network interface if device 101 does not include a radio 101r).

As depicted in FIG. 2, the first message 202 from device 101 to first server 111 can comprise a network ID 103a, the device ephemeral public key ePK.Device 101h generated in a step 201e, device parameters 101g selected in a step 201d, a set of parameters for conducting a PQC KEM of Device.PQC-KEM.Parameters 101f, and the subset of parameters 101f-x for the device ephemeral public key ePK.Device 101h and conducting a first KEM 103k/101j between device 101 and first server 111. In other words, Device.PQC-KEM.Parameters 101f can include multiple different KEM parameters and algorithms supported by device 101, such as those depicted for a Device.PQC-KEM.Parameters 101f in FIG. 8 below. As contemplated herein, Device.PQC-KEM.Parameters 101f can also be referred to as parameters 101f. Message 202 can include headers or values specifying the message is for a "Client Hello" according to the secure session protocol selected by the device 101. A first message 202 could also include a random number random 1 202a generated by device 101 for use in subsequent messages between device 101 and network 103.

First server 111 can receive the first message as a "Client Hello" message 202 via a WAN network interface 111d-1 in server hardware 111h (depicted for first server 111 in FIG. 1 above). First server 111 can use application software such as, but not limited to, OpenSSL with cryptographic algorithms 103s and cryptographic parameters 103x and server hardware 111h to process the received first message 202.

At step 203a, first server 111 can conduct a first step to process the "Client Hello" message 202. First server 111 can confirm the "Client Hello" message 202 is supported by first server 111 using the values within device parameters 101g, 101f, and 101f-x. First server 111 can validate that the device ephemeral public key ePK.device 101h received is properly structured and consistent with KEM parameters 101f-x. The device ephemeral public key ePK.device 101h can also be referred to as a key share. For example, if KEM parameters 101f-x state the key 101h supports the Kyber-786 algorithm, then in a step 203a first server 111 could at least verify the ePK.device 101h is 1184 bytes long and also can be successfully input into a KEM ENCAPS function 103k for first sever 111.

A step 203a can also include the first server 111 verifying or confirming that the received KEM parameters 101f-x for the device ephemeral public key ePK.device 101h are supported by the cryptographic parameters 103x and cryptographic algorithms 103s stored and used by the first server 111. In other words, in a step 203a, first server 111 can determine the selected KEM parameters 101f-x for the first KEM 103k/101j and ePK.device 101h are supported by first server 111 by cryptographic algorithms 103s and cryptographic parameters 103x. The first KEM 103k/101j associated with received KEM parameters 101f-x can be for (i) KEM ENCAPS 103k by first server 111 and (ii) KEM DECAPS 101j by device 101 as depicted and described in connection with FIG. 1 above.

The first server 111 can then send the second server 112 a message 201g-2 via the secure session 201g-1. The message 201g-2 can be communicated between the two servers 111 and 112 using the private IP network 107a. The first server 111 can use the LAN interface 111d-2 in order to send the message 201g-2 and the second server 111 can use the LAN interface 111d-2' to receive the message. In exemplary embodiments, the message 201g-2 can include sufficient information for the second server 112 to select a server certificate cert.server 103c with a server static public key PK.server 103h that is supported by device 101 as identified or listed within Device.PQC-KEM.Parameters 101f and Device Extensions 101g. Note that device extensions 101g can list both (i) digital signature algorithms supported by device 101 as well as certificate authorities, which device 101 could use in order to properly verify a server certificate cert.server 103c stored within a certificate database 112d.

For the exemplary embodiment depicted in FIG. 2, the message 201g-2 can include (i) a server ID 111a (which can be a domain name for a common name in a server certificate cert.server 103c), and (ii) the supported Device.PQC-KEM-.Parameters 101f by device 101, (iii) the selected KEM parameters 101f-x for the device ephemeral public key ePK.device, and (iv) at least a subset of device extensions 101g that include both supported certificate authorities or certificate issuers for device 101 as well as supported digital signature algorithms for verifying a server certificate cert. server 103c. For some embodiments the message 201g-2 could also include device extensions 101g', where device extensions 101g' comprise a subset of device extensions 101g that pertain to or are related to the verification of digital signatures and certificates (such as intermediate certificates) by device 101.

In a preferred exemplary embodiment, for a step 203b, second server 112 can select a second set of KEM parameters 103f-y that are both (i) different than the first set of KEM parameters 101f-x received in message 201g-2 and (ii) supported by or included within the set of KEM parameters 101f also received in a message 201g-2. The selection of a second set of KEM parameters 103f-y in a step 203b is also depicted and described in connection with FIG. 8 below. In summary, for a step 203b and in a preferred exemplary embodiment, second server 111 selects KEM parameters 103f-y for a second KEM 101k/103j, where the second KEM comprises (i) KEM ENCAPS 101k by device 101 and (ii) KEM DECAPS 103j by second server 111 as depicted and described in connection with FIG. 1 above.

Note that the above sentence also describes a second KEM 806 which is depicted and described in connection with FIG. 8 below.

In preferred exemplary embodiments, the KEM parameters 103f-y selected by second server 112 in a step 203b support at least the following criteria for KEM parameters 103f-y: (i) are included within a list or set of parameters 101f for device 101 received in message 202 from device 101 and message 201g-2 by the second server 112 in a message 201g-2, (ii) are included within a list or set of parameters 103f for second server 112 as supported by second server 112, and (iii) support a different family or type of PQC algorithms than KEM parameters 101f-x. In other words if (x) device 101 signals support of Kyber and SIKE algorithms in parameters 101f and selects Kyber for KEM parameters 101f-x and ePK.device 101h, and (y) second server 112 also supports Kyber and SIKE algorithms parameters 103f and cryptographic algorithms 103s', then for a step 203b second server 111 in preferred embodiments can select a SIKE algorithm for KEM parameters 103f-y. The selected KEM parameters 103f-y can be used by the second server 112 in order to select a server certificate cert.server 103c with a server static public key PK.server 103h that uses the selected KEM parameters 103f-y. The server static public key PK.server 103h can be used with the second KEM 101k/103j comprising KEM ENCAPS 101k and KEM DECAPS 103j. Other possibilities exist as well for the specific families of algorithms that could be specified in parameters 101f and 103f, received in 101f-x, and the selected in a step 203b by second server 111 for KEM parameters 103f-y without departing from the scope of the present disclosure.

At step 204, second server 112 can use the data or information for a message 201g-2 in order to select a server certificate cert.server 103c from a certificate database 112d. A second server 112 can use the selected KEM parameters 103f-y in a step 203b above in order to select a server certificate cert.server 103c and corresponding server static private key SK.server 103i from a certificate database 112d. The server certificate cert.server 103c with server static public key PK.server 103h selected in a step 204 can comprise the value or data for the "Server Certificate" fields within a "Server Hello" message for a second message 213 below. In some exemplary embodiments, at a step 204 a network 103 or second server 112 could select or derive a server public key 103h for the KEM parameters 103f-y selected in a step 203b above without requiring the use of a server certificate cert.server 103c. For these embodiments, the selected or derived server public key 103h (supporting KEM parameters 103f-y) and KEM parameters 103f-y could be received and/or stored by a first server 111 without requiring a second server 112 to send a server certificate cert.server 103c in a message 201g-3.

In exemplary embodiments, a second server 112 could support a plurality of first servers 111 where the plurality of first servers 111 also operate with different server IDs 111a, and the server IDs 111a could also comprise the domain names for the first servers 111. Consequently, in exemplary embodiments, the message 201g-2 can include the server ID 111a used by the first server 111. In exemplary embodiments, the server ID 111a in a message 201g-2 can comprise a common name, such as a domain name, which can also be in the server certificate cert.server 103c for the first server 111.

Although not depicted in FIG. 1, the series of messages 201g between the first server 111 and the second server 112 can include a session identifier or other identification information for each message flow 201g-1 through 201g-5, such that the first server 111 and second server 112 can associate the data with a device 101. In other words, a system 200 could include a plurality of devices 101, and a session identifier in the messages 201g can ensure the data communicated between the first server 111 and second server 112 is associated with operations supporting communication with a specific device 101 (e.g. the asymmetric ciphertext C2 102c-2 received by a second server 112 in a message 201g-4 below will be processed with a KEM DECAPS function 103j in a step 225a using the server static private key SK.server 103i for the server certificate cert.server 103c transmitted in a message 201g-3).

In some exemplary embodiments, the set of KEM parameters 103f-y (i) selected in step 204 to select (i) a server certificate cert.server 103c with a server static public key PK.server 103h and (ii) a corresponding server static private key SK.server 103i can be (ii) equal to or equivalent to KEM parameters 101f-x received in a message 202. In other words, some exemplary embodiments support device 101 and first server 111 using the exact same algorithm for both (i) a first KEM 103k/101j initiated by a device through KeyGen and sending a first public key of ePK.device 101h, and (ii) a second KEM 101k/103j initiated by a server through KeyGen and sending a second public key of PK.server 103h. In other exemplary embodiments, device 101 and network 103 use completely different algorithms with different algorithm types for both (i) the first KEM 103k/101j initiated by a device through KeyGen and sending a first public key of ePK.device 101h, and (ii) the second KEM 101k/103j specified by a network through sending a server certificate cert.server 103c with server static public key of PK.server 103h.

In a first exemplary embodiment, (i) the first KEM 103k/101j initiated or selected by device 101 using ePK.device 101h supports lattice based algorithms, and (ii) the second KEM 101k/103j selected or specified by second server 112 using PK.server 103h in cert.server 103c supports Supersingular Isogeny Key Encapsulation (SIKE). In a second exemplary embodiment, (i) the first KEM 103k/101j initiated or selected by device 101 using ePK.device 101h supports lattice based algorithms, and (ii) the second KEM 101k/103j selected or specified by second server 112 using PK.server 103h in cert.server 103c supports code based algorithms. In a third exemplary embodiment, (i) the first KEM 103*k*/101*j* initiated or selected by device 101 using ePK.device 101*h* supports code based algorithms, and (ii) the second KEM 101*k*/103*j* selected or specified by second server 112 using PK.server 103*h* in cert.server 103*c* supports lattice based algorithms.

In a fourth exemplary embodiment, (i) the first KEM 103*k*/101*j* initiated by device 101 using ePK.device 101*h* supports code based algorithms and (ii) the second KEM 101*k*/103*j* selected or specified by second server 112 using PK.server 103*h* in cert.server 103*c* supports Supersingular Isogeny Key Encapsulation. In a fifth exemplary embodiment, (i) the first KEM 103*k*/101*j* initiated by device 101 using ePK.device 101*h* supports Supersingular Isogeny Key Encapsulation and (ii) the second KEM 101*k*/103*j* selected or specified by second server 112 using PK.server 103*h* in cert.server 103*c* supports code based algorithms. In a sixth exemplary embodiment, (i) the first KEM 103*k*/101*j* initiated by device 101 using ePK.device 101*h* supports Supersingular Isogeny Key Encapsulation and (ii) the second KEM 101*k*/103*j* selected or specified by second server 112 using PK.server 103*h* in cert.server 103*c* supports lattice based algorithms.

For the six embodiments described above in the previous two paragraphs, lattice based algorithms could comprise any of CRYSTALS-KYBER, NTRU, SABER, FrodoKEM and NTRU Prime. For the six embodiments described above in the previous two paragraphs, code based algorithms could comprise any of BIKE, Classic McEliece, and HQC. The algorithms described in the previous sentence are specified in "Round 3" of the Wikipedia PQC article.

At step 204, second server 112, can use data from a message 201*g*-2 such as device extensions 101*g* to select a server certificate cert.server 103*c* that supports the KEM parameters 103*f*-*y* discussed selected in a step 203*b* above. Server certificate cert.server 103*c* can use a digital signature algorithm and a digital signature from a certificate authority in order for device 101 to verify the server certificate cert.server 103*c*. Device extensions 101*g* can specify a PQC digital signature algorithm (e.g. Dilithium IV, Falcon 1024, etc.) as well as (ii) at least on certificate authority or certificate issuer supported by device 101 in extensions 101*g*, such as the name or identity for a root certificate issuer certificate stored by device 101. In this manner, the data from a message 201*g*-2 can be sufficient for a second server 112 to select a server certificate cert.server 103*c* and a corresponding server static private key SK.server 103*i* from a certificate database 112*d* in a network 103 or second server 112, where the selected server certificate cert.server 103*c* can be supported and verified by a device 101.

At the conclusion of a step 204, second server 112 can identify and store a cert.server 103*c* for subsequent steps and messages in FIG. 2 that would be compatible with device 101. In exemplary embodiments, the server certificate of cert.server 103*c* supports at least a subset of both device extensions (or parameters) 101*g* and server extensions (or parameters) 103*g*. In addition, for some embodiment a step 203*a* above could comprise the first server 111 selecting a subset of server extensions 103*g* comprising the subset server extensions 103*g*-1. The first server 111 could send the subset of server extensions 103*g*-1 to the second server 112 in a message 201*g*-2, and the second server 112 could select the server certificate cert.server 103*c* using the received and selected subset of server extensions 103*g*-1.

For some embodiments, a first server 111 could store a certificate database 112 (but preferably without the server static private key SK.server 103*i*) and the first server 111 could conduct the steps 203*b* and 204 in order to select the server certificate 103*c* with server static public key PK.server 103*h*. For these embodiments, a message 201*g*-2 and message 201*g*-3 could be omitted, but the messages 201*g*-3 and 201*g*-4 below can be communicated between first server 111 and second server 112 in order for second server 112 to conduct a KEM DECAPS function 103*j* with the server static private key SK.server 103*i* corresponding to the server static public key PK.server 103*h* in the server certificate cert.server 103*c*.

After a step 204, the second server 112 can send the first server 111 a message 201*g*-3 where the message 201*g*-3 can include the server certificate cert.server 103*c* selected in a step 204. An exemplary server certificate cert.server 103*c* was depicted and described in connection with FIG. 1 above. The message 201*g*-3 can include the set of KEM parameters 103*f*-*y* for the server static public key PK.server 103*h*. The selected server certificate cert.server 103*c* can also include a digital signature using cryptographic algorithms 103*s*' that are also supported or specified in device parameters 101*g*. The selected server certificate cert.server 103*c* can also include a digital signature from a certificate authority or certificate issuer that are also supported or specified in device parameters 101*g*.

At step 205, first server 111 can also select metadata 205*a*, where metadata 205*a* can include parameters or values used for the subsequent generation of both a first ciphertext C1 102*c*-1 and a first symmetric ciphertext symm-C1 102*s*-1. As one example, metadata 205*a* could include values or a name for (i) KEM parameters 101*f*-*x* that identify the first ciphertext C1 102*c*-1 supports the KEM parameters 101*f*-*x*, and (ii) a symmetric ciphering algorithm used to generate the first symmetric ciphertext symm-C1 102*c*-1. As a second example, the metadata 205*a* could include an initialization vector for the second ciphertext C2 103*c*-2 and also an identity of the symmetric ciphering algorithm (such as "AES") and a chaining mode (e.g. ECB, CBC, CGM, etc.). For some embodiments, initialization vectors could be mutually derived using shared secret keys and HKDF, and the initialization vectors could be omitted from metadata for messages.

At step 205, first server 111 can also select server extensions 103*g*-1 used by the server in generating a subsequent "Server Hello" message. Note that server extensions 103*g*-1 can be a subset of the supported server extensions 103*g* described in FIG. 1 above. First server 111 can use both (i) the received device extensions 101*g* from a "Client Hello" message 202 and (ii) stored parameters and algorithms from for server extensions 103*g* in order to select a compatible and preferred set of server extensions 103*g*-1 that would also be supported by device 101. Server extensions 103*g*-1 can select subsets of algorithms or parameters offered or proposed by device 101 in the "Client Hello" message 202. A step 205 can include the first server 111 selecting server extensions 103*g*-1 that supports both (i) received device extensions 101*g* and (ii) parameters or values within the server certificate cert.server 103*c*, such as KEM parameters 103*f*-*y*, a digital signature algorithm (e.g. a version of Falcon, Dilithium, etc.), as well as a certificate authority or certificate issuer for verifying server certificate cert.server 103*c*.

A portion of the subsets of algorithms or parameters offered or proposed by device 101 in the "Client Hello" message 202 can also be included in metadata 205*a*, such as specifying a specific symmetric ciphering algorithm and parameters for the first symmetric ciphertext symm-C1 102*s*-1. In other words, device 101 could use metadata 205*a* in order to process and decrypt the first symmetric ciphertext symm-C1 102s-1 (where metadata 205a would normally be plaintext in order to device 101 to process the symmetric ciphertext). For embodiments of the present invention, the server extensions 103g-1 selected by a first server 111 in a step 205 can include both (i) a digital signature algorithm for verifying a digital signature in a server certificate cert.server 103c and (ii) symmetric ciphering parameters for processing a first symmetric ciphertext symm-C1 102s-1.

At step 208, first server 111 can derive or generate a random number M1 208a for use in a first KEM 103k/101j between first server 111 and device 101. At step 208, first server 111 can select data and values for processing a "Server Hello" message 213. In exemplary embodiments the data or values for a "Server Hello" message 213 can include at least (i) the server certificate cert.server 103c selected in a step 204 above, and (ii) server extensions 103g-1 from a step 205. Note that the server certificate cert.server 103c can include (i) the server static public key PK.server 103h, (ii) the second set of KEM parameters for the server static public key PK.server 103h of 103f-y (where the first set of KEM parameters 101f-x can be for the device ephemeral public key ePK.device 101h). Thus, (i) the second set of KEM parameters 103f-y can be values for a subset of Server.PQC-KEM.Parameters 103f and (y) the first set of KEM parameters 101f-x can be for the device ephemeral public key ePK.device 101h.

Note that additional data or values could be selected in a step 208 for a "Server Hello" message 213, such as optionally including (i) the device ephemeral public key ePK.device 101h or (ii) a secure hash value over the device ephemeral public key. Since many PQC KEM algorithms have longer public keys compared to classical ECC or RSA algorithms, consequently including the full device ephemeral public key in a response "Server Hello" message may not be preferred in order to keep message length sizes down to more reasonable levels. But, in some exemplary embodiments, a step 208 for first server 111 could process and store a secure hash value such as an exemplary 160 bits for RIPEMD 160 or 256 bits for SHA-256 over ePK.device 101h, and the secure hash value could be selected as included in the "Server Hello" message at a step 208. Or, for some exemplary embodiments, both the full device ephemeral public key and a secure hash value for the device ephemeral public key could be omitted from including in a "Server Hello" message at a step 208.

At step 209, first server 111 can use both (i) the received device ephemeral public key of ePK.device 101h and (ii) the specified subset of KEM parameters 101f-x for the device ephemeral public key and the first KEM 103k/101j in order to generate both (x) a first ciphertext C1 102c-1 and (y) a first shared secret key K1 102k-1. At step 209, first server 111 can use a KEM ENCAPS function 103k with both (i) and (ii) from the previous sentence as well as M1 208a in order to generate both (x) a ciphertext C1 102c-1 and (y) a first shared secret key K1 102k-1. A summary of the step 209 by first server 111 with a KEM ENCAPS function 103k was also depicted and described in connection with FIG. 1 above. A first server 111 can use both cryptographic algorithms 103s and cryptographic parameters 103x in order to conduct the step 209. The function and use of a step 209 and a KEM ENCAPS function 103k is also depicted and described in FIG. 3 below.

At step 210, first server 111 can use a HMAC-based Extract-and-Expand Key Derivation Function (HKDF) 210a (depicted and described in FIG. 3 below) with at least the first shared secret key K1 102k-1 output from KEM ENCAPS function 103k in order to generate both (i) a first symmetric ciphering key of S1 210b and a first message authentication code (MAC) key MAC1 210c. As contemplated herein, a HKDF can also be referred to as a "HMAC-based Extract-and-Expand Key Derivation Function" as specified in IETF RFC 5869, which is herein incorporated by reference in its entirety. In exemplary embodiments, additional data mutually shared between device 101 and first server 111 besides the first shared secret key K1 102k-1 can also be input into the HKDF 210a in a step 210 in order to generate S1 210b and MAC1 210c. The additional data input into HKDF 210a can comprise data from the message 202, such as, but not limited to, the device ephemeral public key ePK.device 101h from device 101, device extensions 101g, and/or parameters 101f and 101f-x, as well as random 1 202a from a message 202.

Other data from a message 202 can be used for input into a HKDF 210a, in addition to the first shared secret key K1 102k-1, without departing from the scope of the present disclosure, such as, but not limited to, (i) a network ID 103a or a server ID 111a that can be included in a message 202, as well as (ii) portions of metadata 205a. For other embodiments, the input of additional data from a message 202 into a HKDF 210a besides K1 102k-1 could be omitted, and S1 210b and MAC1 210c could be derived from K1 102k-1. The function and use of a step 210 using output from KEM ENCAPS function 103k of at least K1 102k-1 and a HKDF 210a is also depicted and described in FIG. 3 below.

At step 211, first server 111 can select and process a plaintext 211a for encryption into a first symmetric ciphertext symm-C1 102s-1. A step 211 is also depicted and described in connection with FIG. 3 below. Note that the first asymmetric ciphertext C1 102c-1 could be previously output from the KEM ENCAPS function 103k (where device 101 uses the first ciphertext C1 102c-1 for the first KEM 103k/101j). In exemplary embodiments the data or values for the plaintext 211a selected in a step 211 can include at least (i) the server certificate cert.server 103c selected in a step 204 above and associated data of the server public key PK.server 103h and KEM parameters 103f-y for the server public key PK.server 103h, and (ii) server extensions 103g-1 from a step 205, as well as random number random 1 202a from a message 202.

As described for a server certificate cert.server 103c in FIG. 1 and also in FIG. 2 above, the server certificate cert.server 103c can include at least (i) the server static public key PK.server 103h, (ii) the second set of KEM parameters 103f-y for the server static public key PK.server 103h, as well as data common for a server certificate such as the specification of a digital signature algorithm and a certificate issuer and public key for the certificate issuer for verification of the digital signature in the server certificate cert.server 103c. Additional data could be included in plaintext 211a (such as OSCP stapling values, intermediate certificates for verifying cert.server 103c, etc.) or some data listed above could be omitted from plaintext 211a without departing from the scope of the present disclosure. In exemplary embodiments, the digital signature algorithm for a server certificate cert.server 103c can support any of the PQC digital signature algorithms identified in Round 3 of the NIST PQC standardization project (as identified in the Wikipedia PQC article).

At step 212, first server 111 can use symmetric encryption 212a with the plaintext 211a from a step 211 in order to generate the first symmetric ciphertext symm-C1 102s-1. A step 212 is also depicted and described in connection with FIG. 3 below. The symmetric encryption 212a can be included within cryptographic algorithms 103s for first server 111. The symmetric encryption 212a can include input of the parameters specified in metadata 205a from a step 205 above and the symmetric ciphering key S1 210b and MAC key MAC1 210c from a step 210 above. In a step 212, first server 111 can also use an initialization vector for the symmetric encryption 212a, where the initialization vector can be included with metadata 205a or derived from HKDF 210a.

As depicted in FIG. 2, first server 111 can then send device 101 a response second message 213, where the response second message can also comprise a "Server Hello" message. The response second message 213 can include (i) metadata 205a from a step 205 above, (ii) the first ciphertext C1 102c-1 output from the KEM ENCAPS function 103k, and (iii) the first symmetric ciphertext symm-C1 102s-1 output from step 212. Additional data could be included in a response second message 213 without departing from the scope of the present disclosure. Note that although a message 213 with a depicted ciphertext of C1 102c-1 shows the value K1 102k-1 within brackets, the actual first shared secret key K1 102k-1 may normally not be included within the ciphertext. In other words, the depicted ciphertext of C1 102c-1 includes sufficient data for device 101 to use the C1 102c-1 with the KEM DECAPS 101j function to generate the first shared secret key K1 102k-1. The previous two sentences also apply for the second asymmetric ciphertext C2 102c-2 for a message 224 below. Likewise, although a message 213 also depicts the value for the first symmetric ciphering key "S1 210b" within the message 213 also using brackets, as contemplated by the present disclosure, the symmetric ciphering keys S1, S2, S3 and corresponding MAC keys are not transmitted with the symmetric ciphertext. The depiction of data with the symmetric keys and brackets for depicted message flows shows the data within the brackets is ciphered with the symmetric ciphering keys.

For some embodiments, the portions of data for a response second message 213 of metadata 205a, the first asymmetric ciphertext 102c-1, and the first symmetric ciphertext symm-C1 102s-1 could be sent as separate segments, portions, or sub-messages, where the aggregate delivery of the data for metadata 205a, the first asymmetric ciphertext 102c-1, and the first symmetric ciphertext symm-C1 102s-1 can represent the response second message 213. Note the first message 202 and the messages 224, 231, etc. below could likewise be separated into different segments or portions, where the collective segments or portions for each message represent the full message.

The first symmetric ciphertext symm-C1 102s-1 in a response second message 213 can include encrypted data for (i) the server static public key PK.server 103h, (ii) the KEM parameters 103f-y for the server static public key PK.server 103h which can be selected in a step 203b above, (iii) selected server extensions 103g-1 which were selected in a step 205 above, and (iv) the server certificate cert.server 103c, which can also be selected in a step 204 above.

Although message 213 depicted in FIG. 2 illustrates the (i) server static public key PK.server 103h and (ii) the KEM parameters 103f-y for the server static public key PK.server 103h as included within a server certificate cert.server 103c, for some exemplary embodiments the server static public key PK.server 103h and KEM parameters 103f-y could be included within the first symmetric ciphertext symm-C1 102s-1 without being stored or transmitted within a server certificate cert.server 103c. For these embodiments, the depicted server public key "PK.server 103h" could comprise an ephemeral server public key 103h', where the network 103 conducts the PQC KEYGEN function 103q for each message 202 received from a device 101.

For embodiments where PK.server 103h comprises an ephemeral server public key ePK.server 103h', then both (i) a separate server certificate cert.server 103c' for digital signatures and (ii) a digital signature over at least the ephemeral server public key ePK.server 103h' could be included within the message 213 and first symmetric ciphertext symm-C1 102s-1. In other words, although the use of the term "server static public key PK.server 103h" is used within the present disclosure, for some embodiments, the equivalent "server ephemeral public key ePK.server 103h'" could be used instead. For these embodiments where an ephemeral server PM key pair is used with the send KEM 101k/103j, a network 103 and could use an ephemeral server private key eSK.server 103i' instead of the server static private key PK.server 103i.

Consequently, static server PM keys for server public key 103h and server private key 103' are not required in order to obtain the security benefits of the present disclosure, and ephemeral PM keys for a server public key 103h' and server private key 103i' could be used instead. For these embodiments with ephemeral server PM keys, then the inclusion of both (i) and (ii) described in the paragraph above for a message 213 and first symmetric ciphertext symm-C1 102s-1 could be used to authenticate that the ephemeral server public key ePK.server 103h' is for a network 103. The device 101 could use (i) and (ii) from the paragraph above in order to verify that the ephemeral server public key ePK.server 103h' (instead of a server static public key 103h in a server certificate cert.server 103c) is from a network 103 where device 101 receives the message 213. After authentication of the ephemeral server public key ePK.server 103h', the device 101 could conduct the step 214 below with the ePK.server 103h' instead of a server static public key PK.server 103h.

In addition, although the present disclosure uses the term "server static public key 103h" as well as "server static private key 103i", the server public key and private key could be semi-static instead of completely static over the lifetime of servers 111 and 112 and/or network 103 without departing from the scope of the present disclosure. In other words, the equivalent terms "server public key 103h" and "server private key 103i" could be substituted for "server static public key 103h" and "server static private key 103i" throughout the present disclosure without departing from the scope of the disclosure. The server public key 103h could be "semi-static" in the sense the key could remain valid for a period of at least day or longer (e.g. including as long as a year or longer) and also be used in communications with a plurality of devices 101. An ephemeral server public key 103h' described in the paragraph above could be valid for a period of less than a day and may also be used in communication with a single device 101. For some embodiments, a "server public key 103h" as described in this paragraph and the key 103h throughout the present disclosure could comprise a server ephemeral public key. Likewise, a "server private key 103i" described in this paragraph and the key 103i throughout the present disclosure could comprise a server ephemeral private key.

Device 101 can receive the response second message 213 and conduct a series of steps in order to process the message and securely send application data from the device to the server. At step 214, device 101 can use (i) the specified KEM parameters 101f-x transmitted in message 202 along with (ii) cryptographic algorithms 101s to conduct the KEM DECAPS 101*j* function with the received first asymmetric ciphertext C1 102*c*-1. The device 101 can use the device ephemeral private key of eSK.device 101*i* with the KEM DECAPS 101*j* and the received first ciphertext C1 102*c*-1 in order to generate the first shared secret key K1 102*k*-1. A step 214 for device 101 is also depicted and described in connection with FIG. 4 below. Note that for some PQC algorithms, the KEM DECAPS 101*j* function could fail for a small frequency of messages 202 and 213, such as less than one failure per million or billion KEM messages, and if a step 214 fails, then device 101 could send first server 111 an error message and then return to a step 201*d* to repeat the generation of a different message 202.

A step 214 can also include device 101 using the first shared secret key K1 102*k*-1 with the HKDF 210*a* (depicted in FIG. 4 below) in order to generate the first symmetric ciphering key S1 210*b* and the first MAC key MAC1 210*c*. Note that the HKDF 210*a* can also include input data from message 202 in addition to the first shared secret key K1 102*k*-1, which was described for a HDKF 210*a* for first server 111 above, and also for the step 214 below in FIG. 4. The data input into HKDF 210*a* by device 101 and first server 111 (in step 210) would be identical in exemplary embodiments in order for the HKDF 210*a* to output the same values for device 101 and first server 111. At the conclusion of a step 214, device 101 can store the first symmetric ciphering key S1 210*b* and first MAC key MAC1 210*c*, which are mutually and secretly shared between device 101 and first server 111.

A step 214 can include device 101 calculating two values for the symmetric ciphering key S1 210*b*, where (i) a first S1 210*b*-1 can be for use by device 101 for symmetric encryption of plaintext data into ciphertext for transmission to first server 111, and (ii) a second S1 210*b*-2 can be for use by device 101 for symmetric decryption of ciphertext data from first server 111 into plaintext data. Likewise, device 101 in a step 214 can generate two values for MAC key MAC1 210*c*, where the first MAC1 is used by device 101 to generate MAC codes for first server 111 and the second MAC1 is used by device 101 to verify MAC codes for first server 111. A first server 111 can likewise use the HKDF 210*a* to generate all of the same first S1 210*b*-1, the second S2 210*b*-2, the first MAC1 201*c*-1 and the second MAC 210*c*-2.

In the exemplary embodiment for the step 212' below for device 101, the device 101 can use the first S1 210*b*-1 for encryption, and for the step 215 below device 101 could use the second S1 210*b*-2 for decryption. In other words, although the present disclosure uses the term "first symmetric ciphering key S1 210*b*", the "first symmetric ciphering key S1 210*b*" output from a HKDF 210*a* can comprise two components of: (i) key S1 210*b*-1 for symmetric encryption by device and (ii) key S1 210*b*-2 for symmetric decryption by device 101. Likewise, the first server 111 can output from the same HKDF 210*a* the key S1 210*b*-1 for symmetric decryption by first server 111 and the key S1 210*b*-2 for symmetric encryption by first server 111. Thus, in exemplary embodiments and as contemplated herein, the term "symmetric ciphering key S1 210*b*" can comprise two related keys of S1 210*b*-1 and S1 210*b*-2.

At step 215, device 101 can use symmetric decryption 215*a* with the first symmetric ciphertext symm-C1 102*s*-1 from a message 213 in order to read the plaintext 211*a*. A step 215*a* is also depicted and described in connection with FIG. 4 below. The symmetric decryption 215*a* can be included within cryptographic algorithms 101*s* for device 101. The symmetric decryption 215*a* can include input of the parameters specified in metadata 205*a* from a message 213 and the first symmetric ciphering key S1 210*b* and MAC key MAC1 210*b* from a step 214 above.

At step 218, device 101 can verify the server certificate cert.server 103*c* using (i) cryptographic algorithms 101*s* and (ii) a trusted root or intermediate certificate issuer certificate stored within device 101. In this manner, device 101 can confirm the cert.server for the first server 111 is signed by a trusted certificate issuer. Note that a step 218 can include multiple levels of verifying certificates or digital signatures for the Online Certificate Status Protocol (OSCP) through a stored root or intermediate certificate in device 101. Although not depicted in FIG. 2, message 213 can include OSCP data and signatures for device 101 to verify current authentication status of cert.server 103*c*, such as determining that cert.server 103*c* has not been revoked. A step 218 can include device 101 verifying all intermediate certificate issuer certificates associated with the server certificate cert.server 103*c* up to a root certificate for the certificate issuer stored within device 101.

At step 219, device 101 can derive or generate a random number M2 219*a* for use in a second KEM 101*k*/103*j* between device 101 and first server 111. The function and use of a step 220 and a KEM ENCAPS function 101*k* is also depicted and described in FIG. 5 below. At step 220, device 101 can use both (i) the received server public key of PK.server 103*h* from the server certificate cert.server 103*c* and (ii) the specified subset of parameters 103*f*-*y* for the server public key and the second KEM 101*k*/103*j* in order to generate both (x) a second asymmetric ciphertext C2 102*c*-2 and (y) a second shared secret key K2 102*k*-2.

At step 220, device 101 can use a KEM ENCAPS function 101*k* with both (i) and (ii) from the previous sentence in order to generate both (x) the second asymmetric ciphertext C2 102*c*-2 and (y) the second shared secret key K2 102*k*-2. A summary of the step 220 by device 101 with a KEM ENCAPS function 101*k* was also depicted and described in connection with FIG. 1 above. A device 101 can use both cryptographic algorithms 101*s* and cryptographic parameters 101*x* in order to conduct the step 220. At step 221, device 101 can use a HMAC-based key derivation function (HKDF) 221*a* (depicted and described in FIG. 5 below) with at least the second shared secret key K2 102*k*-2 output from KEM ENCAPS function 101*k* in order to generate both (i) a second symmetric ciphering key of S2 221*b* and a second message authentication code (MAC) key MAC2 221*c*. Note that in some exemplary embodiments, additional data mutually shared between device 101 and first server 111 besides the second shared secret key K2 102*k*-2 can also be input into the HKDF 221*a* in a step 221 in order to generate S2 221*b* and MAC2 221*c*. The additional data input into HKDF 221*a* can comprise data from the message 202 and the message 213, such as, but not limited to, the device ephemeral public key ePK.device 101*h* from device 101, device extensions 101*g*, parameters 101*f* and 101*f*-*x*, the server static public key PK.server 103*h* from first server 111, server extensions 103*g*-1, parameters 103*f*-*y*, and server certificate cert.server 103*c*. In exemplary embodiments, the additional data input into a HKDF 221*a* (besides shared secrets K1 and K2) is identical for both the device 101 and the first server 111. In exemplary embodiments, the additional data input into a HKDF 210*a* (besides shared secret K1) is also identical for both the device 101 and the first server 111.

In preferred exemplary embodiments, in a step 221, at least both the first shared secret key K1 102*k*-1 and the second shared secret key K2 102*k*-2 are input in the HKDF 221a in order to generate keys S2 221b and MAC2 221c. In this manner, the second symmetric ciphering key S2 and MAC key MAC2 can be mutually derived with first server 111 more securely by including input from two separate shared secrets (e.g. K1 and K2, which can be derived by separate KEM algorithms), compared to deriving the key S2 and MAC2 using only a single KEM algorithm. In other words, the combination of K1 and K2 for HKDF 221a provides security equal to at least the stronger of the first KEM (for KEM ENCAPS 103k) and the second KEM (for KEM ENCAPS 101k). As discussed above for the generation of S1 210b from a first HKDF 210a, the second symmetric ciphering key S2 221b can comprise a first key S2 221b-1 for encryption by device 101 and a second key S2 221b-2 for decryption by device 101.

In an exemplary embodiment, the KEM parameters 101f-x for ePK.device and KEM parameters 103f-y for PK.server 103h can be the same, and the first KEM 103k/101j and the second KEM 101k/103j could be conducted using the same PQC KEM algorithm. Although the benefits of increased security from conducting two different types of PQC KEM algorithms for the first KEM and the second KEM are not provided in this embodiment described within this paragraph, several benefits of the present disclosure are achieved to address the identified needs in the art. First, both the device and server can generate PM key pairs, such that the security after the first and second KEM depends on more than one KEM ENCAPS/DECAPS step. Second, even with the same KEM parameters for both 101f-x and 103f-y, two distinct shared secret keys K1 and K2 can be generated and both keys K1 and K2 can be used for HKDF 221a. In general, the use of two distinct shared secret keys K1 and K2 compared to the use of a single shared secret key will provide a higher level of security for deriving a second symmetric ciphering key S2 221b which can be mutually shared between device 101 and a network 103.

At step 222, device 101 can select and process a plaintext 222a for encryption into a third symmetric ciphertext symm-C3 102s-3. A step 222 for a device is also depicted and described in connection with FIG. 5 below. Note that the second asymmetric ciphertext C2 102c-2 could be previously output from the KEM ENCAPS function 101k from a step 221 above (where device 101 uses the second asymmetric ciphertext C2 102c-2 for the second KEM 101k/103j). In some exemplary embodiments for mutual authentication between device 101 and first server 111, then the plaintext 222a can also include a device certificate of cert.device 101c, as well as a digital signature over plaintext 222a (but excluding the digital signature itself) using the private key corresponding to the public key in cert.device 101c. For a step 222, device 101 can also (i) calculate a hash value 222b (depicted in FIG. 5 below) over data in both the first message 202 and the response second message 213, and (ii) include the hash value 222b in the plaintext 222a.

At step 223, device 101 can use symmetric encryption 223a with the plaintext 222a from a step 222 in order to generate the third symmetric ciphertext symm-C3 102s-3. A step 223 is also depicted and described in connection with FIG. 5 below. The symmetric encryption 223a can be included within cryptographic algorithms 101s for device 101. The symmetric encryption 223a can include input of at least (i) the parameters specified in metadata 205a from a step 205 above for first server 111 and received in a message 213, and (ii) the symmetric ciphering key S2 221b and MAC key MAC2 221c from a step 221 above. A step 223 can also include device 101 processing metadata 223b, where metadata 223b can include handshake headers, parameters 103f-y, an initialization vector, etc. Metadata 223b can include a portion of the metadata 205a received in a message 205.

For some exemplary embodiments depicted in FIG. 2, a device 101 could conduct an additional encryption step 212', where device 101 can encrypt the second asymmetric ciphertext C2 102c-2 output from a step 220 into a "double encrypted" second symmetric ciphertext symm-C2 102s-2. The step 212' can be equivalent to the encryption step 212 performed by first server 111 above using the symmetric encryption 212a with the first symmetric ciphering key S1 210b and MAC key MAC1 201c. In other words, the PQC KEM algorithms proposed in the MST Round 3 standardization project propose the use of an asymmetrically encrypted ciphertext such as the second ciphertext C2 102c-2 in order to conduct a KEM. The original ciphertext output from the KEM (such as KEM ENCAPS 101k in FIG. 5) could provide the first level of asymmetric encryption.

Although the ciphertext from the party conducting an ENCAPS function (e.g. device 101 using the server static public key PK.server 103h) is normally secure with the first level of asymmetric encryption, additional levels of security could be obtained for the system 200 in FIG. 2 by device 101 conducting a step 212' to "double encrypt" the second ciphertext C2 102c-2 output from KEM ENCAPS 101k also using symmetric encryption. A step 212' by device 101 is depicted and described in connection with FIG. 7 below.

One reason to conduct a step 212' by device 101 for message 224 is that a potential attacker could exist between device 101 and first server 111. An attacker could attempt to substitute (i) an original second ciphertext C2 102c-2 from device 101 with (ii) a different, "fake" ciphertext C2 102c-2'. The different, "fake" ciphertext C2 102c-2' could feasibly be validly created using the server public key PK.server 103h (under certain plausible circumstances). The use of a "double encrypted" second symmetric ciphertext symm-C2 102s-2 by device 101 increases resistance to an attacker substituting a fake second ciphertext C2 102c-2'.

Or, in some embodiments, (i) the second symmetric ciphertext symm-C2 102s-2 could omit the use of the symmetric ciphering key S1 210b by device 101 in a step 212' and (ii) the second symmetric ciphertext symm-C2 102s-2 could be processed in a step 212a with only the first MAC key MAC1 210c. For these embodiments, the MAC codes with plaintext second asymmetric ciphertext C2 102c-2 could be verified by network 103 and/or first server 111 using the MAC key MAC1 210c. In other words, a second symmetric ciphertext symm-C2 102s-2 could comprise a second ciphertext C2 102c-2 with MAC codes generated using the first MAC key MAC1 210c by device 101, such that first server 111 could verify the second symmetric ciphertext symm-C2 102s-2 was generated by device 101 that (i) conducted the KEM DECAPS 101j and (ii) operates with the first shared secret key K1 102k-1. For the embodiments described in this paragraph, then the data depicted in FIG. 2 for "symm-C2 102s-2" could be transmitted as plaintext with MAC codes using (i) the MAC key MAC1 210c from a HKDF 210a and (ii) the symmetric encryption step 223a in a step 212' but only for generating MAC codes and not ciphering or encrypting data.

As depicted in FIG. 2, device 101 can then send first server 111 a third message 224, where the third message 224 can also comprise a "Client Finished" message. The third message 224 can include at least (i) metadata 223b from a step 223 above, (ii) the second asymmetric ciphertext C2 102c-2 output from the KEM ENCAPS function 101k in a step 220 and (iii) the third symmetric ciphertext symm-C3 102s-3 output from step 223. For some embodiments as depicted with the third message 224, device 101 could send a second symmetric ciphertext symm-C2 102s-2 output from a step 212' instead of the second asymmetric ciphertext C2 102c-2. As described in the three paragraphs above, the second symmetric ciphertext symm-C2 102s-2 could comprise the second asymmetric ciphertext C2 102c-2 from a step 220 by device 101 that has been either (i) encrypted with the first symmetric ciphering key S1 210b and MAC key MAC1 210c, or (ii) "MACed" only with the first MAC key MAC1 210c (such as for authentication only from device 101). For other embodiments, the second ciphertext C2 102c-2 could be sent in a message 224 as directly output from a step 220 in FIG. 5 below and without any additional processing with S1 210b and MAC1 210c.

Additional data could be included in a third message 224 without departing from the scope of the present disclosure. For some embodiments, the portions of data for the third message 224 of metadata 223b, the second symmetric ciphertext symm-C2 102s-2, and the third symmetric ciphertext symm-C3 102s-3 could be sent as separate segments, portions, or sub-messages, where the aggregate delivery of the data for metadata 223a, the second symmetric ciphertext symm-C2 102s-2, and the third symmetric ciphertext symm-C3 102s-3 can represent the third message 224. For some embodiments, the subsequent depicted data in a message 231 such as a fourth symmetric ciphertext symm-C4 102s-4 can be included in a third message 224.

First server 111 can receive the third message 224 and conduct a series of steps in order to process the message and securely receive application data from the device to the server. For embodiments where the third message 224 includes a second symmetric ciphertext symm-C2 102s-2 (such as a "double encrypted" second asymmetric ciphertext C2 102c-2), then the first server 111 could conduct a decryption step 215' as depicted and described in connection with FIG. 7 below in order to convert the second symmetric ciphertext symm-C2 102s-2 into a second ciphertext C2 102c-2. In other words, the first server 111 could (i) use the first symmetric ciphering key S1 210b and MAC key MAC1 210c (from a step 210) in order to (ii) decrypt the second symmetric ciphertext symm-C2 102s-2 into a second ciphertext C2 102c-2. For some embodiments, the use of a first symmetric ciphering key S1 210b could be omitted in a step 215' (and also corresponding step 212' by device 101), and the second symmetric ciphertext symm-C2 102s-2 could comprise the plaintext second asymmetric ciphertext C2 102c-2 with MAC codes that could be verified with the first MAC key MAC1 210c. In other words, for some embodiments, the second symmetric ciphertext symm-C2 102s-2 may not be "double encrypted" and could simply include MAC codes for verification with the MAC key MAC1 210c.

First server 111 can then send second server 112 a message 201g-4, where the message 201g-4 can include at least the second asymmetric ciphertext C2 102c-2. First server 111 can send the second server 112 the message 201g-4 through the secure session 201g-1. Note that the message 201g-4 can include a session identifier or other identification information such that the second server 112 can select a KEM DECAPS function 103j and server static private key SK.server 103i to process with the second ciphertext C2 102c-2 in the message 201g-4. The session identifier or other identification information in message 201g-4 can be the same as or associated with a session identifier or other identification information communicated between the first server 111 and second server 112 in the message 201g-2 and/or message 201g-3. The second server 112 can receive the message 201g-4.

At step 225a, second server 112 can select a server private key SK.server 103i and KEM parameters 103f-y for processing the second asymmetric ciphertext C2 102c-2 using a session identifier or identification information in message 201g-4. Second server 112 can use cryptographic algorithms 103s' to conduct the KEM DECAPS 103j function with the received second ciphertext C2 102c-2. The server can use the server private key of SK.server 103i with the KEM DECAPS 103j and the received second ciphertext 102c-2 (possibly after a decryption step 215' to convert the second symmetric ciphertext symm-C2 102s-2 into a second ciphertext 102c-2) in order to generate the second shared secret key K2 102k-2. A step 225a for second server 112 is also depicted and described in connection with FIG. 5 below. Note that for some PQC algorithms, the KEM DECAPS 103j function could fail for a small frequency of messages 224, such as less than one failure per million or billion KEM, and if a step 225a fails, then second server 112 could send first server 111 an error message.

The second server 112 can then send the first server 111 a message 201g-5 through the secure session 201g-1, where the message 201g-5 includes the second shared secret key K2 102k-1 output from the KEM DECAPS function 103j. The first server 111 can receive the message 201g-5 with the second shared secret key K2 102k-2 for the second ciphertext C2 102c-2. First server 111 can then conduct a step 225b. A step 225b can also include first server 111 using at least the second shared secret key K2 102k-2 with the HKDF 221a (depicted in FIG. 5 below) in order to generate the second symmetric ciphering key S2 221b and the second MAC key MAC1 221c. In some exemplary embodiments, the HKDF 221a can also include input of at least the first shared secret key K1 102k-1 in addition to the second shared secret key K2 102k-2 in order to generate the second symmetric ciphering key S2 221b and the MAC key MAC1 221c.

In this manner for a step 225b by first server 111, by including the first shared secret key K1 102k-1 and second shared secret key K2 102k-2, the symmetric ciphering key S2 and MAC key MAC2 can be mutually derived with device 101 more securely by including input from two separate shared secrets (e.g. K1 and K2, which can also be derived by separate KEM algorithms), compared to deriving the key S2 and MAC2 using only a single KEM algorithm (e.g. using either (i) K2 only or (ii) the same KEM algorithm for the generation of K1 and K2). In other words, the combination of (x) K1 output from a first KEM 103k/101j and K2 output from a second KEM 101k/103j for (y) HKDF 221a provides security equal to at least the stronger of the first KEM (for KEM ENCAPS 103k) and the second KEM (for KEM ENCAPS 101k). At the conclusion of a step 225b, the first server 111 can store the second symmetric ciphering key S2 221b and MAC key MAC2 221c, which are mutually and secretly shared between device 101 and first server 111.

At step 226, first server 111 can use symmetric decryption 226a with the third symmetric ciphertext symm-C3 102s-3 from a third message 224 in order to read the plaintext 222a. A step 226 for first server 111 is also depicted and described in connection with FIG. 5 below. The symmetric decryption 226a can be included within cryptographic algorithms 103s for first server 111. The symmetric decryption 226a can include input of the parameters specified in metadata 224a from the third message 224 and the second symmetric ciphering key S2 221b and second MAC key MAC2 221b from a step 225b above.

At step 227, first server 111 can verify a digital signature for a client "Certificate Verify" from plaintext 222a for embodiments where device 101 uses a device certificate cert.device 101c. Note that the use of a device certificate by device 101 could be omitted for some embodiments depicted in FIG. 2, such that a one-way authentication of a first server 111 and/or network 103 is performed by device 101 in the message flows and steps shown. Other steps such as passwords used with message 231 or within a series of messages 231 below could provide authentication of the device 101 or a user of device 101 with the first server 111 and network 103. A step 227 could also include first server 111 verifying a certificate chain for device certificate cert.device 101c up through a stored root certificate or trusted intermediate certificate in first server 111 or network 103. At step 227, first server 111 could also calculate a value for "Client Finished" equivalent to a "Client Finished" segment within plaintext 222a. First server 111 could compare the calculated "Client Finished" value for the received "Client Finished" value and determine that device 101 has successfully completed the handshake for a secure session. Both device 101 and first server 111 could subsequently securely process, encrypt and decrypt, and transmit and receive application data. Although not depicted in FIG. 2, a first server 111 could also transmit to device 101 a "Server Finished" message, where the "Server Finished" message can include symmetric ciphertext data using the second symmetric ciphering key S2 221b and second MAC key MAC2 221b from a step 225b above.

Although the subsequent steps 228 through 230 and message 231 from device 101 to first server 111 is depicted in FIG. 2 as conducted after sending message 224, in some embodiments (i) the steps 228 through 230 could be conducted along with steps 214 to 223 and (ii) the depicted application data for device 101 in message 231 could also be included in a message 224. At step 228 device 101 use at least the first shared secret key of K1 102k-1, the second shared secret key K2 102k-2, and additional data (depicted as "data 228d" below in FIG. 6) with a HKDF 228a (depicted in FIG. 6 below) in order to generate a third symmetric ciphering key S3 228b and associated MAC key MAC3 228c. A step 228 is also depicted and described in connection with FIG. 6 below. The additional data can include plaintext data transmitted in the first message 202, the response second message 213, and the third message 224.

At step 229, device 101 can select application data for first server 111 and include the application data in a plaintext 229a. A step 229 is also depicted and described in connection with FIG. 6 below. The application data can include data from a sensor 101y, actuator 101z, an identify of device 101, configuration data for device 101, a registration message from device 101 to first server 111, as well as other data from a memory 101m in device 101, which is depicted in FIG. 1 above. The application data can be formatted or structured to message standards such as HTTP, DNS requests, JSON messages MQQT messages, COAP, SIP, FTP, and other standards and formats for the application data are possible as well without departing from the scope of the present disclosure. A plaintext 229a can comprise the combination of application data and the message formatting or structure.

At step 230, device 101 can use symmetric encryption 230a with the plaintext 229a from a step 229 in order to generate a fourth symmetric ciphertext symm-C4 102s-4. A step 230 is also depicted and described in connection with FIG. 6 below. The symmetric encryption 230a can be included within cryptographic algorithms 101s for device 101. The symmetric encryption 230a can include input of at least (i) the parameters specified in metadata 223b sent above by device 101 in a message 224 and/or received in metadata 205a received in a message 213, and (ii) the third symmetric ciphering key S3 228b and third MAC key MAC3 228c from a step 228 above. Device 101 can then transmit or send a fourth message 231 to first server 111, where the fourth message 231 can include at least the fourth symmetric ciphertext symm-C4 102s-4 as encrypted device application data for plaintext 229a within the ciphertext.

First server 111 can receive the fourth message 231 and take steps to process the data. At step 232 first server 111 can use at least the first shared secret key of K1 102k-1, the second shared secret key K2 102k-2, and additional data (depicted as "data 228d" below in FIG. 6) with the HKDF 228a (depicted in FIG. 6 below) in order to mutually derive with device 101 the third symmetric ciphering key S3 228b and associated MAC key MAC3 228c. A step 232 is also depicted and described in connection with FIG. 6 below. The additional data can include plaintext data transmitted in the first message 202, the response second message 213, and the third message 224.

At step 233, first server 111 can use symmetric decryption 233a with the received fourth symmetric ciphertext symm-C4 102s-4 from a message 231 in order to read the plaintext 229a. A step 233 is also depicted and described in connection with FIG. 6 below. The symmetric decryption 233a can be included within cryptographic algorithms 103s for first server 111. The symmetric decryption 233a can include input of at least (i) the parameters specified in metadata 223b sent above by device 101 in a message 224 and/or included in metadata 205a sent in a message 213, and (ii) the third symmetric ciphering key S3 228b and MAC key MAC3 228c from a step 232 above. First server 111 can then process the plaintext device application data, such as storing the application data in RAM 111m or storage memory 111b, and prepare server application data below in response to the received device application data from message 231.

After receipt of a message 231 (or message 224 where message 224 includes the fourth symmetric ciphertext symm-C4 102s-4), first server 111 can conduct a series of steps in order to select and process application data for device 101. In other words, messages 202, 213, and 224 can comprise a handshake for a secure session between device 101 and first server 111. The series of steps to select and process server application data 234a for device 101 can comprise the depicted steps of 234 and 235. Note that the series of steps 234 and 235 in some exemplary embodiments can only be conducted after first server 111 has successfully received and processed a message 224 from device 101. The reason is that message 224 can include data for a second key K2 102k-2, where the second key K2 102k-c can be used to generate key S3 228b and encrypt server application data 234a in a step 235. In other words, the sequence of steps depicted in FIG. 2 differs from conventional technology with TLS v1.3, since TLS 1.3 supports application data being transmitted along with a "Server Hello" message (e.g. FIG. 1 of RFC 8446), which would be equivalent to message 213 in FIG. 2. For other embodiments, server application data 234a could be transmitted with a message 213, but encrypted only using the first shared secret key K1 102k-1 and the first symmetric ciphering key S1 210b (e.g. encrypted not using K2 102k-2 and S2 221b).

However, in exemplary embodiments of the present disclosure where both (i) a first KEM 103k/101j is used to mutually share a first share secret key K1 102k-1 and (ii) a second KEM 101k/103j is used to mutually share a second shared key K2 102k-2, then a first server 111 must receive (i) the third message 224 with the second ciphertext C2

102c-2 and (ii) data for K2 102k-2 such as in message 201g-5 before first server 111 could encrypt server application data 234a into a ciphertext using at least K2 102k-2. Although the series of steps 234 and 235 depicted in FIG. 2 are depicted as occurring after steps 232 and 233 by first server 111 and receipt of message 231, in some embodiments the series of steps 234 and 235 and message 236 could be processed by first server 111 after the receipt of a message 224 and message 201g-5 and before first server 111 server receives message 231. Before a step 234, first server 111 could conduct a step 232 in order to mutually derive a third symmetric ciphering key S3 228b and MAC key MAC3 228c with device 101.

At step 234, first server 111 can select server application data 234a for device 101 and include the application data in a plaintext. A step 234 is also depicted and described in connection with FIG. 7 below. The server application data 234a can include data for a sensor 101y or an actuator 101z in device 101, a command for device 101, configuration data for device 101, a registration response message from first server 111 to device 101, as well as other data from a memory 111m in first server 111, which is depicted in FIG. 1 above. The server application data 234a can be formatted or structured to message standards such as HTTP, DNS requests, JSON messages MQQT messages, COAP, SIP, FTP, and other standards and formats for the application data are possible as well without departing from the scope of the present disclosure. A plaintext selected and processed in a step 234 can comprise the combination of server application data 234a and the message formatting or structure.

At step 235, first server 111 can use symmetric encryption 235a with the plaintext data for server application data 234a from a step 234 in order to generate a fifth symmetric ciphertext symm-C5 102s-5. A step 235 is also depicted and described in connection with FIG. 7 below. The symmetric encryption 235a can be included within cryptographic algorithms 103s for first server 111. The symmetric encryption 235a can include input of at least (i) the parameters specified in metadata 224a sent above by device 101 in a message 224 and/or transmitted in metadata 205a in a message 213, and (ii) the third symmetric ciphering key S3 228b and MAC key MAC3 228c from a step 232 above. First server 111 can then transmit or send a message 236 to device 101, where the message 236 can include at least the fifth symmetric ciphertext symm-C5 102s-5 as encrypted server application data 234a.

At step 237, device 101 can use symmetric decryption 237a with the received fifth symmetric ciphertext symm-C5 102s-5 from a message 236 in order to read the plaintext server application data 234a. A step 237 is also depicted and described in connection with FIG. 7 below. The symmetric decryption 237a can be included within cryptographic algorithms 101s for device 101. The symmetric decryption 237a can include input of at least (i) the parameters specified in metadata 224a sent above by device 101 in a message 224 and/or receive in metadata 205a received in a message 213, and (ii) the third symmetric ciphering key S3 228b and MAC key MAC3 228c from a step 228 above. Device 101 can then process the plaintext server application data, such as storing the application data in memory 101m and process commands, settings, configuration data, or other values received from first server 111 in the server application data 234a.

FIG. 3

Figure 3:
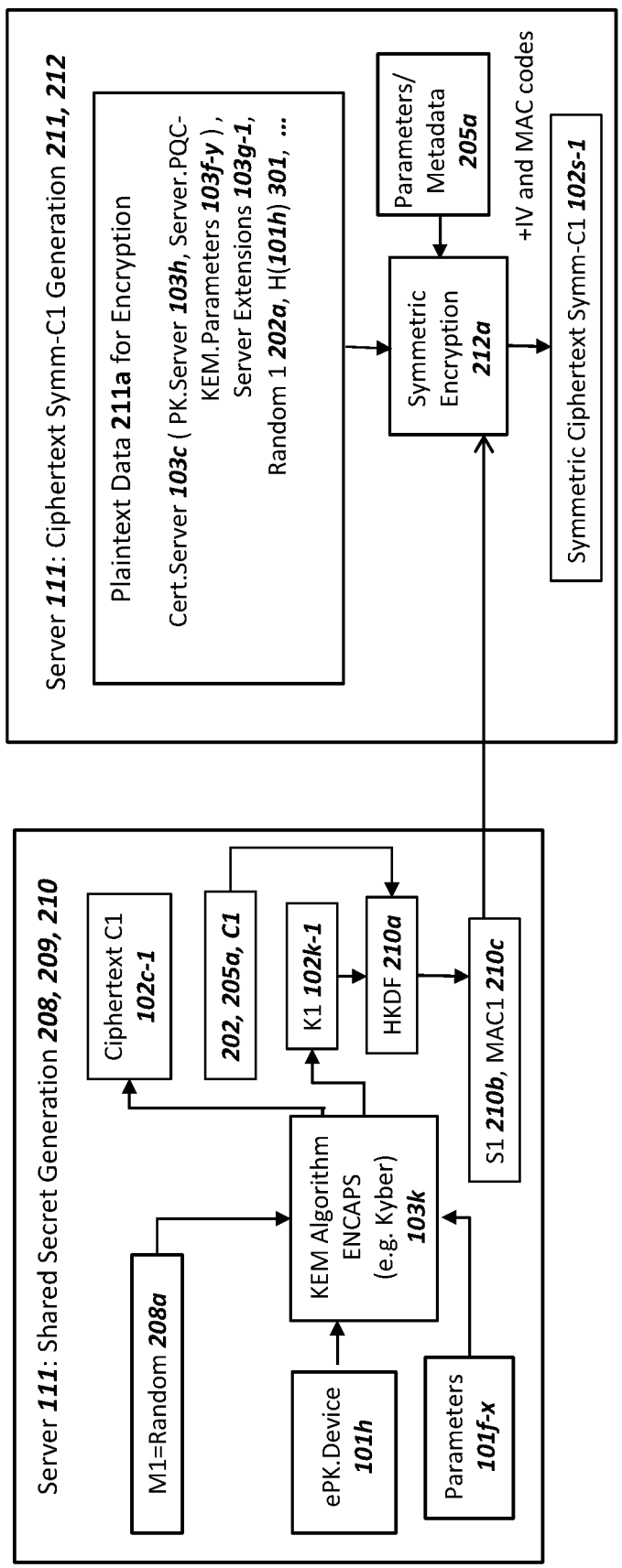
FIG. 3 is a flow chart illustrating exemplary steps for (i) a first server conducting a key encapsulation mechanism to mutually derive a symmetric ciphering key, and (ii) a first server conducting symmetric ciphering using the derived symmetric ciphering key, in accordance with exemplary embodiments.

FIG. 3 is a flow chart illustrating exemplary steps for (i) a first server conducting a key encapsulation mechanism to mutually derive a symmetric ciphering key, and (ii) a first server conducting symmetric ciphering using the derived symmetric ciphering key, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 3 depicts exemplary steps for a first server 111 to conduct steps 208 through 212 in order (i) to conduct a first key exchange mechanism (KEM) with device 101 in order to mutually derive a first shared secret K1 102k-1 and (ii) generate a symmetric ciphertext for device 101 using the first shared secret key. The steps 208 through 212 were also depicted and described above in connection with FIG. 2. At step 208, first server 111 can generate a random number M1 208a for input into the first KEM ENCAPS 103k function. Random number M1 208a can comprise a message or a number that's used with KEM ENCAPS 103k in order to generate the first shared secret key K1 102k-1. For some embodiments, the value M1 208a could include additional data that is not random and a portion of M1 208a could be a random number. Note the value M1 208a is not transmitted as plaintext to device 101. In exemplary embodiments, a first server 111 can use a hardware random number generator 128 as depicted and described in connection with FIG. 10 below in order to generate the random number M2 208a The first shared secret key K1 102k-1 can comprise a shared secret key for both the device 101 and first server 111 to conduct a first HMAC-based key derivation function (HKDF) 210a in order to derive a first symmetric ciphering key S1 210b and a first MAC key MAC1 210c. As contemplated throughout the present disclosure, a HKDF can also use secure hash algorithms such as SHA-256, SHA-3, etc. in order to generate symmetric ciphering keys, MAC keys, initialization vectors, etc. with shared secret keys. Note the first symmetric ciphering key S1 201b could comprise two values, where a first value is used by first server 111 for encryption and a second value is used by device 101 for encryption. Likewise, a first MAC key MAC1 201c could comprise two values, where a first value is used by first server 111 for message authentication for messages sent by first server 111 and a second value is used by device 101 for message authentication for messages sent by device 101.

Value M1 208a can be input into the first KEM ENCAPS 103k function or step. The following example within FIG. 3 will follow the steps for the Kyber algorithm within the PQ-Crystals project and proposal submitted to MST, but other and different cryptographic algorithms could be utilized as well. In an exemplary embodiment, the PQC KEM ENCAPS 103k function could follow the KEM steps specified by the Kyber algorithm. In the paper "CRYSTALS—Kyber: a CCA-secure module-lattice-based KEM" (referred to herein as Kyber paper), the message "m" can be the value M1 208a which is 256 bits in length for this embodiment. The step 103k depicted in FIG. 3 can comprise the function/step of "Kyber.Encaps" in the Kyber paper with the public key ePK.device 101h. The KEM parameters 101f-x could be both (i) received in message 202 from device 101 and (ii) correspond to a row from Table 1 of the Kyber paper such as Kyber768. The output of KEM ENCAPS 103k and "Kyber.Encaps" can be the value "c" in the Kyber paper or the first ciphertext C1 102c-1 in FIG. 3. The length of "c" and the first ciphertext C1 102c-1 can be an exemplary 1152 bytes, for parameters 101f-x which specify an exemplary parameter set of Kyber768.

As depicted in FIG. 3, the output of KEM ENCAPS 103k and "Kyber.Encaps" can also be the first shared secret K in the Kyber paper or the first shared secret key K1 102k-1 in FIG. 3. Note that other PQC KEM algorithms such as, but not limited to, BIKE and SIKE can be used to derive a first shared secret key K1 102k-1, which could correspond to a key K. For SIKE, the value M1 208a could be combined with the device ephemeral public key ePK.device 101h, or substituted by the device ephemeral public key ePK.device 101h. In other words, and also as described in FIG. 1 above, the first KEM 103k/101j could be conducted by first server 111 with a device ephemeral public key ePK.device 101h and KEM parameters 101f-x that support any of lattice, code-based, or SIKE based algorithms without departing from the scope of the present disclosure.

At step 210, first server 111 can use a HMAC-based key derivation function (HKDF) 210a with at least the first shared secret key K1 102k-1 output from KEM ENCAPS function 103k in order to generate both (i) a first symmetric ciphering key of S1 210b and a first message authentication code (MAC) key MAC1 210c. Note that in some exemplary embodiments, additional data mutually shared between device 101 and first server 111 besides the first shared secret key K1 102k-1 can also be input into the HKDF 210a in a step 210 in order to generate S1 210b and MAC1 210c. As depicted in FIG. 3, the additional data input into HKDF 210a can comprise data from the message 202, such as, but not limited to, the device ephemeral public key ePK.device 101h from device 101, device extensions 101g, parameters 101f and 101f-x, and/or metadata 205a. The HKDF 210a could be included in cryptographic algorithms 103s for first server 111, as depicted and described in connection with FIG. 1 above.

Although not depicted in FIG. 3, the additional data input into HKEF 210a with the first shared secret key K1 102k-1 could include strings or values specified in parameters 103x and 101x for a secure session between device 101 and first server 111. In other words, strings, values or numbers mutually shared between device 101 and first server 111 before a message 202 from device (such as values specified in standards for a secure session) could be input into the HKDF 210a with the first shared secret key K1 102k-1. In a first exemplary embodiment, the strings, values, or numbers mutually shared between device 101 and first server 111 before a message 202 from device 101 could be stored in both cryptographic algorithms 101s and cryptographic algorithms 103s. In a second exemplary embodiment, the strings, values, or numbers mutually shared between device 101 and first server 111 before a message 202 from device 101 could be stored in both cryptographic parameters 101x and cryptographic parameters 103x.

Other data from a message 202 can be used for input into a HKDF 210a, in addition to the first shared secret key K1 102k-1, without departing from the scope of the present disclosure, such as, but not limited to, (i) a network ID 103a or a server ID 111a that can be included in a message 202, as well as (ii) portions of metadata 205a. For other embodiments, the input of additional data from a message 202 into a HKDF 210a besides K1 102k-1 could be omitted, and S1 210b and MAC1 210c could be derived from K1 102k-a using the HKDF 210a. A HKDF 210a could also derive additional keys besides S1 210b and MAC1 210c, such as, but not limited to an initialization vector for both a first server 111 and a device 101.

In addition, although a single HDKF 210a is depicted in FIG. 3, a step 210 by first server 111 could use multiple different HKDF 210a in sequence to derive different keys for symmetric encryption 212a by first server 111 and symmetric decryption 215a (depicted in FIG. 4 below), such as a first HKDF 210a to derive the mutually shared symmetric ciphering key S1 210b, a second HKDF 210a to derive the MAC key MAC1 210c, and a third HKDF 210a to derive an initialization vector. Further, although a single HDKF 210a is depicted in FIG. 3, a step 210 by first server 111 could use multiple different HKDF 210a in sequence to derive different keys for encryption by device 101, such as a first HKDF 210a to derive the a shared symmetric ciphering key S1 210b for device 101, a second HKDF 210a to derive a MAC key MAC1 210c for device 101, and a third HKDF 210a to derive an initialization vector for device 101. Each of the different HKDF 210a described in this paragraph can use different data mutually shared between device 101 and the first server 111, and each of the different HKDF 210a described in this paragraph can also use the first shared secret key K1 102k-1.

A step 210 can also include first server 111 calculating two values for the first symmetric ciphering key S1 210b, where a first S1 210b-1 can be for use by server 111 for symmetric encryption of plaintext data into symmetric ciphertext such as symm-C1 102s-1 sent to device 101. A second S1 210b-2 can be for use by server 111 for symmetric decryption of symmetric ciphertext data such as symm-C2 102s-2 from device 101 into plaintext data in a step 215' below. The first S1 210b-1 can be used by server 111 to encrypt data using the key "S1" for device 101 in a message 213 (e.g. symm-C1 102s-1), and the second S1 210b-2 can be used by server 111 to decrypt data using the key "S1" received from device 101 in a message 224 (e.g. symm-C2 102s-2).

In a step 214 below for device 101, the device 101 could also likewise derive two different values for the key S1 comprising the first S1 210b-1 for decrypting data in a message 213 (e.g. symm-C1 102s-1) using "S1" and the second S1 210b-2 for encrypting data sent server 111 in a message 224 (e.g. symm-C2 102s-2). Likewise, server 111 in a step 214 can generate two values for MAC key MAC1 210c, where the first MAC1 is used by server 111 to generate MAC codes sent to device 101 (e.g. with symm-C1 102s-1) and the second MAC1 is used by server 111 to verify MAC codes received from device 101 (e.g. with symm-C2 102s-2 in a step 215'). A device 101 can likewise use the HKDF 210a to generate all of the same first S1 210b-1, the second S2 210b-2, the first MAC1 210c-1 and the second MAC 210c-2.

Note that the embodiments described in paragraph above also apply to the generation of (i) two different values for the second symmetric ciphering key S2 221b (a first S2 for encryption by first server 111 and a second S2 for decryption by first server 111), and (ii) two different values for the second MAC key MAC2 221c (a first MAC2 for generating MAC codes and a second MAC2 for verifying MAC codes). Likewise, the embodiments described in paragraph above also apply to the generation of (i) two different values for the third symmetric ciphering key S3 228b (a first S2 for encryption by first server 111 and a second S2 for decryption by first server 111), and (ii) two different values for the second MAC key MAC2 228c (a first MAC2 for generating MAC codes and a second MAC2 for verifying MAC codes).

At step 211, first server 111 can select and process a plaintext 211a for encryption into a first symmetric ciphertext symm-C1 102s-1. A step 211 is also depicted and described in connection with FIG. 2 above. Note that the first ciphertext C1 102c-1 could be previously output from the KEM ENCAPS function 103k (where device 101 uses the first ciphertext C1 102c-1 for the first KEM 103k/101j). In exemplary embodiments the data or values for the plaintext 211a selected in a step 211 can include at least (i) the server certificate cert.server 103c selected by a network 103 in a step 204 above, (ii) server extensions 103g-1 from a step 205, and (iii) the random number random 1 202a from a message 202 received from device 101. Note the server certificate cert.server 103c can include at least (i) the server public key PK.server 103h, (ii) the second set of KEM parameters for the server public key PK.server 103h of 103f-y.

Additional data could be included in plaintext 211a or some data listed above could be omitted from plaintext 211a without departing from the scope of the present disclosure. In an exemplary embodiment, a secure hash value 301 for the device ephemeral public key ePK.device 101h could also be included in the plaintext data 211a. By optionally including the secure hash value 301 for the received device ephemeral public key ePK.device 101h in plaintext data 211a, device 101, after a successful decryption 215a can verify the received secure hash value 301 matches a corresponding secure hash value calculated by device 101 for ePK.device 101h.

Note that the use of a secure hash value 301 for the received device ephemeral public key ePK.device 101h can be more bandwidth efficient than including the full device ephemeral public key ePK.device 101h in the plaintext 211a. Public keys for quantum safe KEM algorithms in Round 2 of the NIST PQC standardization project typically require between 300 bytes to 10,000 bytes, and including the full ePK.device 101h in plaintext 211a, compared to the secure hash value 301 for ePK.device 101h, would use much more bandwidth for the subsequent response second message 213, or a "Server Hello" message. Thus, the depicted use of secure hash value 301 for ePK.device 101h in plaintext 111a can both increase security by including the value (increasing resistance to MITM attacks) and reduce bandwidth. For some exemplary embodiments, the inclusion of the secure hash value 301 in plaintext 111a could be optionally omitted, such as if concern or requirements for resistance to MITM attacks were lower.

At step 212, first server 111 can use symmetric encryption 212a with the plaintext 211a from a step 211 in order to generate the first symmetric ciphertext symm-C1 102s-1. A step 212 is also depicted and described in connection with FIG. 2 above. The symmetric encryption 212a can be included within cryptographic algorithms 103s for first server 111. The symmetric encryption 212a can include input of the parameters specified in metadata 205a from a step 205 in FIG. 2 above and the symmetric ciphering key S1 210b and MAC key MAC1 210c from a step 210 above. In a step 212, first server 111 can also use an initialization vector for the symmetric encryption 212a, where the initialization vector can be included with metadata 205a. Note that a HKDF 210a could also derive the initialization vector for use by first server 111 with symmetric encryption 212a, and the resulting initialization vector could either be (i) included with plaintext metadata 205a, or (ii) omitted from plaintext metadata 205a and device 101 could mutually derive the same initialization vector using the HDKF 210a in a step 214 below. The resulting first symmetric ciphertext symm- C1 102s-1 could be included in the response second message 213 sent or transmitted from first server 111 to device 101 as depicted in FIG. 2 above.

FIG. 4

Figure 4:
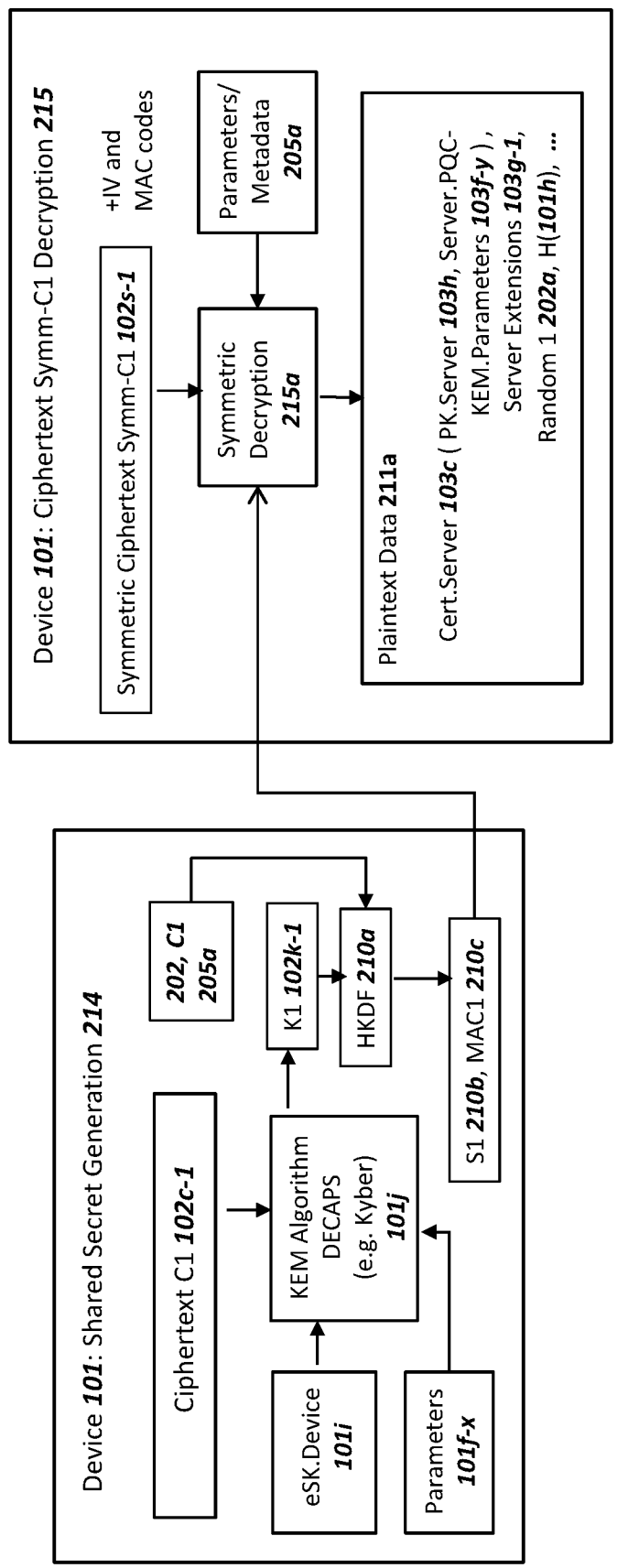
FIG. 4 is a flow chart illustrating exemplary steps for a device conducting (i) a key encapsulation mechanism to mutually derive a symmetric ciphering key, and (ii) symmetric ciphering using the derived symmetric ciphering key, in accordance with exemplary embodiments.

FIG. 4 is a flow chart illustrating exemplary steps for a device conducting (i) a key encapsulation mechanism to mutually derive a symmetric ciphering key, and (ii) symmetric ciphering using the derived symmetric ciphering key, in accordance with exemplary embodiments. FIG. 4 depicts exemplary steps for a device 101 to conduct steps 214 and 215 in order (i) to conduct the first key exchange mechanism (KEM) with first server 111 in order to mutually derive the first shared secret K1 102k-1 and (ii) process the first symmetric ciphertext symm-C1 102s-1 using the first shared secret key in order to read the plaintext 211a. The steps 214 and 215 were also depicted and described above in connection with FIG. 2.

A step 214 can comprise a KEM decapsulation step by device 101 in order to mutually derive the first shared secret K1 102k-1. The following example within FIG. 4 will follow the steps for the Kyber algorithm within the PQ-Crystals project and proposal submitted to MST, but other and different cryptographic algorithms could be utilized as well. In an exemplary embodiment, the PQC KEM DECAPS 101j function could follow the KEM steps specified by the Kyber algorithm. In the paper "CRYSTALS—Kyber: a CCA-secure module-lattice-based KEM" (referred to herein as Kyber paper), the ciphertext can be received first ciphertext C1 102c-1 from a message 213.

The KEM DECAPS 101j function depicted in FIG. 4 can comprise the function/step of "Kyber.Decaps" in the Kyber paper with the private key eSK.device 101i and the first ciphertext C1 102c-1. The private key eSK.device 101i could be derived by device 101 along with ePK.device 101h in a step 201e as described in FIG. 2 above. The KEM parameters 101f-x could be both (i) sent by device 101 in message 202 to first server 111 and (ii) correspond to a row from Table 1 of the Kyber paper, such as Kyber768. The length of "c" and the first ciphertext C1 102c-1 can be an exemplary 1152 bytes, for KEM parameters 101f-x which specify an exemplary parameter set of Kyber768. The output of KEM DECAPS 101j and "Kyber.Decaps" can be the first shared secret key K1 102k-1, which is also described as a key K in the Kyber paper. Note that other PQC KEM algorithms such as, but not limited to, BIKE and SIKE can be used to derive the first shared secret key K1 102k-1, which could correspond to a key K. In other words, and also as described in FIG. 1 above, the first KEM 103k/101j could be conducted by device 101 with a device ephemeral private key eSK.device 101i and KEM parameters 101f-x that support any of lattice, multivariate, or SIKE based algorithms without departing from the scope of the present disclosure.

At step 214, device 101 can use a HMAC-based Extract-and-Expand Key Derivation Function (HKDF) 210a with at least the first shared secret key K1 102k-1 output from KEM DECAPS function 101j in order to mutually derive both (i) the first symmetric ciphering key of S1 210b and the first message authentication code (MAC) key MAC1 210c. The first server 111 can derive the first symmetric ciphering key S1 210b and MAC key MAC1 210c in a step 210 as depicted and described in connection with FIG. 3 above and also in FIG. 2. In other words, the value of S1 210b calculated by both device 101 and first server 111 can be equal, and also the value of MAC1 210c calculated by both device 101 and first server 111 can be equal as well.

Note that in some exemplary embodiments, additional data mutually shared between device 101 and first server 111 besides the first shared secret key K1 102k-1 can also be input into the HKDF 210a in a step 214 in order to generate S1 210b and MAC1 210c. As depicted in FIG. 4, the additional data input into HKDF 210a can comprise data from the message 202, such as, but not limited to, the device ephemeral public key ePK.device 101h from device 101, device extensions 101g, parameters 101f and 101f-x, and/or metadata 205a. The HKDF 210a could be included in cryptographic algorithms 101s for device 101, as depicted and described in connection with FIG. 1 above.

Although not depicted in FIG. 4, the additional data input into HKDF 210a with the first shared secret key K1 102k-1 could include strings or values specified in parameters 103x and 101x for a secure session between device 101 and first server 111. In other words, strings, values or numbers mutually shared between device 101 and first server 111 before a message 202 from device (such as values specified in standards for a secure session) could be input into the HKDF 210a in a step 214 by device 101 with the first shared secret key K1 102k-1.

Other data from a message 202 can be used for input into a HKDF 210a, in addition to the first shared secret key K1 102k-1, without departing from the scope of the present disclosure, such as, but not limited to, (i) a network ID 103a or a server ID 111a that can be included in a message 202, as well as (ii) portions of metadata 205a. For other embodiments, the input of additional data from a message 202 into a HKDF 210a in a step 214 besides K1 102k-1 could be omitted, and S1 210b and MAC1 210c could be derived from K1 102k-1 using the HKDF 210a. In summary, both device 101 and first server 111 can select identical information or bytes, as well as identical sequence of bytes for the additional information from message 202 and/or metadata 205a for input into HKDF 210a in order for both device 101 and first server 111 to mutually derive the same values for S1 210b and MAC1 210c. A HKDF 210a in a step 214 for device 101 and step 210 for first server 111 could also derive additional keys besides S1 210b and MAC1 210c, such as, but not limited to an initialization vector for both a first server 111 and a device 101. As discussed above with a step 210, the key S1 210b could comprise a first key S1 210b-1 for encryption by a device 101 (and decryption by a first server 111), and a second key S1 210b-2 for encryption by a first server 111 (and decryption by a device 101).

At step 215, device 101 can use symmetric decryption 215a with the first symmetric ciphertext symm-C1 102s-1 received in message 213 in FIG. 2 above in order to read the plaintext 211a. A step 215 is also depicted and described in connection with FIG. 2 above. The symmetric decryption 215a can be included within cryptographic algorithms 101s for device 101. The symmetric decryption 215a can include input of the parameters specified in metadata 205a from a message 213 and the symmetric ciphering key S1 210b and MAC key MAC1 210c from a step 214 above.

In a step 215, device 101 can also use an initialization vector for the symmetric decryption 215a, where the initialization vector can be included with metadata 205a. Note that a HKDF 210a could also derive the initialization vector for use by device 101 with symmetric decryption 215a, and the resulting initialization vector could either be (i) included with plaintext metadata 205a, or (ii) omitted from plaintext metadata 205a and device 101 could mutually derive the same initialization vector using the HDKF 210a from a step 214 above. The resulting plaintext 211a from a step 215 can be stored by device 101 in memory 101*m* and also be used with a digital signature verification step 217 by device 101 as described below.

The plaintext data 211*a* from a step 215 can be the same as plaintext 211*a* processed by a first server 111 as described for a step 211 above in FIG. 3 and also FIG. 2. Note that the plaintext data 211*a* can include a secure hash value 301 over the device ephemeral public key ePK.device 101*h* sent in message 202, and in a step 215 device 101 could compare the received secure hash value 301 decrypted from the first symmetric ciphertext symm-C1 102*s*-1 with a calculated secure hash value directly for the device ephemeral public key ePK.device 101*h* stored in memory 101*m*. If the received secure hash value 301 decrypted from the first symmetric ciphertext symm-C1 102*s*-1 equals the calculated secure hash value directly for the device ephemeral public key ePK.device 101*h* stored in memory 101*m*, additional security is provided against a MITM attacker.

FIG. 5

Figure 5:
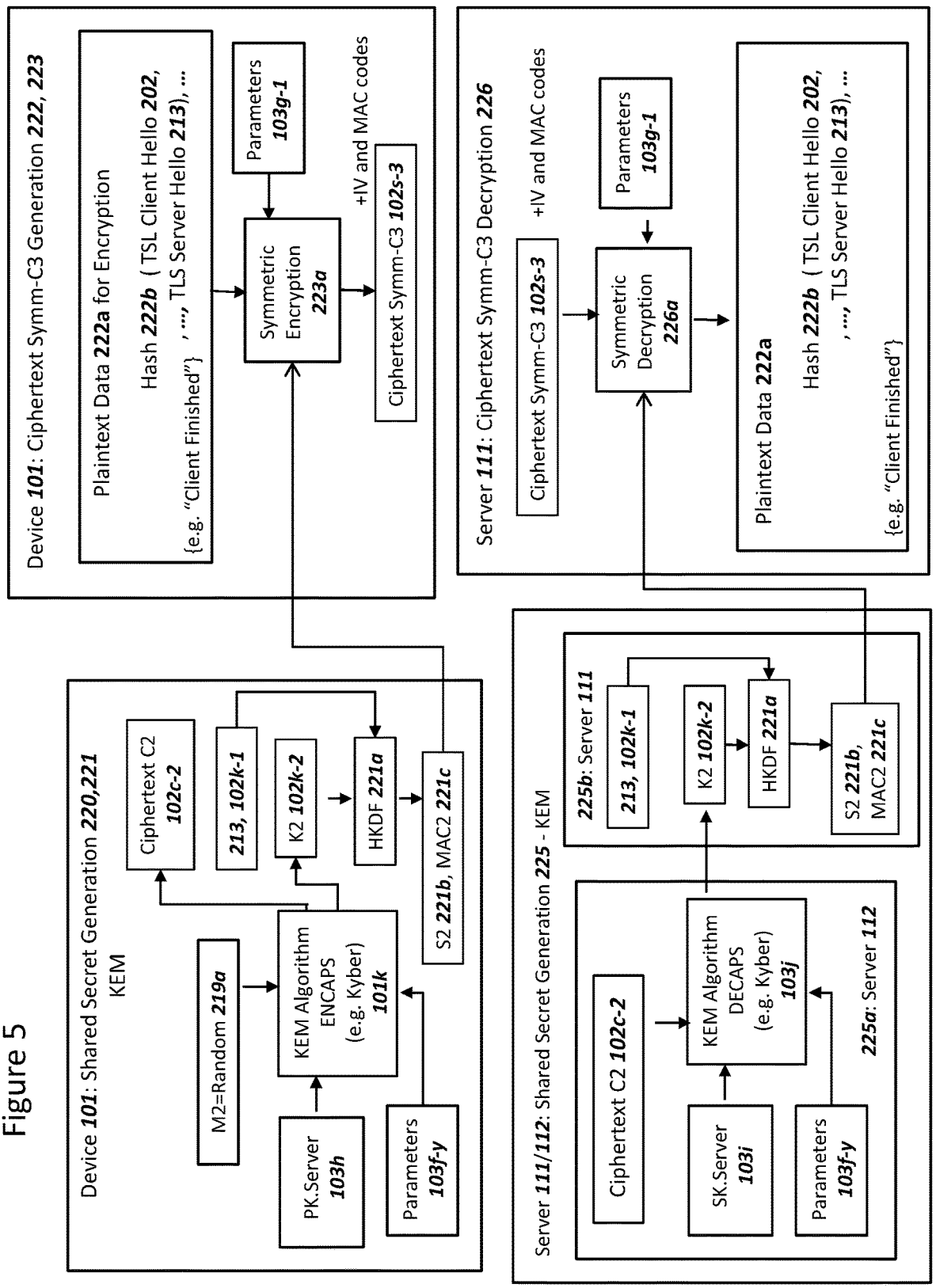
FIG. 5 is a flow chart illustrating exemplary steps for a device and a network conducting (i) a key encapsulation mechanism to mutually derive a symmetric ciphering key, and (ii) symmetric ciphering using the derived symmetric ciphering key, in accordance with exemplary embodiments.

FIG. 5 is a flow chart illustrating exemplary steps for a device and a network conducting (i) a key encapsulation mechanism to mutually derive a symmetric ciphering key, and (ii) symmetric ciphering using the derived symmetric ciphering key, in accordance with exemplary embodiments. As depicted in FIG. 5, a device 101 can conduct a second KEM 101*k*/103*j* in a step 220 using both (i) the server public key PK.server 103*h* from cert.server 103*c* received in the first symmetric ciphertext symm-C1 102*s*-1 (or as plaintext in a message 213), and (ii) the KEM parameters 103*f-y* in cert.server 103*c* from first server 111 in the response second message 213. The output of the second KEM 101*k*/103*j* can include a second shared secret key of K2 102*k*-2 and a second ciphertext C2 102*c*-2.

Device 101 can then in steps 222 and 223 generate a third symmetric ciphertext using at least the second shared secret key of K2 102*k*-2. As depicted in FIG. 5, a second server 112 can conduct the second KEM 101*k*/103*j* in a step 225*a* using (i) the server static private key SK.server 103*i* from a step 204, (ii) the second ciphertext C2 102*c*-2 received from device 101 a message 224 and the first server 111 in a message 201*g*-4, and (ii) the KEM parameters 103*f-y* in the server certificate cert.server 103*c* selected in step 204. The output of the second KEM 101*k*/103*j* can include a second shared secret key of K2 102*k*-2. The second server 112 can send the first server the second shared secret key K2 102*k*-2 in a message 201*g*-5. First server can then conduct a step 225*b* with at least the second shared secret key K2 102*k*-2 in order to generate the second symmetric ciphering key S2 221*b* and second MAC key MAC2 221*c*. First server 111 can then in step 226 decrypt third symmetric ciphertext symm-C3 102*s*-3 using at least the second shared secret key of K2 102*k*-2.

At step 220 in FIG. 5, device 101 can use the derived or generated a random number M2 219*a* from a step 219 depicted and described in connection with FIG. 2 above. The random number M2 219*a* can be for use in a second KEM 101*k*/103*j* between first server 111 and device 101. Random number M2 219*a* could include some data or bits that are not random, such as deterministically calculated, but in exemplary embodiments at least some data or bits within both M1 208*a* and M2 219*a* are at least pseudo-random numbers or values.

At step 220, device 101 can use both (i) the received server public key of PK.server 103*h* from message 213 and (ii) the specified subset of parameters 103*f-y* for the server public key and the second KEM 101*k*/103*j* in order to generate both (x) a second asymmetric ciphertext C2 102*c*-2 and (y) a second shared secret key K2 102*k*-2. At step 220, device 101 can use a KEM ENCAPS function 101*k* with both (i) and (ii) from the previous sentence in order to generate both (x) a ciphertext C2 102*c*-2 and (y) the second shared secret key K2 102*k*-2. A summary of the step 220 by device 101 with a KEM ENCAPS function 101*k* was also depicted and described in connection with FIG. 1 and FIG. 2 above. A device 101 can use both cryptographic algorithms 101*s* and cryptographic parameters 101*x* in order to conduct the step 220.

At step 221, device 101 can use a HMAC-based Extract-and-Expand Key Derivation Function (HKDF) 221*a* with at least the second shared secret key K2 102*k*-2 output from KEM ENCAPS function 101*k* in order to generate both (i) a second symmetric ciphering key of S2 221*b* and a second message authentication code (MAC) key MAC2 221*c*. Note that in some exemplary embodiments, additional data mutually shared between device 101 and first server 111 besides the second shared secret key K2 102*k*-2 can also be input into the HKDF 221*a* in a step 221 in order to generate S2 221*b* and MAC2 221*c*. In preferred embodiments as depicted in FIG. 5, the first shared secret key K1 102*k*-1 generated in a step 214 in FIG. 4 and FIG. 2 can also be input into the HKDF 221*a*.

For a step 221, other data input into HKDF 210*a* besides shared secret keys K2 and/or K1 can include data from the message 213, such as, but not limited to, the server static public key PK.server 103*h* from first server 111, server extensions 103*g*-1, and/or parameters 103*f-y*. Although not depicted in FIG. 5, the data for message 202 and also metadata 205*a* input into the HKDF 210*a* in FIG. 4 above could also be input into HKDF 221*a* in FIG. 5. For other embodiments, the input of (i) the first shared secret key K1 102*k*-1 and/or (ii) data from message 202 and 213 could be omitted from inclusion in the calculation of HKDF 221*a*, and the keys S2 221*b* and MAC2 221*c* could be derived from the second shared secret key K2 102*k*-2 from a step 220.

At step 222, device 101 can select and process a plaintext 222*a* for encryption into a third symmetric ciphertext symm-C3 102*s*-3. A step 222 is also depicted and described in connection with FIG. 2 above. Note that the second asymmetric ciphertext C2 102*c*-2 could be previously output from the KEM ENCAPS function 101*k* from a step 220 above. In exemplary embodiments the data or values for the plaintext 222*a* selected in a step 222 can include at least a secure hash value 222*b* over the data previously communicated between device 101 and first server 111 in messages 202 and 205. Additional data mutually shared between device 101 and first server 111 outside of messages 202 and 205 could be included in the generation of the secure hash value 222*b*. For some exemplary embodiments, such as with the last sentence of the paragraph above (where the first shared secret key K1 102*k*-1 was omitted from input into HKDF 221*a*), then the secure hash value 222*b* can also be over the first shared secret key K1 102*k*-1. As depicted in FIG. 5, the plaintext 222*a* can correspond to a "Client Finished" message in a handshake for a secure session.

At step 223, device 101 can use symmetric encryption 223*a* with the plaintext 222*a* from a step 222 in order to generate the third symmetric ciphertext symm-C3 102*s*-3. A step 223 is also depicted and described in connection with FIG. 2 above. The symmetric encryption 223*a* can be included within cryptographic algorithms 101*s* for device 101. The symmetric encryption 223*a* can include input of (i) the parameters 103*g*-1 in message 213 (or in metadata 205*a* from a message 213) above and (ii) the symmetric ciphering key S2 221*b* and MAC key MAC2 221*c* from a step 221 above. In a step 222, device 101 can also use an initialization vector for the symmetric encryption 222*a*, where the initialization vector can be either (i) included with metadata 224*a*, or (ii) mutually derived with first server 111 using the second KEM 101*k*/103*j* and HKDF 221*a*. After steps 220 through 223 in FIG. 5, device 101 can include the second asymmetric ciphertext C2 102*c*-2 and the third symmetric ciphertext symm-C3 102*s*-3 in the message 224 depicted in FIG. 2 and transmitted to first server 111. As depicted and described for a step 212' in FIG. 2 and FIG. 7, the second asymmetric ciphertext C2 102*c*-2 could also be symmetrically encrypted into a second symmetric ciphertext symm-C2 102*s*-2 using the first symmetric ciphering key S1 210*b*.

First server 111 can receive the message 224 from device 101 and conduct a series of steps in order to process the message and securely send application data from the server to the device. For embodiments where the second asymmetric ciphertext C2 102*c*-2 is "double encrypted" into a second symmetric ciphertext symm-C2 102*s*-2 as depicted in FIG. 2, then the first server 111 can decrypt the second symmetric ciphertext symm-C2 102*s*-2 using a step 215' as depicted and described in connection with FIG. 2 above and FIG. 7 below. First server 111 can send second server 112 a message 201*g*-4 with the second asymmetric ciphertext C2 102*c*-2 as depicted and described above in connection with FIG. 2.

At step 225*a*, second server 112 can use (i) the specified KEM parameters 103*f-y* for the server certificate cert.server 103*c* selected in a step 204 along with (ii) cryptographic algorithms 103*s*' to conduct the KEM DECAPS 103*j* function with the received second asymmetric ciphertext C2 102*c*-2. The second server 112 can use the server private key of SK.server 103*i* with the KEM DECAPS 103*j* and the received second asymmetric ciphertext C2 102*c*-2 in order to generate the second shared secret key K2 102*k*-2. Note that for some PQC algorithms, the KEM DECAPS 103*j* function could fail for a small frequency of steps 225*a*, such as less than one failure per million or billion KEM messages, and if a step 225*a* fails, then second server 112 could send first server 111 an error message. Second server 112 can send the first server 111 the second shared secret key K2 102*k*-2 in a message 201*g*-5.

At step 225*b* as depicted in FIG. 5, first server 111 can include both (i) the HKDF 221*a* used by device 101 in a step 221, and (ii) the exact same input into the HKDF 221*a* as device input into HKDF 221*a* in order to generate the second symmetric ciphering key S2 221*b* and second MAC key MAC2 221*c*. At least in preferred exemplary embodiments where the mutual shared derivation of S2 and MAC2 by device 101 and first server 111 are the same values for both sides, then first server 111 should use the exact same input into HKDF 221*a* as used by device 101. A commonly shared protocol stored with cryptographic algorithms 101*x* for device 101 and cryptographic algorithms 103*s* for network 103 could specify the exact same input into HDKF 221*a* as used by both device 101 and first server 111. Likewise, a commonly shared protocol stored with cryptographic algorithms 101*x* for device 101 and cryptographic algorithms 103*s* for network 103 could specify the exact same input into HDKF 210*a* as used by both device 101 and first server 111 for deriving the first symmetric ciphering key S1 210*b* and MAC1 210*b*.

In a step 225*b*, first server 111 can use a HMAC-based Extract-and-Expand Key Derivation Function (HKDF) 221*a* with at least the second shared secret key K2 102*k*-2 output from KEM DECAPS function 103*j* in order to generate both (i) a second symmetric ciphering key of S2 221*b* and a second message authentication code (MAC) key MAC2 221*c*. As depicted in FIG. 5, in preferred embodiments, the first shared secret key K1 102*k*-1 generated in a step 214 in FIG. 4 and FIG. 2 can also be input into the HKDF 221*a*.

In this manner and by including the first shared secret key K1 102*k*-1 as input into HKDF 221*a*, the symmetric ciphering key S2 and MAC key MAC2 can be mutually derived with device 101 more securely by including input from two separate shared secrets (e.g. K1 and K2, which can also be derived by separate KEM algorithms), compared to deriving the key S2 and MAC2 using only a single KEM algorithm (e.g. using either (i) K2 only or (ii) a single KEM for K1 and K2). In other words, the combination of K1 using a first KEM 103*k*/101*j* and K2 using a second KEM 101*k*/103*j* for HKDF 221*a* provides security equal to at least the stronger of the first KEM (for KEM ENCAPS 103*k*) and the second KEM (for KEM ENCAPS 101*k*). In exemplary embodiments, the parameters for the first KEM 103*k*/101*j* comprise a completely different type of KEM (e.g. lattice, code-based, or SIKE) than the type for the second KEM 101*k*/103*j* (e.g. lattice, code-based, or SIKE). Examples of types of algorithms are included in the Wikipedia summary for the NIST PQC project.

For a step 225*b*, other data input into HKDF 221*a*, besides shared secret keys K2 and/or K1, can include data from the message 213, such as, but not limited to, the server static public key PK.server 103*h* from second server 112, server extensions 103*g*-1, and/or parameters 103*f-y*. Although not depicted in FIG. 5, the data for message 202 and also metadata 205*a* input into the HKDF 210*a* in FIG. 4 above could also be input into HKDF 221*a* in FIG. 5. For other embodiments, the input of (i) the first shared secret key K1 102*k*-1 and/or (ii) data from message 202 and 213 could be omitted from inclusion in the calculation of HKDF 221*a*, and the keys S2 221*b* and MAC2 221*c* could be derived from the second shared secret key K2 102*k*-2 from a step 220.

At step 226, first server 111 can use symmetric decryption 226*a* with the third symmetric ciphertext symm-C3 102*s*-3 received in message 224 in FIG. 2 above in order to read the plaintext 222*a*. A step 226 is also depicted and described in connection with FIG. 2 above. The symmetric decryption 226*a* can be included within cryptographic algorithms 103*s* for first server 111. The symmetric decryption 226*a* can include input of the parameters specified in metadata 224*a* from a message 224 and the second symmetric ciphering key S2 221*b* and MAC key MAC2 221*c* from a step 225*b* above for first server 111.

In a step 226, first server 111 can also use an initialization vector for the symmetric decryption 226*a*, where the initialization vector can be included with metadata 224*a*. Note that a HKDF 221*a* could also derive the initialization vector for use by device 101 and first server 111 with symmetric decryption 226*a*, and the resulting initialization vector could either be (i) included with plaintext metadata 224*a*, or (ii) omitted from plaintext metadata 224*a* and first server 111 could mutually derive the same initialization vector using the HDKF 221*a* from a step 225*b* above.

The resulting plaintext 222*a* from a step 226 can include a secure hash value 222*b*, which can be the same secure hash value 222*b* processed by device 101 in a step 222 above. For some exemplary embodiments, where the first shared secret key K1 102*k*-1 was omitted from input into HKDF 221*a*, then the secure hash value 222*b* can also be over at least the first shared secret key K1 102*k*-1. In exemplary embodiments, the plaintext 222*a* includes data for a "Client Finished" message. In a step 226, first server 111 can calculate the secure hash value 222b over the same data from message 202 and 213. If the calculated value 222b matches the received value 222b, then first server 111 can consider the handshake for the secure session successfully completed.

FIG. 6

Figure 6:
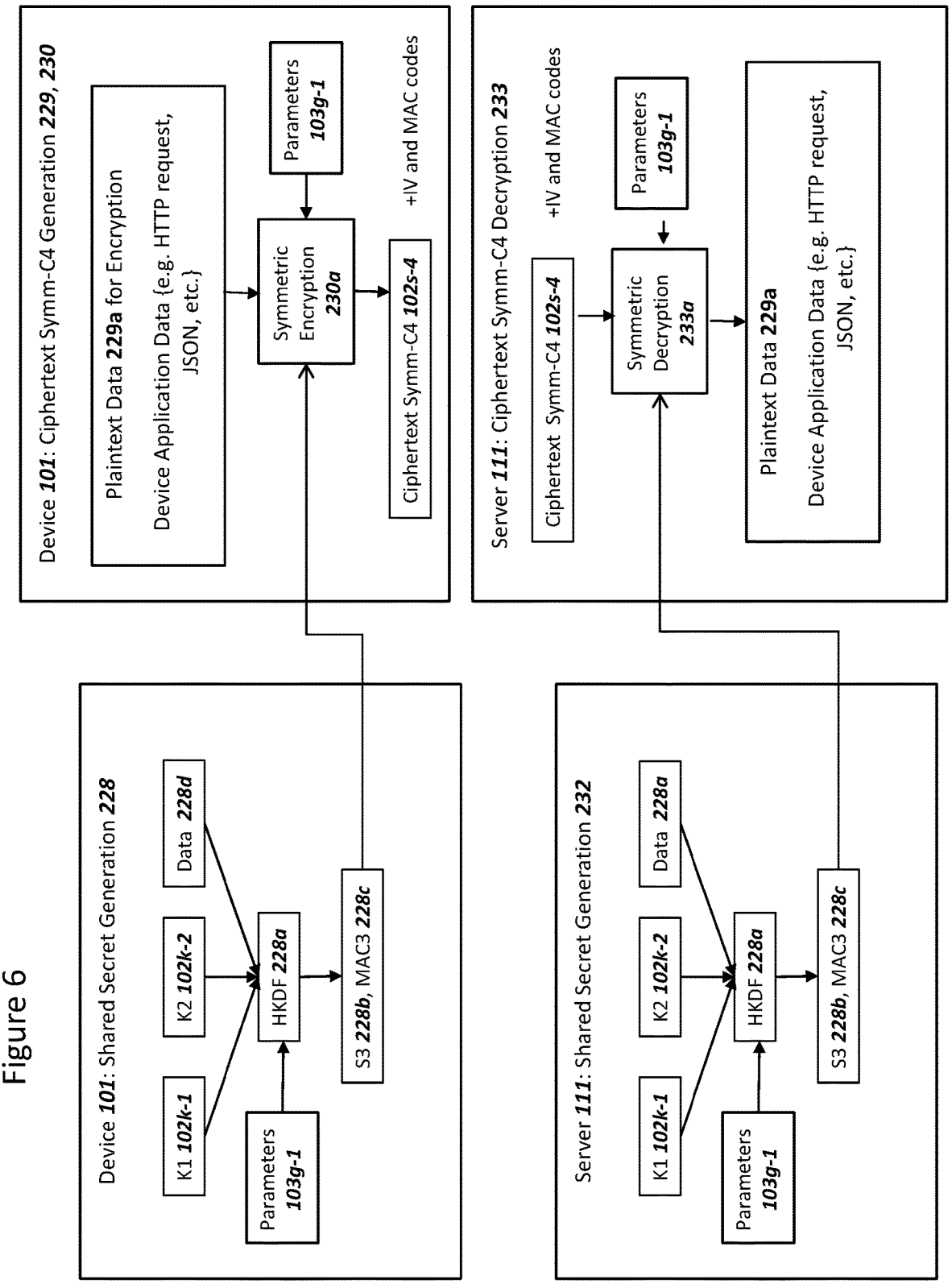
FIG. 6 is a flow chart illustrating exemplary steps for a device and a server in a network conducting (i) a key derivation function to mutually derive a symmetric ciphering key, and (ii) symmetric ciphering using the derived symmetric ciphering key, in accordance with exemplary embodiments.

FIG. 6 is a flow chart illustrating exemplary steps for a device and a server in a network conducting (i) a key derivation function to mutually derive a symmetric ciphering key, and (ii) symmetric ciphering using the derived symmetric ciphering key, in accordance with exemplary embodiments. Device 101 can use a step 228 with a HKDF 228a in order to derive a third symmetric ciphering key S3 228b and a third MAC key MAC3 228c. Step 228 was also depicted and described in connection with FIG. 2 above. First server 111 can use a step 232 with the HKDF 228a in order to mutually derive the third symmetric ciphering key S3 228b and a third MAC key MAC3 228c. Device 101 can use steps 229 and 230 with the keys output from HKDF 228a in a step 228 in order to encrypt application data for a plaintext 229a into a fourth symmetric ciphertext symm-C4 102s-4. First server 111 can use steps 233 with the fourth symmetric ciphertext symm-C4 102s-4 and the keys output from HKDF 228a in a step 232 in order to decrypt the fourth symmetric ciphertext symm-C4 102s-4 into the plaintext 229a.

At step 228, device 101 can use a HMAC-based Extract-and-Expand Key Derivation Function (HKDF) 228a with at least (i) the first shared secret key K1 102k-1 generated in a step 214 in FIG. 4 and FIG. 2, (ii) the second shared secret key K2 102k-2 output from KEM ENCAPS function 101k in a step 221, and (iii) additional data 228d in order to generate a third symmetric ciphering key of S3 228b and a third message authentication code (MAC) key MAC3 228c. Note that in exemplary embodiments, the additional data 228d can include data from messages 202, 213, and 224, since that data has been successfully shared between device 101 and first server 111. Some additional data 228d could be included in (i) cryptographic algorithms 101s and 103s or (ii) cryptographic parameters 101x and 103x before a message 202 (such as values specified for a protocol of a secure session between device 101 and first server 111). The additional data 228d described in the previous sentence could be included as input into HDKF 228a in a step 228.

As depicted in FIG. 6, a HKDF 228a can include input of parameters 103g-1. As one example, the parameters 103g-1 could specify the use of a secure hash algorithm for use with the HKDF 228a. As another example, the parameters 103g-1 could specify the format, sequence, structure, and fields used from the additional data 228d. Although not depicted for an HKDF 210a in FIG. 3 and FIG. 4 above, as well as an HKDF 221a in FIG. 5 above, both HKDF 210a and 221a can use input of parameters in order to process the HKDF.

At step 229, device 101 can select and process a plaintext 229a for encryption into a fourth symmetric ciphertext symm-C4 102s-4. A step 229 is also depicted and described in connection with FIG. 2 above. At step 229, device 101 can select application data for first server 111 and include the application data in a plaintext 229a. The application data can include data from a sensor 101y, actuator 101z, an identify of device 101, configuration data for device 101, a registration message from device 101 to first server 111, as well as other data from a memory 101m in device 101, which is depicted in FIG. 1 above. The application data can be formatted or structured to message standards such as HTTP, DNS requests, JSON messages MQQT messages, COAP, SIP, FTP, and other standards and formats for the application data are possible as well without departing from the scope of the present disclosure. A plaintext 229a can comprise the combination of application data and the message formatting or structure.

At step 230, device 101 can use symmetric encryption 230a with the plaintext 229a from a step 229 in order to generate the fourth symmetric ciphertext symm-C4 102s-4. A step 230 is also depicted and described in connection with FIG. 2 above. The symmetric encryption 230a can be included within cryptographic algorithms 101s for device 101. The symmetric encryption 230a can include input of (i) the parameters 103g-1 in message 213 (or in metadata 205a from a message 213) above and (ii) the third symmetric ciphering key S3 228b and MAC key MAC3 228c from a step 228 above. In a step 230, device 101 can also use an initialization vector for the symmetric encryption 230a, where the initialization vector can be either (i) included with metadata 224a, or (ii) mutually derived with first server 111 using the HKDF 228a. After steps 228 through 230 in FIG. 6, device 101 can include the fourth symmetric ciphertext symm-C4 102s-4 in a message 231 to first server 111 as depicted and described in connection with FIG. 2 above.

A first server 111 can receive the message 231 with the fourth symmetric ciphertext symm-C4 102s-4 and conduct steps to process the ciphertext and data. At step 232, first server 111 can use a hash-based key derivation function (HKDF) 228a with at least (i) the first shared secret key K1 102k-1 generated in a step 209 in FIG. 3, (ii) the second shared secret key K2 102k-2 output from KEM DECAPS function 103j in a step 225a, and (iii) additional data 228d in order to mutually derive with device 101 the third symmetric ciphering key of S3 228b and the third message authentication code (MAC) key MAC3 228c.

For a step 232, in exemplary embodiments, the additional data 228d can include data from messages 202, 213, and 224, since that data has been successfully shared between device 101 and first server 111. Some additional data 228d could be included in (i) cryptographic algorithms 101s and 103s or (ii) cryptographic parameters 101x and 103x before a message 202 (such as values specified for a protocol of a secure session between device 101 and first server 111). The additional data 228d described in the previous sentence could be included as input into HDKF 228a in a step 232. As depicted in FIG. 6, a HKDF 228a in a step 232 can include input of parameters 103g-1. The use of parameters 103g-1 with HKDF 228a was also described for a step 228 by device 101 in FIG. 6 above.

At step 233, first server 111 can use symmetric decryption 233a with the received fourth symmetric ciphertext symm-C4 102s-4 from a message 231 in order to read the plaintext 229a. A step 233 is also depicted and described in connection with FIG. 2 above. The symmetric decryption 233a can be included within cryptographic algorithms 103s for first server 111. The symmetric decryption 233a can include input of parameters comprising any of (i) parameters 103g-1 sent in message 213, which is depicted, or (ii) the parameters specified in metadata 223b sent above by device 101 in a message 224, or (iii) the parameters included in metadata 205a sent in a message 213. The symmetric decryption 233a can also include input of the symmetric ciphering key S3 228b and MAC key MAC3 228c from a step 232 above. First server 111 can then process the plaintext device application data, such as storing the application data in RAM 111m or storage memory 111b, and prepare server application data below in response to the received device application data from message 231.

FIG. 7

Figure 7:
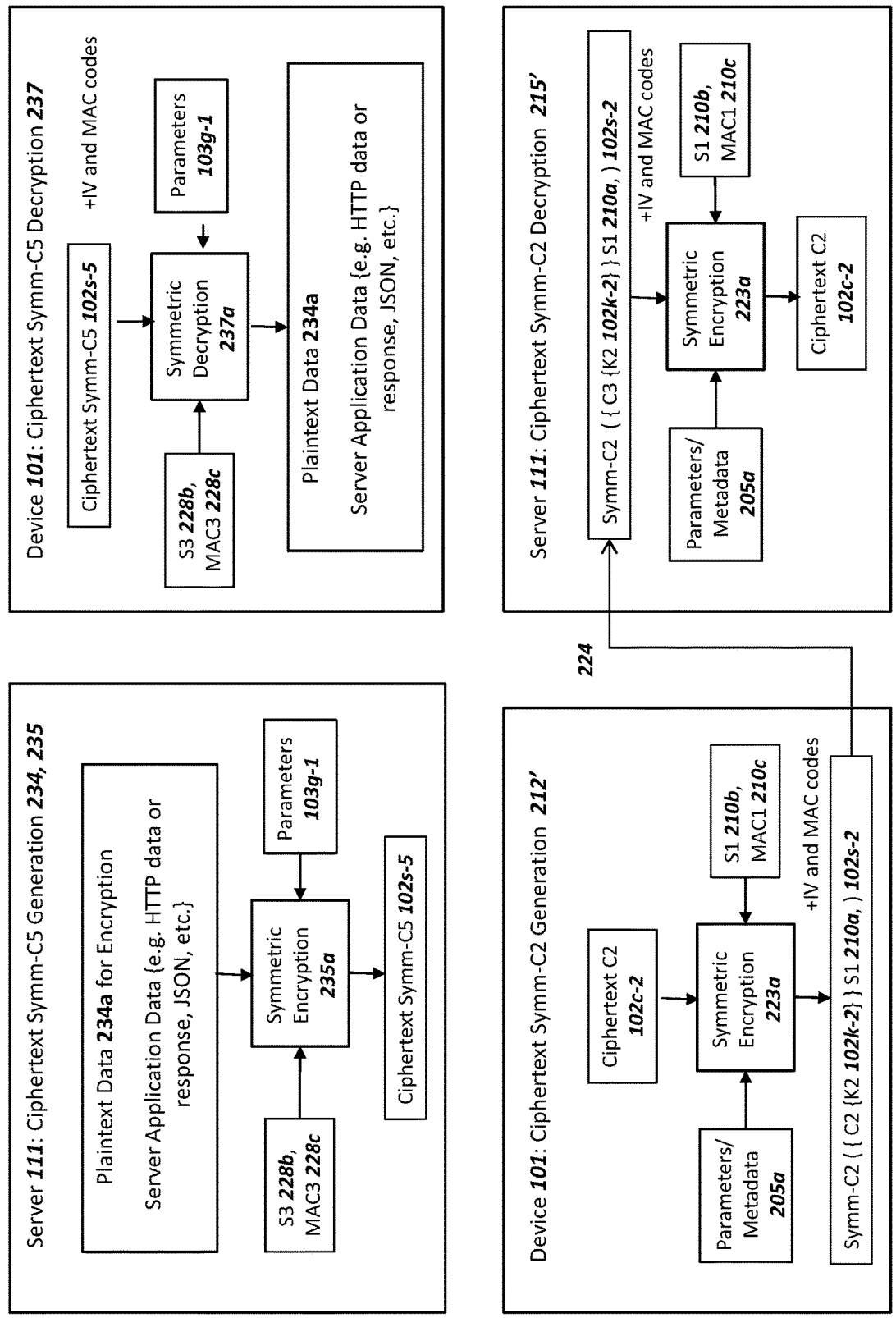
FIG. 7 is a flow chart illustrating exemplary steps for a device and a server in a network conducting symmetric ciphering using a mutually derived symmetric ciphering key, in accordance with exemplary embodiments.

FIG. 7 is a flow chart illustrating exemplary steps for a device and a server in a network conducting symmetric ciphering using a mutually derived symmetric ciphering key, in accordance with exemplary embodiments. First server 111 can conduct the steps 234 and 235 either (i) after receipt of message 224 from device 101 and before receipt of message 231 from device 101, or (ii) after receipt of message 231 from device 101. In other words, for some exemplary embodiments, the ciphertext for the server application data could be transmitted both (i) before the device 101 sends application data, but also (ii) after the first server 111 receives the "Client Finished" message 224. The reason is the first server 111 can require data from message 224 in order to derive the second shared secret key K2 102k-2. For embodiments where first server 111 conducts steps 234 before receiving message 231, then first server 111 would also conduct (i) a step 232 to derive the key S3 228b and (ii) a step 234 before first server 111 conducts a step 233 from FIG. 6 below.

At step 234, first server 111 can select server application data 234a for device 101 and include the application data in a plaintext. A step 234 is also depicted and described in connection with FIG. 2 above. The server application data 234a can include data for a sensor 101y or an actuator 101z in device 101, a command for device 101, configuration data for device 101, a registration response message from first server 111 to device 101, as well as other data from a memory 111m in first server 111, which is depicted in FIG. 1 above. The server application data 234a can be formatted or structured to message standards such as HTTP, DNS requests, JSON messages MQQT messages, COAP, SIP, FTP, and other standards and formats for the application data are possible as well without departing from the scope of the present disclosure. A plaintext selected and processed in a step 234 can comprise the combination of server application data 234a and the message formatting or structure.

At step 235, first server 111 can use symmetric encryption 235a with the plaintext data for server application data 234a from a step 234 in order to generate a fifth symmetric ciphertext symm-C5 102s-5. A step 235 is also depicted and described in connection with FIG. 2 above. The symmetric encryption 235a can be included within cryptographic algorithms 103s for first server 111. The symmetric encryption 230a can include input of (i) the parameters 103g-1 in message 213 (or in metadata 205a from a message 213) above and (ii) the symmetric ciphering key S3 228b and MAC key MAC3 228c from a step 232 above in FIG. 6 for first server 111. In a step 235, first server 111 can also use an initialization vector for the symmetric encryption 235a, where the initialization vector can be either (i) included with metadata 224a, or (ii) mutually derived with device 101 using the HKDF 228a in a step 232. After steps 234 and 235 in FIG. 7, first server 111 can include the fifth symmetric ciphertext symm-C5 102s-5 in a message 236 to device 101 as depicted and described in connection with FIG. 2 above.

At step 237, device 101 can use symmetric decryption 237a with the received sixth ciphertext C6 101c-6 from a message 236 in order to read the plaintext server application data 234a. A step 237 is also depicted and described in connection with FIG. 2 above. The symmetric decryption 237a can be included within cryptographic algorithms 101s for device 101. The symmetric decryption 237a can include input of at least the parameters 103g-1 in message 213 (or in metadata 205a from a message 213) above and (ii) the third symmetric ciphering key S3 228b and MAC key MAC3 228c from a step 228 above for device 101. Device 101 can then process the plaintext server application data 234a, such as storing the application data in memory 101m and process commands, settings, configuration data, or other values received from first server 111 in the server application data 234a.

FIG. 7 also depicts the optional use of "double encryption" of the second asymmetric ciphertext C2 102c-2 into a second symmetric ciphertext symm-C2 102s-2 as depicted and described for a message 224 in FIG. 2 above. For a step 212', a device 101 can conduct the equivalent steps as a first server 111 using a step 212, except that device 101 operates with the second asymmetric ciphertext C2 102c-2 as the plaintext data for input into symmetric encryption 212a.

At step 212', device 101 can use symmetric encryption 212a with input of the plaintext value of the second ciphertext C2 102c-2 output from a KEM ENCAPS 101j in step 220. The plaintext value of the second ciphertext C2 102c-2 can be the string of bits resulting from asymmetric encryption of data according to the KEM specified by KEM parameters 103f-y in step 220. The output of symmetric encryption 212a can comprise a "double encrypted" second symmetric ciphertext symm-C2 102s-2. The symmetric encryption 212a can be included within cryptographic algorithms 101s for device 101. The symmetric encryption 212a can include input of (i) the parameters 103g-1 in message 213 (or in metadata 205a from a message 213) above and (ii) the first symmetric ciphering key S1 210b and MAC key MAC1 210c from a step 214 above in FIG. 4 for device 101. In a step 212', device 101 can also use an initialization vector for the symmetric encryption 212a, where the initialization vector can be either (i) included with metadata 205a in message 213, or (ii) mutually derived with first server 111 using the HKDF 210a in a step 214. Note that for some exemplary embodiments, the use of "double encryption" and symmetric ciphering key S1 210b could be omitted from a step 212', but the MAC key MAC1 210b could be included, such that MAC codes could be generated for the second asymmetric ciphertext C2 102c-2.

At step 215', first server 111 can use symmetric decryption 215a with input of the "double encrypted" second symmetric ciphertext symm-C2 102s-2 received in a message 224. The output of symmetric decryption 215a can comprise the plaintext value of the second asymmetric ciphertext C2 102c-2 for input into KEM DECAPS 103j in step 225a. The plaintext value of the second ciphertext C2 102c-2 can be the string of bits resulting from asymmetric encryption output by device 101 in a step 220 (e.g. raw asymmetrically ciphered data without any symmetric ciphering). The symmetric decryption 215a can be included within cryptographic algorithms 103s for first server 111. The symmetric decryption 215a can include input of (i) the parameters 103g-1 in message 213 (or in metadata 205a from a message 213) above and (ii) the symmetric ciphering key S1 210b and MAC key MAC1 210c from a step 209 above in FIG. 3 for first server 111. In a step 215', first server 111 can also use an initialization vector for the symmetric decryption 215a, where the initialization vector can be either (i) included with metadata in message 224, or (ii) mutually derived with device 101 using the HKDF 210a in a step 209. Note that for some exemplary embodiments, the use of "double encryption" and symmetric ciphering key S1 210b could be omitted from a step 215', but the MAC key MAC1 210b could be included, such that MAC codes could be verified for the second asymmetric ciphertext C2 102c-2.

Note that although step 215' in FIG. 7 depicts and describes that symmetric key S1 201b is used to decrypt the second symmetric ciphertext symm-C2 102s-2, a protocol specifying message 213 and response message 224 could specify the update or a key schedule for the symmetric key S1 210b, such that symmetric key S1 210b based on K1 102k-1 is updated with additional data input into HKDF 210a. For these embodiments, then a step 215' could be conducted with an updated symmetric key S1' 210b', where the key S1 210b is updated to S1' 210b'. In a step 212', device 101 could also use the updated symmetric key S1' 210b' to generate the second symmetric ciphertext symm-C2 102s-2. Note that subsequent key S3 224b (as well as MAC keys) can be updated, where additional shared data is input into the generating HKDF with the original derived shared secret keys, such that key S3 224b could be used to decrypt the fourth symmetric ciphertext symm-C4 102s-4 in step 229 below, but then an updated key S3' 224b' could be used to encrypt the fifth symmetric ciphertext symm-C5 102s-5.

FIG. 8

FIG. 8 is an illustration of (i) an exemplary set of cryptographic parameters for a key exchange mechanism stored and used by a device and a network, and (ii) conducting two KEM for each set of cryptographic parameters in accordance with exemplary embodiments. As depicted and described above in connection with FIG. 1 and FIG. 2, a device 101 can store a set of cryptographic parameters 101x for conducting supported key exchange mechanisms (KEM) such as KEM DECAPS 101j by device 101. As depicted and described above in connection with FIG. 1 and FIG. 2, a second server 112 and/or a network 103 can also store a set of cryptographic parameters 103z for conducting supported KEM such as KEM DECAPS 103j by second server 112.

The cryptographic parameters can specify sets of values for cryptographic algorithms that are supported by device 101 and network 103 or second server 112 in order to support the systems and methods depicted herein. Cryptographic parameters 101x and 103z or subsets thereof can be recorded in nonvolatile memory in each of device 101, and second server 112 or network 103. Cryptographic parameters 101x and 103z can include values for an identification for a collection or subset of a KEM set identifier 801, a key length 802, a type or name 803, and a secure hash algorithm 804. Additional data for conducting KEM can be stored with cryptographic parameters 101z and 103z as well. The depicted parameters in FIG. 8 focus on parameters relevant to conducting a KEM, and different parameters could be used for symmetric ciphering algorithms and also digital signature algorithms.

As contemplated herein, when a selected set of cryptographic parameters such as using the words or description "parameters 101f" or "cryptographic parameters 101f" can specify a set of rows in the parameters for FIG. 8. An individual row of parameters or values can specify sufficient information such that (i) a device 101 can conduct a KEM.KeyGen function to generate a PM key pair, and (ii) using the PM keys to conduct KEM DECAPS functions (such as those depicted and described in connection with FIG. 1). KEM parameters ID 801 can be an identity for a row or set of values for cryptographic parameters 101x and 103z. PK key length 802 could represent the length of a public key in bits or bytes. Cryptographic parameters 101x and 103z could include the length of a private key in bits or bytes as well.

The type or name 803 for a set of cryptographic parameters can specify the cryptographic algorithms to use with PM keys, such as the exemplary names for post-quantum cryptography cryptographic algorithms. The field of post-quantum cryptography continues to develop with proposed algorithms currently undergoing revisions for standardization as of January 2021. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography Standardization" dated Aug. 31, 2020, which is hereby incorporated by reference and referred to as the Wikipedia PQC article.

Hash algorithm 804 in cryptographic parameters 101x and 103z can be the name of a secure hash algorithm, such as the exemplary SHA-256 algorithm depicted, which may also be referred to as "SHA-2". Hash algorithm 804 can also be used in a hash-based key derivation function within the KEM ENCAPS and KEM DECAPS function to generate shared secret keys K1 102k-1 and K2 102k-2.

Although not depicted in FIG. 8, settings or parameters for a symmetric ciphering algorithms can specify (i) the identity or name of a symmetric ciphering algorithm such as "AES", "AES-SIV", 3DES, Blowfish, ChaCha20, etc, and (ii) settings for the symmetric ciphering algorithm. Other possibilities exist as well for data within cryptographic parameters, such as the specification of point compression, encoding rules such as distinguished encoding rules (DER), ASN or CSN syntax notation, padding rules, byte or bit orders such as big endian, little endian, etc.

The specific steps, calculations, and logic for a key exchange mechanism (KEM) can be specified according to the name 803. In general a key exchange mechanism or key exchange specified by a name 803 can comprise using a public key from a remote entity and a local private key or secret key in order to derive a shared secret. The key exchange mechanism could also comprise (i) encrypting a message "m" or random number for deriving a symmetric ciphering key (or value for the key) with a public key and (ii) decrypting an asymmetric ciphertext (which can include message "m" or a random number) for deriving the symmetric ciphering key (or value for the key) with a corresponding private key. Note the name 803 can support different types. In exemplary embodiments depicted in FIG. 8, a first KEM 103k/101j specified by device 101 for the device ephemeral public key ePK.device 101h with the KEM parameters 101f-x and ID 801 of "3" can support a type of "Kyber" (where a different type would be "SIKE" for the ID of "4" in parameters 101f). The number designation after the type can comprise a specific subset of the type, where the subset can be associated with a specific level of security such as equivalent bits for a secure symmetric ciphering algorithm.

FIG. 8 also depicts and exemplary mutual negotiation of parameters for a first KEM 103k (ENCAPS) and 101j (DECAPS), and herein referred to as "KEM 103k/101j", and a second KEM 101k (ENCAPS) and 103j (DECAPS). Note that both the first KEM 103k/101j and second KEM 101k/103j can use a different type of KEM (e.g. completely different algorithm such as a first type based on lattices and a second type based on SIKE, etc.) For some exemplary embodiments (not depicted in FIG. 8), the first KEM 103k/101j and second KEM 101k/103j could use the same type or name 803 for the algorithm of the KEM. For example, the first KEM 103k/101j could use KEM parameters 101f-x that specifies an exemplary name 803 of "Kyber-1024" and the second KEM 101k/103j could also use the same KEM parameters 101f-x that specifies the same exemplary name 803 of "Kyber-1024". For the embodiment described in the previous sentence, the KEM parameters 103f-y from FIG. 2 would be the same as KEM parameters 101f-x. But, in preferred exemplary embodiments, the first KEM 103k/101j can use a first type (e.g. lattice based) that is completely different than a second type for the second KEM 101k/103j (e.g. code-based or SIKE). In this manner, the security of a system 200 for application data can be at least as strong as the stronger of the type for the first KEM 103k/101j and the second KEM 101k/103j.

As depicted in FIG. 8, device 101 in a step 201d from FIG. 2 can select a set of supported cryptographic KEM parameters 101f, which can comprise a list of all parameters supported by device 101 for conducting both a first KEM 103k/101j and a second KEM 101k/103j. The set of supported cryptographic KEM parameters 101f could be recorded or stored in device 101 in nonvolatile memory 101m during a device configuration step 201b. In exemplary embodiments, this set of supported cryptographic KEM parameters 101f comprises at least two rows with distinct KEM parameter identities 801. Each KEM parameter ID 801 could be designated a unique byte code for a field in specifications or standards for a secure session between device 101 and first server 111. For the depicted parameters 101f in FIG. 8, device 101 could support an exemplary list of KEM parameters IDs 801 of "1" through "4".

In addition, device 101 in a step 201d from FIG. 2 can select a specific set of cryptographic KEM parameters 101f-x from parameters 101f, where the specific set of parameters 101f-x can be used to derive the device ephemeral public key ePK.device 101h. As depicted and described in connection with FIG. 2, both the selected set of cryptographic KEM parameters 101f and the specific KEM parameters 101f-x for ePK.device 101h can be included in a message 202 in FIG. 2 above. For the exemplary embodiment depicted in FIG. 8, the KEM parameters 101f-x can be a subset of parameters 101f and could have and ID 801 of "3", although other possibilities exist as well without departing from the scope of the present disclosure.

As depicted in FIG. 8, second server 112 can store a set of supported cryptographic KEM parameters 103f in storage memory 111b' during a server configuration step 201c'. The KEM parameters 103f can comprise a list of all parameters supported by second server 112 and/or a network 103 for conducting both a first KEM 103k/101j and a second KEM 101k/103j. In exemplary embodiments, this set of supported cryptographic KEM parameters 103f comprises at least two rows with distinct KEM parameter identities 801. For the depicted parameters 103f in FIG. 8, second server 112 could support an exemplary list of KEM parameters IDs 801 of "3" through "6". In preferred exemplary embodiments, the received and specified KEM parameters 101f-x from a message 201g-2 by second server 112 can match a row or KEM parameters ID 801 for KEM parameters 103f.

As described in a step 203b in FIG. 2, a second server 112 and network 103 can select a row or set of KEM parameters 103f-y that matches all of the following conditions: (i) is supported by the received KEM parameters 101f, (ii) is supported by the stored KEM parameters 103f, (iii) is different than the specified and received KEM parameters 101f-x for ePK.device 101h, and (iv) KEM parameters 103f-y use a different type than KEM parameters 101f-x (e.g. different algorithm such as code-based if 101f-x specifies lattice-based, etc). As contemplated in the present disclosure, three distinct types of KEM algorithms and parameters can comprise lattice-based, code-based, and SIKE. For the exemplary data depicted in FIG. 8, a second server 112 can select the row with ID 801 of "4" for KEM parameters 103f-y, which meets all of the criteria (i) through (iv) from two sentences above.

All of KEM parameters 101f, 103f, 101f-x and 103f-y contemplated in the present disclosure could represent different data or values than that depicted in FIG. 8 without departing from the scope of the present disclosure, such as including or specifying different KEM mechanisms, parameters, and types of PQC KEM algorithms. But in preferred exemplary embodiments, the parameters 103f-y selected by second server 112 in a step 203b for the second KEM 101k/103j and corresponding server certificate cert.server with a PK.server 103h for parameters 103f-y support all of the criteria for (i) through (iv) as described in the paragraph above.

For other exemplary embodiments, such as for devices 101 with more restricted memories that can support a single KEM algorithms such as a single row in the table depicted in FIG. 8, then both the first KEM 103k/101j and the second KEM 101k/103j could be conducted with the same KEM parameters. In other words, for the embodiment described in this paragraph, the parameters 101f, 101f-x, and 103f-y could be the same and use the same values and settings for both the first KEM 103k/101j and the second KEM 101k/103j. For the embodiment described in this paragraph, then a server certificate cert.server 103c can include a server static public key PK.server 103h with KEM parameters 103f-y that are the same as the KEM parameters 101f-x for ePK.device 101h transmitted by device 101 in a message 202.

FIG. 8 also depicts the use of (i) first KEM parameters 101f-x for a first KEM 103k/101j and (ii) second KEM parameters 103f-y for a second KEM 101k/103j. The depiction in FIG. 8 provides additional details showing the formatting and use of KEM parameters with PM keys and ENCAPS and DECAPS functions. A device 101 can select first KEM parameters 101f-x as a subset of KEM parameters 101f stored within device 101. The first KEM parameters 101f-x can be used with the KEM KeyGen function to generate a device ephemeral public key ePK.device 101h-x and device ephemeral private key eSK.device 101i-x. The added designation of "-x" shows that keys are formatted and use the selected parameters "x", which can represent a designated row or ID 801 from the table in FIG. 8. In other words, as contemplated herein, the designation of eSK.device 101i-x and ePK.device 101h-x and the use of the "-x" designation indicate that the ephemeral server PM keys are for the selected first subset 101f-x of KEM parameters 101f for device 101. The first KEM 103k/101j can comprise first server 111 KEM ENCAPS 103k and device 101 KEM DECAPS 101j using the first KEM parameters 101f-x.

A second server 112 can select second KEM parameters 103f-y in a step 203b as a subset of KEM parameters 103f stored within second server 112, and also preferably matching all of the conditions (i) through (iv) for a step 203b described three paragraphs above. For some embodiments, the selection of second KEM parameters 103f-y in a step 203b would support the conditions (i) through (iii) for a step 203b described three paragraphs above. The selected second KEM parameters 103f-y from a step 203b can be used with a step 204 to select a server certificate cert.server 103c and server private key SK.server 103i supporting the KEM parameters 103f-y. The second KEM 101k/103j can comprise second server 112 KEM DECAPS 103j (with SK.server 103i) and device 101 KEM ENCAPS 101j (with PK.server 103h) using the second KEM parameters 103f-y.

FIG. 9a

Figure 9A:
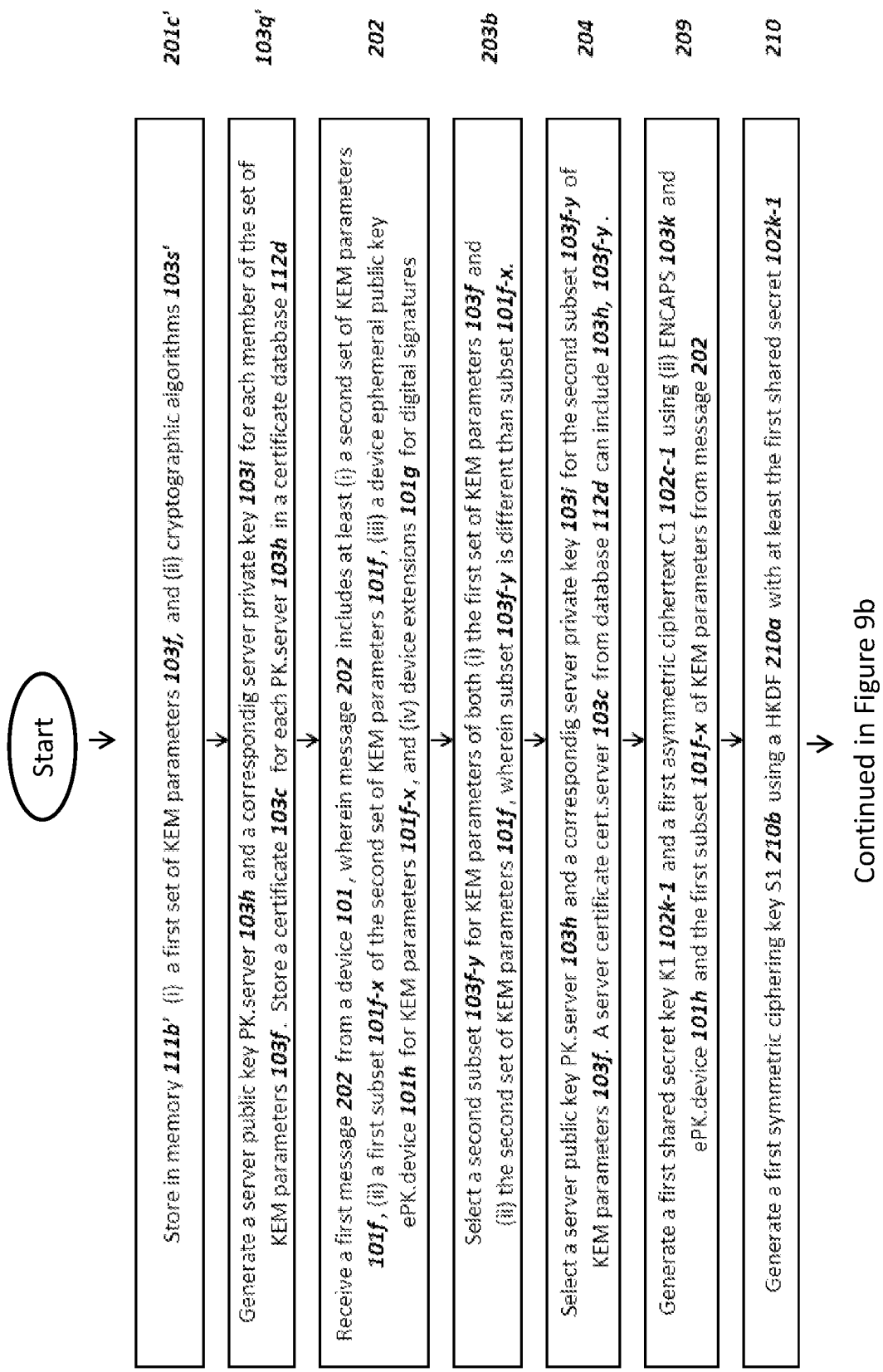
FIG. 9a is a flow chart illustrating exemplary steps for a network use two different types of PQC KEM algorithms in order to securely and efficiently conduct two key exchange mechanisms with a device, in accordance with exemplary embodiments.

FIG. 9a is a flow chart illustrating exemplary steps for a network use two different types of PQC KEM algorithms in order to securely and efficiently conduct two key exchange mechanisms with a device, in accordance with exemplary embodiments. The steps and components depicted in FIG. 9a for a network 103 are also depicted and described in connection with FIG. 2 and additional Figures above. A network 103 could use both (i) a first server 111 with server hardware 111h and (ii) a second server 112 with server hardware 111h' in order to conduct the steps in FIG. 9a and FIG. 9b below, where server hardware 111h and 111h' is depicted and described in connection with FIG. 1 and also FIG. 10 below. The sequence of steps depicted can begin with a step 201c' and end with a step 226 (depicted in FIG. 9b). Note that a network can conduct the additional steps as depicted in FIG. 2 and additional Figures above, and FIG. 9a provides a summary of the primary steps for preferred embodiments where a network 103 can use two different types of KEM algorithms for two different PQC KEM with a device 101.

At step 201c', a network 103 and/or server 112 can store in a nonvolatile memory 111b' (i) a first set of KEM parameters 103f and (ii) cryptographic algorithms 103s'. In some exemplary embodiments such as embodiments depicted in FIG. 2, a step 201c' for a nonvolatile memory 111b' could be within a second server 112. A nonvolatile memory 111b' could also be in other locations and storage devices within a network 103 (or possibly securely connected to a network 103) without departing from the scope of the present disclosure. The first set of KEM parameters 103f can be a subset of cryptographic parameters 103x for second server 112 and network 103 as depicted and described in connection with FIG. 1. The data stored at a step 201c' can be stored during a configuration step for a second server 112. An example of the first set of KEM parameters 103f are depicted and described in connection with FIG. 8 above (with the data depicted as "in 111b"), and other possibilities exist as well without departing from the scope of the present disclosure.

At step 103q', first server 111 can use a PQC.KeyGen function 103q to generate a server PM key pair comprising a server public key PK.server 103h and a server private key SK.server 103i. A PQC key pair generation algorithm 103q can use each of the KEM parameters 103f in order to generate (i) a random number from a random number generator in order to derive or generate a server PM private key SK.server 103i and (ii) a corresponding server PM public key PK.server 103h. The server public key PK.server 103h for each of the supported KEM parameters 103f could be signed by a certificate authority and stored in a plurality of server certificates cert.server 103c. The plurality of server certificate cert.server 103c could be stored in a certificate database 112d. As one example when using the BIKE protocol for PK.server 103h-y and SK.server 103i-y, the key generation function could comprise the step 1 labeled "1. Generate Ephemeral QC-MDPC key pair (sk, pk)" in the paper "BIKE—Bit-Flipping Key Encapsulation" from the MST Post-Quantum Cryptography Standardization Conference on April. 13, 2018, Fort Lauderdale, Fla., USA, which is herein incorporated by reference and referred to as the "BIKE paper". BIKE would be a type of algorithm that is code-based, and other types of algorithms for a step 204 include lattice-based and SIKE.

A step 202 can comprise first server 111 receiving the message 202 from device 101. Message 202 can include at least (i) a second set of KEM parameters 101f supported by device 101 in communications with the first server 111, (ii) a first subset 101f-x of both the second set of KEM parameters 101f and the first set of KEM parameters, and (iii) a device ephemeral public key ePK.device 101h for KEM parameters 101f-x. Although not depicted in FIG. 9a, the message 202 can include the other or additional data for a message 202 as depicted and described in connection with FIG. 2. As one example, a message 202 could include device extensions 101g, which could specify additional cryptographic algorithms 101s and cryptographic parameters 101x for other cryptographic functions such as symmetric ciphering and digital signature algorithms supported by device 101. In addition, a message 202 can include a random number random 1 202a generated by device 101, where the random number can be useful for making message 202 unique and more resistant to replay attacks (as well as network 103 using random number random 1 202a in generating a response message 213). As contemplated herein, the first subset 101f-x of the second set of KEM parameters 101f can be referred to as KEM parameters 101f-x. The KEM parameters 101f-x can specify a first type of KEM algorithm (e.g. lattice-based, code-based, or SIKE), such as, but not limited to, the exemplary KEM parameter 101f-x depicted FIG. 8.

At step 203b, network 103 (possibly using a second server 112 as depicted and described in connection with FIG. 2) can select a second subset 103f-y of both (i) the first set of KEM parameters 103f stored in the network 103 in a step 201c' and (ii) the second set of KEM parameters 101f supported by device 101 and received from device 101 in the first message 202 to the first server 111. For embodiments where a second server 112 conducts the step 203b, then the first server 111 can send both (i) the first subset 101f-x and (ii) the second set of KEM parameters in a message 201g-2 as depicted and described in connection with FIG. 2 above.

A step 203b to select the second subset 103f-y is also depicted and described in connection with FIG. 8 above. As contemplated herein, the second subset 103f-y of the first set of KEM parameters 101f can be referred to as KEM parameters 103f-y. In exemplary embodiments, the KEM parameters 103f-y can specify a second type of KEM algorithm (e.g. lattice-based, code-based, or SIKE, but also different than the first type for KEM parameters 101f-x in message 202 above). An exemplary KEM parameters 103f-y according to this exemplary embodiment is depicted and described in connection with FIG. 8 above.

At step 204, a network 103 and/or a second server 112 can use the selected KEM parameters 103f-y in a step 203b above in order to select a server certificate cert.server 103c and corresponding server static private key SK.server 103i from a certificate database 112d. The server certificate cert.server 103c with server static public key PK.server 103h selected in a step 204 can comprise the value or data for the "Server Certificate" fields within a "Server Hello" message for a second message 213 below.

Note that the network 103 could store a certificate database 112d (depicted with second server 112 in FIG. 1), where the certificate database 112d could store a plurality of server certificates cert.server 103c that support both (i) the server ID 111a (such as a domain name or common name in cert.server 103c) and (ii) different combinations for (X) certificate issuers and intermediate certificates used for the digital signature over the server static public key PK.server 103h in the server certificate cert.server 103h and (Y) digital signature algorithms supported by device 101 in device extensions 101g. A step 204 to select the server certificate cert.server 103c can use (i) a name of a certificate issuer in device extensions 101g and (ii) a supported digital signature algorithms (e.g. Dilithium IV w/SHA 256) in device extensions 101g in order to find a matching server certificate cert.server 103c in a certificate database 112d. For some embodiments, the step 204 can comprise the second server 112 and/or network 103 querying the certificate database 112d with data for supported certificate issuers and supported digital signature algorithms in device extensions 101g (along with server ID 111a) in order the receive the server certificate cert.server 103c for use network 103. As depicted in FIG. 2, the server ID 111a and device extensions 101g could be received in a message 201g-2.

In some exemplary embodiments, at a step 204 a network 103 or second server 112 could select or derive a server public key 103h for the KEM parameters 103f-y selected in a step 203b above without requiring the use of a server certificate cert.server 103c. For these embodiments, the selected or derived server public key 103h (supporting KEM parameters 103f-y) and KEM parameters 103f-y could be received and/or stored by a first server 111 without requiring a second server 112 to send a server certificate cert.server 103c in a message 201g-3. A subsequent message 213 below could include server public key 103h (supporting KEM parameters 103f-y) and KEM parameters 103f-y without including a server certificate cert.server 103c described within this paragraph.

At step 209, first server 111 can (i) generate a first shared secret key K1 102k-1 and a first asymmetric ciphertext C1 102c-1 using (ii) the KEM ENCAPS 103k function and ePK.device 101h and the first subset 101f-x of KEM parameters from message 202. Details for an exemplary step 209 by first server 111 are also depicted and described in connection with FIG. 3 above. In a step 210, first server 111 and/or network 103 could use the first shared secret key K1 102k-1 with a HKDF 210a in order to generate at least a first symmetric ciphering key S1 201b and MAC key MAC1 201c. The HKDF 210a could also generate associated keys, such as a symmetric ciphering key for use of encryption by the device, MAC keys, and initialization vectors. The HKDF 210a could also include data that is mutually shared between device 101 and a network 103, such as data from the first message 202 and also values or fields specified by a protocol for a secure session between device 101 and network 103. A first server 111 and/or a network 103 could also then select plaintext 211a for encryption into a first symmetric ciphertext, as described in a step 211 in FIG. 2 and FIG. 3. Although not depicted in FIG. 9a, for some embodiments, a step 209 could be conducted by a first server 111 and/or network 103 before a step 204 above.

FIG. 9b

Figure 9B:
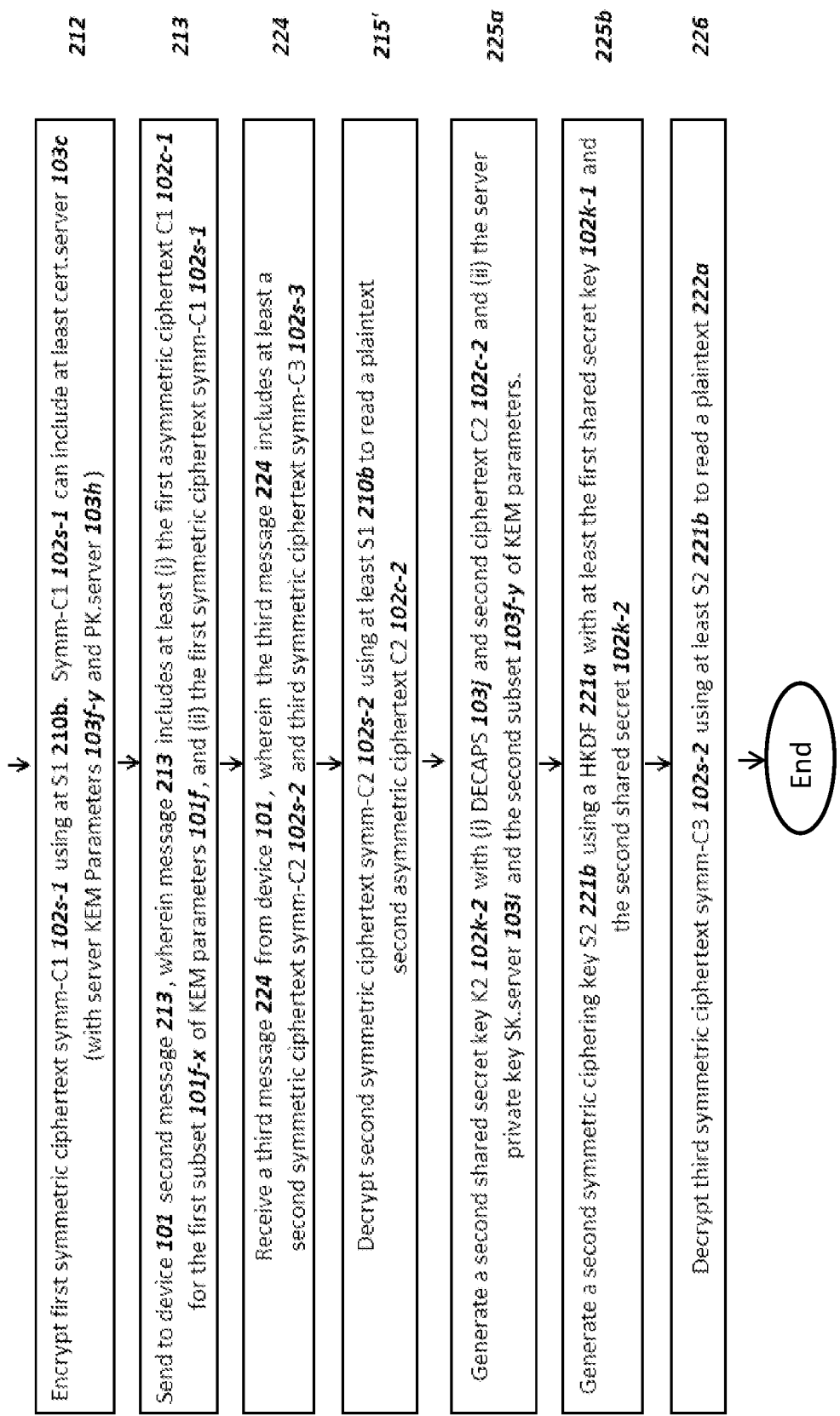
FIG. 9b is a flow chart illustrating exemplary steps for a network use two different types of PQC KEM algorithms in order to securely and efficiently conduct two key exchange mechanisms with a device, in accordance with exemplary embodiments.

FIG. 9b is a flow chart illustrating exemplary steps for a network use two different types of PQC KEM algorithms in order to securely and efficiently conduct two key exchange mechanisms with a device, in accordance with exemplary embodiments. The steps depicted in FIG. 9b are a continuation of the steps for the network 103 depicted and described in connection with FIG. 9a above. The steps and components depicted in FIG. 9b for a network 103 are also depicted and described in connection with FIG. 2 and additional Figures above. A network 103 could use both (i) a first server 111 with server hardware 111h and (ii) a second server 112 with server hardware 111h' in order to conduct the steps in FIG. 9b herein and FIG. 9a above, where server hardware 111h and 111h' is depicted and described in connection with FIG. 1 and also FIG. 10 below. The sequence of steps depicted can begin with a step 201c' (in FIG. 9a above) and end with a step 226. Note that a network can conduct the additional steps as depicted in FIG. 2 and additional Figures above, and FIG. 9b provides a summary of the primary steps for preferred embodiments where a network 103 can use two different types of KEM algorithms for two different PQC KEM with a device 101.

At step 212, first server 111 and/or network 103 can use (i) a symmetric ciphering algorithm 212a from cryptographic algorithms 103s supporting the device extensions 101g, (ii) the symmetric ciphering key from the HKDF 210a in a step 210, and (iii) the plaintext 211a selected from a step 211 (depicted in FIG. 2) in order to generate the first symmetric ciphertext symm-C1 102s-1. The use an operation of a step 212 is depicted and described in connection with FIG. 2 and also FIG. 3. The symmetric encryption 212a can include input of the parameters specified in metadata 205a from a step 205 above and the symmetric ciphering key S1 210b and MAC key MAC1 210c from a step 210 above. In a step 212, first server 111 and/or network 103 can also use an initialization vector for the symmetric encryption 212a, where the initialization vector can be included with metadata 205a (or alternatively the initialization vector could be mutually derived by device 101 and first server 111 using the HKDF 210a).

In other words, at step 212, the first server 111 can encrypt the first symmetric ciphertext symm-C1 102s-1 using at least the first shared secret K1 102k-1 (where the first shared secret K1 102k-1 is used in a HKDF 210a to derive at least a first symmetric ciphering key S1 210b). Symm-C1 102s-1 can include, Server KEM Parameters 103f-y, PK.server 103h, subset of server extensions 103g-1 which can include a certificate issuer and digital signature cryptographic algorithm 103s'. For some embodiments the first symmetric ciphertext symm-C1 102s-1 can include a server certificate cert.server 103c for the Server KEM Parameters 103f-y and PK.server 103h. For other embodiments, the use of a server certificate cert.server 103c is not required and the first symmetric ciphertext symm-C1 102s-1 can include the Server KEM Parameters 103f-y and PK.server 103h-y. For the embodiments described in the previous sentence a second server certificate cert.server 103c' for digital signatures and a digital signature over at least the Server KEM Parameters 103f-y and PK.server 103h could be included the first symmetric ciphertext symm-C1 102s-1.

Network 103 and/or first server 111 can send to device 101 a second message 213, wherein message 213 includes at least (i) the first asymmetric ciphertext C1 102c-1 for the first subset 101f-x of KEM parameters 101f-x, and the first symmetric ciphertext symm-C1 102s-1. Additional data could be included in the message 213, as depicted and described in connection with FIG. 2 above for a message 213, which could also comprise a "Server Hello" message from first server 111 and/or network 103 to device 101. As one example of the additional data, the first symmetric ciphertext symm-C1 102s-1 can include the random number random 1 202a received by first server 111 in a message 202 from device 101. The first symmetric ciphertext symm-C1 102s-1 can include the server public key PK.server 103h and parameters 103f-y. Although not depicted in a FIG. 9b, the device 101 could conduct the steps to process the message 213 as depicted and described in connection with FIG. 2 and additional Figures above, such as steps 214 through 212'.

First server 111 can then receive a third message 224 from device 101, wherein the third message 224 includes at least a second symmetric ciphertext symm-C2 102s-2 and a third symmetric ciphertext symm-C3 102s-3. The third message 224 between device 101 and the first server 111 is depicted and described in connection with FIG. 2 above. Both the first message 202 and the third message 224 can include identification information from device 101, such as a session identifier in order for network 103 to associate the third message 224 with the first message 202.

The first server 111 and/or network 103 can then conduct a step 215' to decrypt the second symmetric ciphertext symm-C2 102s-2 using at least the first symmetric ciphering key S1 210b to read a plaintext second asymmetric ciphertext C2 102c-2. As described above, a first symmetric ciphering key S1 210b could comprise two portions, where a first portion S1 210b-1 was used by a network 103 and/or first server 111 in an encryption step 212, and a second portion S1 210b-2 is used by network 103 and/or first server 111 in a decryption step 215'. A step 215' is depicted and described in connection with FIG. 7 above. The second ciphertext C2 102c-2 can be generated by device 101 from the KEM ENCAPS function 101k by a device 101 using (i) the server static public key PK.server 103h along with (ii) the KEM parameter 103f-y sent in a message 213 above.

In other words, in exemplary embodiments as depicted in FIG. 2 and also FIG. 7, the second ciphertext C2 102c-2 could also be encrypted into a "double encrypted" second symmetric ciphertext symm-C2 102s-2, where device 101 encrypts the second ciphertext C2 102c-2 using the mutually shared symmetric ciphering key S1 210b and MAC key MAC1 210c. As depicted in FIG. 4 above, device 101 can (i) derive the mutually shared symmetric ciphering key S1 210b and MAC key MAC1 210c using a step 214 and then (ii) encrypt the second ciphertext C2 102c-2 into a "double encrypted" second symmetric ciphertext symm-C2 102s-2 using a step 212' from FIG. 7.

For these embodiments with "double encrypted" second symmetric ciphertext symm-C2 102c-2, first server 111 could use a step 215' to decrypt the "double encrypted" second symmetric ciphertext symm-C2 102s-2 using the mutually shared symmetric ciphering key S1 210b and MAC key MAC1 210c (derived using at least shared secret key K1 102k-1 in FIG. 3) in order to read the asymmetric ciphertext C2 102c-2, after receipt of the message 224. As described above, for some embodiments the use of "double encryption" for the second ciphertext C2 102c-2 could be omitted in a step 215', but the MAC codes for the second ciphertext C2 102c-2 could be verified by the first server 111 and/or network 103 using the MAC key MAC1 210c, and in this manner the second ciphertext C2 102c-2 in the message 224 could be authenticated (e.g. only device also with MAC key MAC1 210c could generate the MAC codes over the second ciphertext C2 102c-2.

Also as described for two portions of a first symmetric ciphering key S1 210b three paragraphs above, a MAC key MAC1 210c could comprise two portions of MAC1 210c-1 and MAC1 210c-2, where network 103 and/or first server 111 could use the first portion of MAC1 210c-1 to generate MAC codes for the first symmetric ciphertext symm-C1 102s-1, and network 103 and/or first server 111 could use the second portion of MAC1 210c-2 to verify MAC codes over the second asymmetric ciphertext C2 102c-2 received in a message 224.

At step 225a, network 103 and/or a second server 112 can generate a second shared secret key K2 102k-2 with (i) DECAPS 103j and second asymmetric ciphertext C2 102c-2 and (ii) the server private key SK.server 103i and the second subset 103f-y of KEM parameters. A step 225a by network 103 and/or second server 112 was depicted and described in connection with FIG. 2 and also FIG. 5 above. At step 225a, network 103 and/or second server 112 can use the specified KEM parameters 103f-y transmitted in message 213 along with cryptographic algorithms 103s' to conduct the KEM DECAPS 103j function with the received second ciphertext C2 102c-2. The server can use the server private key of SK.server 103i with the KEM DECAPS 103j and the received second asymmetric ciphertext C2 102c-2 in order to generate the second shared secret key K2 102k-2.

At a step 225b, network 103 and/or first server 111 can use at least the second shared secret key K2 102k-2 with the HKDF 221a (depicted in FIG. 5 above) in order to generate the second symmetric ciphering key S2 221b and the second MAC key MAC2 221c. In some exemplary embodiments as depicted for a step 225b in FIG. 9b, a HKDF 221a can also include input of at least the first shared secret key K1 102k-1 in addition to the second shared secret key K2 102k-2. For embodiments where network 103 includes both a first server 111 and a second server 112, as depicted and described in connection with FIG. 1, a second server 112 could (i) conduct the step 225a to generate the second shared secret key K2 102k-2 and (ii) send the first server 111 the second shared secret key K2 102k-2 in a message 201g-5.

At step 226, network 103 and/or first server 111 can decrypt the third symmetric ciphertext symm-C3 102s-3 using at least the second symmetric ciphering key S2 221b. In other words, the network 103 and/or first server 111 can decrypt the third symmetric ciphertext symm-C3 102s-3 using at least the K2 102k-2 and K1 102k-1 (where an HKDF 221a can use at least the K2 102k-2 and K1 102k-1 in order to generate at least the second symmetric ciphering key S2 221b). In other words, in exemplary embodiments the shared secret keys K2 102k-2 and K1 102k-1 may not normally be used directly as the symmetric ciphering key for the third symmetric ciphertext symm-C3 102s-3, and the symmetric ciphering key to decrypt the third symmetric ciphertext symm-C3 102s-3 can be derived from at least K2 102k-2 and K1 102k-1 with a HKDF 221a in FIG. 5.

At step 226, network 103 and/or first server 111 can use symmetric decryption 226a with the third symmetric ciphertext symm-C3 102s-3 from a third message 224 in order to read the plaintext 222a. The symmetric decryption 226a can be included within cryptographic algorithms 103s for first server 111. The symmetric decryption 226a can include input of the parameters specified in metadata 224a from the third message 224 and the symmetric ciphering key S2 221b and MAC key MAC2 221b from a step 225b above.

Although FIG. 9b depicts "End" after the step 226, the "End" illustrates the conclusion of the depicted specific steps for a network 103 to decrypt a third symmetric ciphertext symm-C3 102s-3. A network 103 and a device 101 could conduct additional steps depicted and described in connection with FIG. 2 and additional Figures above in order to process and securely communicate additional information.

FIG. 10

Figure 10:
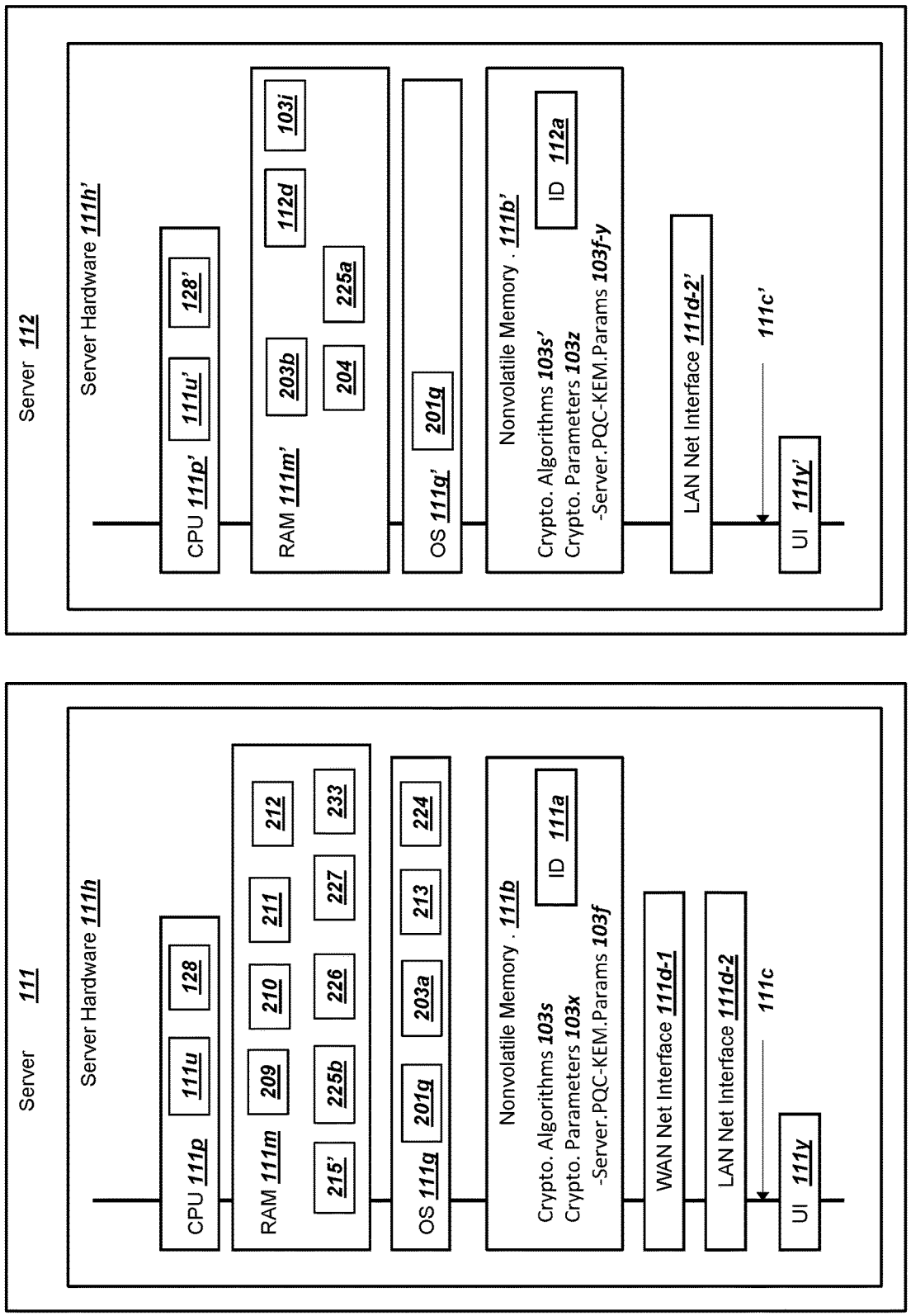
FIG. 10 is a graphical illustration of hardware, firmware, and software components for a first server and a second server, in accordance with exemplary embodiments.

FIG. 10 is a graphical illustration of hardware, firmware, and software components for a first server and a second server, in accordance with exemplary embodiments. FIG. 10 is illustrated to include several components that can be common within a first server 111 and a second server 112. First server 111 can include or operate with server hardware 111h and the second server 112 can include or operate with server hardware 111h'. First server 111 may consist of multiple electrical components in order to communicate with both (i) a plurality of devices 101 and at least (ii) one second server 112. In exemplary embodiments and as depicted in FIG. 10, first server 111 can include a server identity 111a, a processor 111p (depicted as "CPU 111p"), random access memory (RANI) 111m, an operating system (OS) 111g, storage memory 111b (depicted as "nonvolatile memory 111b"), a Wide Area Network (WAN) interface 111d-1, a LAN interface 111d-2, a system bus 111c, and a user interface (UI) 111y. Server identity 111a could comprise a preferably unique alpha-numeric or hexadecimal identifier for first server 111, such as an Ethernet MAC address, a domain name service (DNS) name, a Uniform Resource Locator (URL), an owner interface identifier in an IPv6 network, a serial number, an IP address, or other sequence of digits to uniquely identify each of the many different possible nodes for a first server 111 connected to an IP network 107. Server identity 111a can preferably be recorded in a non-volatile memory and recorded by a network 103 upon configuration of a first server 111, such as during a configuration step 201c depicted and described in connection with FIG. 2 above. Server identity 111a may also be a number or string to identify an instance of first server 111 running in a cloud or virtual networking environment.

In exemplary embodiments, first server 111 can operate with multiple different server identities 111a, such as a first server identity 111a comprising a DNS name and a second server identity 111a comprising an IP address and a port number. A third server identity 111a could comprise an MAC address for WAN interface 111d-1. A fourth server identity 111a can comprise an identifier for an instance of a virtual machine operating in a cloud networking environment. A different first server 111 could be associated with a different IP address and port number or a different MAC address for WAN interface 111d-1. In exemplary embodiments, (i) a first server 111 with a first server identity 111a can operate with a first Internet Protocol address and port (IP:port) number with a first set of server extensions 103g and (ii) a second or different first server 111 with a second server identity 111a can operate with a second IP:port number and a second set of server extensions 103g. Other possibilities exist as well for the use of a plurality of different server identities 111a without departing from the scope of the present disclosure.

The CPU 111p can comprise a general purpose processor appropriate for higher processing power requirements for a first server 111, and may operate with multiple different processor cores. CPU 111p can comprise a processor for first server 111 such as an ARM® based process or an Intel® based processor such as belonging to the XEON® family of processors, and other possibilities exist as well. For some exemplary embodiments, the CPU 111p can be based on a processor using the RISC-V architecture. CPU 111p can utilize bus 111c to fetch instructions from RAM 111m and operate on the instruction. CPU 111p can include components such as registers, accumulators, and logic elements to add, subtract, multiply, and divide numerical values and record the results in RAM 111m or storage memory 111b, and also write the values to an external interface such as WAN interface 111d-1 and/or LAN interface 111d-2. In exemplary embodiments, CPU 111p can perform the mathematical calculations for KEM DECAPS 103j, symmetric ciphering, etc. depicted and described in connection with in FIG. 1, FIG. 2, etc., above. A CPU 111p could also comprise a "system on a chip" (SOC) with a plurality of cores, including examples of the Amazon Graviton family of processors such as the Graviton 2 or the Apple "M" family of processors such as the M1

For first servers 111 operating as a virtual machine or a container such as, but not limited to, within Docker or Kubernetes, the first server 111 could be allocated a portion of a physical processor CPU 111p from a host operating system in order for the first server 111 to conduct processing and computational steps as contemplated herein. The portion of a physical processor CPU 111p for the first server 111 could comprise different embodiments without departing from the scope of the present disclosure. A CPU 111p for a first server 111 could comprise a "time slice" of a physical SOC within a physical host server (such as repeated brief periods of time on the order of milliseconds or less for CPU 111p) that is shared with other processes or virtual machines running on the host. The CPU 111p for a first server 111 could comprise a dedicated (for a period of time) processing core of a physical SOC within a physical host server. Or, the CPU 111p for a first server could comprise a combination of the allocation of resources from a physical SOC within a physical host server as described in the previous two sentences.

CPU 111p can also include a secure processing environment (SPE) 111u in order to conduct post-quantum cryptography (PQC) key exchange mechanism (KEM) operations and algorithms, such as, but not limited to, (i) conducting KEM ENCAPS function 103k depicted and described in connection with FIG. 1 above and (ii) conducting HKDF function 210a in order to derive first shared secret key K1 102k-1. SPE 111u can comprise a dedicated area of silicon or transistors within CPU 111p in order to isolate the PQC KEM operations from other programs or software operated by CPU 111p, including many processes or programs running operating system 111g. SPE 111u could contain RAM memory equivalent to RAM 111m and non-volatile memory equivalent to storage memory 111b, as well as a separately functioning processor on a smaller scale than CPU 111p, such as possibly a dedicated processor core within CPU 111p. SPE 111u can comprise a "secure enclave" or a "secure environment", based on the manufacturer of CPU 111p. In some exemplary embodiments, an SPE 111u can be omitted and the CPU 111p can conduct ECC operations or calculations without an SPE 111u.

A processor 111p for first server 111 could include a hardware random number generator 128. The hardware random number generator 128 can use a sensor such as a sensor in first server 111 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number can also be used to generate the value M1 208a as a random number for the KEM ENCAPS function 103k in a step 208 above.

RAM 111m may comprise a random access memory for first server 111. RAM 111m can be a volatile memory providing rapid read/write memory access to CPU 111p. RANI 111m could be located on a separate integrated circuit in first server 111 or located within CPU 111p. The RANI 111m can include data recorded in first server 111 for the operation when communicating with a plurality of devices 101 or a second server 112. RAM 111m may be connected to CPU 111p using a system bus 111c which could comprise a memory bus, such as supporting DDR5 RAM memory and other possibilities exist as well. As depicted and described in connection with FIG. 1 above, RANI 111m could also include an operating system 111g, or components of an operating system 111g such as a kernel, and other components of operating system 111g, such as some supporting libraries could be stored within storage memory 111b.

The system bus 111c may be any of several types of bus structures including a memory bus or memory controller, a peripheral bus, and a local bus using any of a variety of bus architectures including a data bus. System bus 111c connects components within first server 111 as illustrated in FIG. 10, such as transferring electrical signals between the components illustrated. First server 111 can include multiple different versions of bus 111c to connect different components, including a first system bus 111c between CPU 111p and RAM 111m (which could be a memory bus), and a second system bus 111c between CPU 111p and WAN interface 111d-1 or LAN interface 111d-2, which could be an I2C bus, an SPI bus, a PCI bus, or similar data busses.

In exemplary embodiments, RAM 111m operating with first server 111 can record values and algorithmic steps or computer instructions for conducting a post-quantum cryptography (PQC) key encapsulation mechanisms (KEM). RAM 111m may also store the value M1 208a from a step 208 above in FIG. 2 and also FIG. 1. RAM 111m may store the computer executable instructions for conducting the steps and associated variables and values or constants for steps 209, 210, 211, 212, 215', 225b, 226, 227, 232, 233, 234, and 235, which are depicted and described in connection with FIG. 2 above and also previous Figures herein. The exemplary steps depicted in RAM 111m listed in the above sentence can comprise computer executable instructions for the processor CPU 111p as well as memory cells for storing constants and variables associated with conducting the computer executable instructions. The computer executable instructions for the different steps can be stored in storage memory 111b when the first server 111 is powered off or in an extended sleep state (such as greater than 10 seconds). The computer executable instructions can be moved by an OS 111g from the storage memory 111b to the RAM 111m during a boot process or a process for the first server 111 to begin supporting communications with at least one device 101.

Note that the associated data or values for the steps can also be stored within RAM 111m for a period of time to both conduct the step and use the resulting data in subsequent steps. As one example, in a step 210 to conduct a hash based key derivation function (HKDF) 210a (depicted and described in connection with FIG. 3 above), the output from a step 209 comprising a first shared secret key K1 102k-1 can be stored in RANI 111m and be input into the HKDF 210a. In other words and as one example, the depiction of a step 210 in RAM 111m can include both (i) the computer executable instructions to conduct the step and (ii) the data or values associated with the step such as the first shared secret key K1 102k-1 generated or processed by the step. Consequently, a step depicted in RANI 111m can include all of the associated data and instructions or logic to conduct the step, where details for the steps are depicted in the Figures above. The output of the HKDF 210a can comprise the first shared symmetric ciphering key S1 210b and MAC key MAC1 210c, which could also be stored within RAM 111m and within physical memory associated with a step 210 allocated to RAM 111m.

As another example for RAM 111m within first server 111 or allocated to first server 111, RANI 111m could store both computer executable instructions and associated values for a step 225b as depicted in FIG. 5 above. The step 225b within RAM could include the data from message 213, the first shared secret key K1 102k-1, the second shared secret key K2 102k-2 (received from a message 201g-4 from second server 112), and the HDKF 221a, as well as the second symmetric ciphering keys S2 221b and MAC2 221c. For some data within RANI 111m for step 225b, the depicted data for a step 225b or recited data from the previous sentence could comprise a pointer within RAM 111m for a step 225b, such that the data could be recorded or stored within RAM 111m in a different location within RAM 111m than the memory allocated to data for step 225b within RANI 111m.

The operating system (OS) 111g can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 111b, etc. The operating system 111g may include timers and schedulers for managing the access of software to hardware resources within first server 111, where the hardware resources managed by OS 111g can include CPU 111p, RAM 111m, nonvolatile memory 111b, and system bus 111c, and well as connections to the IP network 107 via a WAN interface 111d-1 and also the second server 112 via LAN interface 111d-2. The operating system shown of 111g can be appropriate for a higher power computing device with more memory and CPU resources (compared to a device 101). Example operating systems 111g for a first server 111 includes Linux or Windows® Server, and other possibilities exist as well. Although depicted as a separate element within first server 111 in FIG. 10, OS 111g may reside in RAM 111m and/or nonvolatile memory 111b during operation of first server 111.

As depicted in FIG. 10, OS 111g in FIG. 10 can contain algorithms, programs, or computer executable instructions (by processor 111p or SPE 111u) for conducting a secure session 201g with the second server 112, including the steps to process the transmission of a message 201g-2 and receive a message 201g-3. An OS 111g can include algorithms for the first server 111 to conduct a step 203a for processing a message 202 from device 101, where the message 202 and steps 203a is depicted and described in connection with FIG. 2 above. An OS 111g can also include the executable instructions for processor 111p to send messages, such as but not limited to, a message 213 as depicted and described above in connection with FIG. 2. In other words, OS 111g can include libraries and drivers such that the message 213 could be assembled based on the output and data from the series of steps 203a through 212 depicted and described in connection with FIG. 2, and then the OS 111g could write the data for message 213 via the system bus 111c to the WAN interface 111d-1, where the WAN interface 111d-1 can subsequently transmit the message 213 to the IP network 107.

An OS 111g can also include the executable instructions for processor 111p to receive messages such as, but not limited to, a message 224 as depicted and described above in connection with FIG. 2. In other words, OS 111g can include libraries and drivers such that the message 224 could be received from the IP network 107 using the WAN interface 111d-1 and system bus 111c. The OS 111g could parse the data received in a message 224 and store contents from the message 224 in RAM 111m such that the first server 111 could conduct the subsequent steps using the data from the message 224. The OS 111g could write data from the message 224 to RAM 111m, and then the computer executable steps in RAM 111m such as associated with a step 225b and 226 could process the data from a message 224. The receipt of a message 224 and then steps 225b and 226 using the data from a message 224 is also depicted and described in connection with FIG. 2 above.

Nonvolatile memory 111b or "storage memory" 111b (which can also be referred to herein as "memory 111b") within first server 111 can comprise a non-volatile memory for long-term storage of data, including times when first server 111 may be powered off or within an extended sleep state such as a sleep state longer than a few seconds. Memory 111b may be a NAND flash memory or a NOR flash memory and record firmware for first server 111, such as a bootloader program and OS 111g. Memory 111b can record long-term and non-volatile storage of data or files for first server 111. In an exemplary embodiment, OS 111g is recorded in memory 111b when first server 111 is powered off, and portions of memory 111b are moved by CPU 111p into RAM 111m using a boot loader when first server 111 powers on.

Memory 111b (i) can be integrated with CPU 111p into a single integrated circuit (potentially as a "system on a chip"), or (ii) operate as a separate integrated circuit or a removable card or "disk", such as a solid state drive (SSD). Storage memory 111b can also comprise a plurality of spinning hard disk drives in a redundant array of independent disks (RAID) configuration. Memory 111b may also be referred to as "server storage" and can include exemplary file systems of FAT16, FAT 32, NTFS, ext3, ext4, UDF, or similar file systems. As contemplated herein, the terms "memory 111b", "storage memory 111b", and "nonvolatile memory 111b" can be considered equivalent. As depicted in FIG. 10, non-volatile memory 111b can record cryptographic algorithms 103s, cryptographic parameters 103x, server PQC KEM parameters 103f, and at least on server identity of 111a.

First server 111 can include a WAN interface 111d-1 to communicate with IP network 107 and a plurality of devices 103, as depicted in FIG. 1 above (where FIG. 1 depicts a single device 103). WAN interface 111d-1 can comprise either a wired connection such as Ethernet or a wireless connection. For wireless configurations of first server 111, then WAN interface 111d-1 can comprise a radio, which could connect with an antenna in order to transmit and receive radio frequency signals. For a wireless configuration of first server 111, WAN interface 111d-1 within first server 111 can provide connectivity to an IP network 107 through 3GPP standards such as 3G, 4G, 4G LTE, and 5G networks, or subsequent and similar standards.

First server 111 may also operate a LAN interface 111d-2, where LAN interface 111d-2 can be used to connect and communicate with other servers in a network 103, such as a second server 112 through private network 107a. LAN interface 111d-2 can comprise a physical interface connected to system bus 111c for first server 111. In exemplary embodiments, LAN interface 111d-2 can comprise an Ethernet or fiber optic physical connection. In other words, (i) LAN interface 111d-2 can connect first server 111 to private network 107a (which could comprise an IP network with private IP addresses that are not globally routable), and (ii) WAN interface 111d-1 can comprise an interface for communicating with a plurality of devices 101 through insecure networks such as the globally routable public Internet. The use of a separate WAN interface 111d-1 and LAN interface 111d-2 can increase the security of operation for first server 111. However, the use of separate physical interfaces for LAN interface 111d-2 and WAN interface 111d-1 can be omitted, and a single physical interface such as Ethernet or fiber-optic could be used by first server 111 to communicate with both devices 101 and at least a second server 112.

First server 111 may also optionally include user interface 111y which may include one or more sub-servers for receiving inputs and/or one or more sub-servers for conveying outputs. User interfaces are known in the art and may be simple for many first servers 111 such as a few LED lights or and LCD display, and thus user interfaces are not described in detail here. User interface 111y could comprise a touch screen or screen display with keyboard and mouse, if first server 111 has sophisticated interaction with a user, such as a network administrator. First server 111 can optionally omit a user interface 111y, if no user input or display is required for establishing communications within a network 103 and/or IP network 107.

Although not depicted in FIG. 10, first server 111 can include other components to support operation, such as a clock, power source or power connection, antennas, etc. Other possibilities exist as well for hardware and electrical components operating in a first server 111 without departing from the scope of the present disclosure. Using the electrical components depicted in FIG. 10, a first server 111 could send and receive the data 106 in FIG. 1 in an encrypted and secure manner after conducting the authenticated PQC KEM steps as contemplated herein, in order to conduct secure communications with a plurality of devices 101.

Second server 112 may consist of multiple electrical components in order to communicate with a plurality of first servers 111 via a private IP network 107a. In exemplary embodiments and as depicted in FIG. 10, second server 112 can include a server identity 112a, a processor 111p' (depicted as "CPU 111p'"), random access memory (RAM) 111m', an operating system (OS) 111g', storage memory 111b' (depicted as "nonvolatile memory 111b'"), a Local Area Network (LAN) interface 111d-1', a system bus 111c', and a user interface (UI) 111y'. The designation of "'" for the components in the second server 112, such as a processor 111p' indicate that the hardware components for a second server 112 can be equivalent to the hardware components for a first server 111, where the hardware components can store and operate with different data than a first server 111. Thus, the description for hardware components in a first server 111 in this FIG. 10 also apply to the hardware components for a second server 112, with the primary difference being the hardware components for a second server 112 store and operate with different data than the first server 111.

CPU 111p' can also include a secure processing environment (SPE) 111u' in order to conduct post-quantum cryptography (PQC) KEM, such as, but not limited to, conducting a step 225a as depicted and described in connection with FIG. 3 above. SPE 111u' can comprise a dedicated area of silicon or transistors within CPU 111p' in order to isolate the PQC KEM operations from other programs or software operated by CPU 111p', including many processes or programs running operating system 111g'. SPE 111u' could contain RAM memory equivalent to RAM 111m' and non-volatile memory equivalent to storage memory 111b', as well as a separately functioning processor on a smaller scale than CPU 111p', such as possibly a dedicated processor core within CPU 111p'. SPE 111u' can comprise a "secure enclave" or a "secure environment", based on the manufacturer of CPU 111p'. In some exemplary embodiments, an SPE 111u' can be omitted and the CPU 111p' can conduct PQC KEM operations or calculations without an SPE 111u'. CPU 111p' in a second server 112 can also include a hardware random number generator 128' which can be equivalent to the hardware random number generator 128 depicted and described for a first server 111 above.

For second servers 112 operating as a virtual machine or a container such as, but not limited to, within Docker or Kubernetes, the second server 112 could be allocated a portion of a physical processor CPU 111p' from a host operating system in order for the second server 112 to conduct processing and computational steps as contemplated herein. The portion of a physical processor CPU 111p' for the second server 112 could comprise different embodiments without departing from the scope of the present disclosure. A CPU 111p' for a second server 112 could comprise a "time slice" of a physical SOC within a physical host server (such as repeated brief periods of time on the order of milliseconds or less for CPU 111p' that is shared with other processes or virtual machines running on the host. The CPU 111p' for a second server 112 could comprise a dedicated (for a period of time) processing core of a physical SOC within a physical host server. Or, the CPU 111p' for a second server could comprise a combination of the allocation of resources from a physical SOC within a physical host server as described in the previous two sentences.

The system bus 111c' for a second server 112 may be any of several types of bus structures including a memory bus or memory controller, a peripheral bus, and a local bus using any of a variety of bus architectures including a data bus. System bus 111c' connects components within second server 112 as illustrated in FIG. 10, such as transferring electrical signals between the components illustrated. The system bus 111c' can function equivalent to the description for a system bus 111c for a first server 111 described above.

RAM 111m' for the second server 112 may comprise a random access memory for the second server 112. RAM 111m' can be a volatile memory providing rapid read/write memory access to CPU 111p'. The operation and function of RAM 111m' within the second server 112 can be equivalent to the RAM 111m described above for a first server 111. In exemplary embodiments, RAM 111m' operating within second server 112 can record values and algorithmic steps or computer instructions for conducting a post-quantum cryptography (PQC) KEM, including KEM DECAPS function 103j. RAM 111m' store the certificate database 112d with a plurality of server certificates 103c for a network 103 and a plurality of first servers 111. RAM 111m' may store the computer executable instructions for conducting the steps and associated variables and values or constants for steps 203b, 204, and 225a, which are depicted and described in connection with FIG. 2 above and also FIG. 5. The exemplary steps depicted in RANI 111m' listed in the above sentence can comprise computer executable instructions for the processor CPU 111p'

As another example for RAM 111m' within second server 112 or allocated to second server 112, RAM 111m' could store both computer executable instructions and associated values for a step 225a as depicted in FIG. 5 above. The step 225a within RAM could include the second asymmetric ciphertext C2 102c-2 from a message 201g-4, the server private key SK.server 103i, parameters 103f-y, and the KEM DECAPS function 103j, and the output from a step 225a of the second shared secret key K2 102k-2. For some data within RAM 111m' for step 225a, the depicted data for a step 225a or recited data from the previous sentence could comprise a pointer within RAM 111m' for a step 225a, such that the data could be recorded or stored within RAM 111m' in a different location within RAM 111m' than the memory allocated to data for step 225a within RAM 111m'.

RAM 111m' may also store the server static private key SK.server 103i for conducting KEM DECAPS function 103j. Although the server static private key SK.server 103i is depicted in RAM 111m', the data could be stored within RAM memory in a SPE 111u', where an SPE 111u' is described for a processor 111p' above. For some embodiments, a plurality of the different server static private keys SK.server 103i could also be stored within the certificate database 112d. The depicted data for RAM 111m' may be stored (i) within RAM 111m' when the second server 112 is powered on and communicating with a first servers and (ii) within storage memory 111b' when the second server 112 is powered off.

The operating system 111g' for the second server 112 can be equivalent to the operating system 111g for the first server 111. As depicted in FIG. 10, OS 111g' in FIG. 10 can contain algorithms, programs, or computer executable instructions (by processor 111p or SPE 111u) for conducting a secure session 201g with the first server 111, including the steps to process the receipt of a message 201g-2 and send a message 201g-3, etc.

Nonvolatile memory 111b' or "storage memory" 111b' (which can also be referred to herein as "memory 111b'") within second server 112 can comprise a non-volatile memory for long-term storage of data, including times when second server 112 may be powered off or within an extended sleep state such as a sleep state longer than a few seconds. As depicted in FIG. 10, non-volatile memory 111b' can record digital signature cryptographic algorithms 103s', cryptographic parameters 103z, and KEM parameters of Server.PQC-KEM.Params 103f. Cryptographic algorithms 103s', cryptographic parameters 103z, and KEM parameters of Server.PQC-KEM.Params 103f were depicted and described in connection with FIG. 1 above.

Second server 112 may also operate a LAN interface 111d-2', where LAN interface 111d-2' can be used to connect and communicate with other servers in a network 103, such as a first server 111 through private network 107a. LAN interface 111d-2' can comprise a physical interface connected to system bus 111c' for second server 112. LAN interface 111d-2' can be equivalent to the LAN interface 111d-2 for the first server 111 described above.

Second server 112 may also optionally include user interface 111y' which may include one or more sub-servers for receiving inputs and/or one or more sub-servers for conveying outputs. User interfaces are known in the art and may be simple for many second servers 112 such as a few LED lights or and LCD display, and thus user interfaces are not described in detail here. User interface 111y' could comprise a touch screen or screen display with keyboard and mouse, if second server 112 has sophisticated interaction with a user, such as a network administrator. Second server 112 can optionally omit a user interface 111y', if no user input or display is required for establishing communications within a network 103 and/or private IP network 107a.

Although not depicted in FIG. 10, second server 112 can include other components to support operation, such as a clock, power source or power connection, antennas, etc. Other possibilities exist as well for hardware and electrical components operating in a second server 112 without departing from the scope of the present disclosure. Using the electrical components depicted in FIG. 10, a second server 112 could send and receive messages with the first server 111 via secure session 201g as depicted in FIG. 2 above.

CONCLUSION

Various exemplary embodiments have been described above. Those skilled in the art will understand, however, that changes and modifications may be made to those examples without departing from the scope of the claims.

The invention claimed is:

1. A method for a network to conduct secure communications with a device, the method performed by the network, the method comprising:
 a) storing, in nonvolatile memory, a first set of key exchange mechanism (KEM) parameters;
 b) generating a server private key and a server public key for the first set of KEM parameters, wherein the server public key corresponds to the server private key;

c) receiving, from the device, a first message comprising (i) a device ephemeral public key, (ii) a second set of KEM parameters, and (iii) a first KEM algorithm for both the first set of KEM parameters and the second set of KEM parameters, wherein the device ephemeral public key supports the first KEM algorithm;

d) selecting (i) a second KEM algorithm for both the first set of KEM parameters and the second set of KEM parameters, and (ii) the server public key for the second KEM algorithm, wherein the first KEM algorithm and the second KEM algorithm comprise different algorithm types;

e) conducting a KEM encapsulation (ENCAPS) function to generate a first shared secret and a first asymmetric ciphertext using at least (i) the device ephemeral public key and (ii) the first KEM algorithm;

f) deriving a first symmetric ciphering key using at least the first shared secret;

g) encrypting at least (i) the server public key and (ii) an identifier for the second KEM algorithm with the first symmetric ciphering key into a first symmetric ciphertext;

h) sending, to the device, a second message comprising the first asymmetric ciphertext and the first symmetric ciphertext;

i) receiving, from the device, a third message comprising a second symmetric ciphertext and a third symmetric ciphertext, wherein the second symmetric ciphertext is encrypted with the first symmetric ciphering key, and wherein the third symmetric ciphertext is encrypted with a second symmetric ciphering key;

j) decrypting the second symmetric ciphertext with the first symmetric ciphering key in order to read a second asymmetric ciphertext;

k) conducting a KEM decapsulation (DECAPS) function with the server private key, the second KEM algorithm, and the second asymmetric ciphertext in order to generate a second shared secret;

l) deriving the second symmetric ciphering key with an HMAC-based Extract-and-Expand Key Derivation Function (HKDF) for at least the first shared secret and the second shared secret; and m) decrypting the third symmetric ciphertext with the second symmetric ciphering key.

2. The method of claim 1, wherein the first KEM algorithm comprises a first algorithm type for lattice-based cryptography and the second KEM algorithm comprises a second algorithm type for code-based cryptography.

3. The method of claim 1, wherein the first KEM algorithm comprises a first algorithm type for code-based cryptography and the second KEM algorithm comprises a second algorithm type for lattice-based cryptography.

4. The method of claim 1, wherein the server public key comprises a server static public key and the server private key comprises a server static private key, wherein a server certificate includes the server public key and the identifier for the second KEM algorithm, and wherein the first symmetric ciphertext includes the certificate.

5. The method of claim 1, wherein the server public key comprises a server ephemeral public key and the server private key comprises a server ephemeral private key, and wherein the second message includes a server digital signature over at least the server ephemeral public key.

6. The method of claim 4, wherein the network further comprises a first server and a second server, and wherein the second server conducts steps a), b), d), and k).

7. The method of claim 1, wherein the first symmetric ciphering key comprises a first portion and a second portion, wherein in step g) the network encrypts with the first portion of the first symmetric ciphering key, and wherein in step j) the network decrypts with the second portion of the first symmetric ciphering key.

8. The method of claim 1, further comprising in a step l), deriving a message authentication code (MAC) key and an initialization vector for the third symmetric ciphertext using the HKDF.

9. A network for conducting secure communications with a device, the network comprising:
 a nonvolatile memory configured to store a first set of key exchange mechanism (KEM) parameters;
 a wide area network (WAN) interface configured to:
 a) receive, from the device, a first message comprising (i) a device ephemeral public key, (ii) a second set of KEM parameters, and (iii) a first KEM algorithm for both the first set of KEM parameters and the second set of KEM parameters, wherein the device ephemeral public key supports the first KEM algorithm;
 b) send, to the device, a second message comprising a first asymmetric ciphertext and a first symmetric ciphertext; and
 c) receive, from the device, a third message comprising a second symmetric ciphertext and a third symmetric ciphertext, wherein the second symmetric ciphertext is encrypted with a first symmetric ciphering key, and wherein the third symmetric ciphertext is encrypted with a second symmetric ciphering key; and
 a random access memory (RAM) storing computer executable instructions configured to:
 a) generate a server private key and a server public key for the first set of KEM parameters, wherein the server public key corresponds to the server private key; and
 b) select (i) a second KEM algorithm of both the first set of KEM parameters and the second set of KEM parameters, and (ii) the server public key for the second KEM algorithm, wherein the first KEM algorithm and the second KEM algorithm comprise different algorithm types; and
 a first processor configured to:
 a) conduct a KEM encapsulation (ENCAPS) function with the device ephemeral public key and the first KEM algorithm in order to generate the first asymmetric ciphertext and a first shared secret;
 b) derive the first symmetric ciphering key using at least the first shared secret;
 c) encrypt at least (i) the server public key and (ii) an identifier for the second KEM algorithm with the first symmetric ciphering key into the first symmetric ciphertext;
 d) decrypt the second symmetric ciphertext with the first symmetric ciphering key in order to read a second asymmetric ciphertext;
 e) derive the second symmetric ciphering key with an HMAC-based Extract-and-Expand Key Derivation Function (HKDF) for at least the first shared secret and a second shared secret; and
 f) decrypt the third symmetric ciphertext with the second symmetric ciphering key; and
 a second processor configured to conduct a KEM decapsulation (DECAPS) function with the server private key, the second KEM algorithm, and the second asymmetric ciphertext in order to generate the second shared secret.

10. The network of claim 9, wherein the first KEM algorithm comprises a first algorithm type for lattice-based cryptography and the second KEM algorithm comprises a second algorithm type for code-based cryptography.

11. The network of claim 9, wherein the first KEM algorithm comprises a first algorithm type for code-based cryptography and the second KEM algorithm comprises a second algorithm type for lattice-based cryptography.

12. The network of claim 9, wherein the server public key comprises a server static public key and the server private key comprises a server static private key, and wherein the second message includes a server certificate for the server public key and the second KEM algorithm.

13. The network of claim 9, wherein the server public key comprises a server ephemeral public key and the server private key comprises a server ephemeral private key, and wherein the second message includes a digital signature over at least the server ephemeral public key.

14. The network of claim 9, wherein a first server includes the WAN interface and the first processor, and wherein a second server includes the nonvolatile memory, the RAM memory, and the second processor.

15. The network of claim 9, wherein the first symmetric ciphering key comprises a first portion and a second portion, wherein the first processor in step c) encrypts with the first portion of the first symmetric ciphering key, and wherein the first processor in step d) decrypts with the second portion of the first symmetric ciphering key.

16. The network of claim 9, wherein the first processor in step e) derives a message authentication code (MAC) key and an initialization vector for the third symmetric ciphertext using the HKDF.

\* \* \* \* \*